United States Patent
Kawasaki et al.

(10) Patent No.: US 10,455,628 B2
(45) Date of Patent: Oct. 22, 2019

(54) TERMINAL DEVICE, MME, AND PGW

(71) Applicant: SHARP KABUSHIKI KAISHA, Sakai, Osaka (JP)

(72) Inventors: Yudai Kawasaki, Sakai (JP); Yoko Kuge, Sakai (JP); Masafumi Aramoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/565,039

(22) PCT Filed: Apr. 6, 2016

(86) PCT No.: PCT/JP2016/061301
§ 371 (c)(1),
(2) Date: Oct. 6, 2017

(87) PCT Pub. No.: WO2016/163420
PCT Pub. Date: Oct. 13, 2016

(65) Prior Publication Data
US 2018/0103502 A1 Apr. 12, 2018

(30) Foreign Application Priority Data
Apr. 7, 2015 (JP) .................. 2015-078107

(51) Int. Cl.
*H04W 76/10* (2018.01)
*H04W 76/12* (2018.01)
*H04W 4/00* (2018.01)
*H04W 88/06* (2009.01)
*H04W 92/24* (2009.01)

(52) U.S. Cl.
CPC ............. *H04W 76/12* (2018.02); *H04W 4/00* (2013.01); *H04W 76/10* (2018.02); *H04W 88/06* (2013.01); *H04W 92/24* (2013.01)

(58) Field of Classification Search
CPC ....... H04W 76/12; H04W 76/10; H04W 4/00; H04W 92/24; H04W 88/06
See application file for complete search history.

(56) References Cited

U.S. PATENT DOCUMENTS

2014/0321328 A1* 10/2014 Zuniga .................... H04W 8/06 370/254
2017/0026824 A1* 1/2017 Kim ........................ H04W 8/08

FOREIGN PATENT DOCUMENTS

WO WO 2013/082245 A1 6/2013

OTHER PUBLICATIONS

Control Plane signalling solution for S2b SA WG2 Meeting #106, S2-144200 by Apple. Pub Date: Nov. 17-21, 2014.*

(Continued)

*Primary Examiner* — Hashim S Bhatti
(74) *Attorney, Agent, or Firm* — Birch, Stewart, Kolasch & Birch, LLP

(57) ABSTRACT

Provided is communication control accompanied with establishment of a multi-access PDN connection or with rejection of establishment of a multi-access PDN connection, based on a response to a PDN connection establishment request from a terminal device. This makes it possible to provide a communication control method and the like accompanied with a multi-access PDN connection establishment request from the terminal device.

7 Claims, 18 Drawing Sheets

(56) References Cited

OTHER PUBLICATIONS

NBIFOM solution for operation mode 3GPP TSG SA WG2 Meeting #105 TD S2-143791 by Samsung. Pub Date: Oct. 13-17, 2014.*
International Preliminary Report on Patentability and English translation of the Written Opinion of the International Searching Authority (forms PCT/IB/373, PCT/ISA/237 and PCT/IB/338), dated Oct. 19, 2017, for International Application No. PCT/JP2016/061301.
3GPP TR 23.861 V13.0.0 (Jun. 2015), Technical Report, 3rd Generation Partnership Project; Technical Specification Group Services and System Aspects; Network based IP flow mobility (Release 13), 153 pages.
Alcatel-Lucent, Alcatel-Lucent Shanghai Bell, Broadcom Corporation, "Updates to section 7.3.2 to align with PCC", S2-143895, SA WG2 Meeting#106, San Francisco, USA, Nov. 17-21, 2014, 20 pages.
Apple Inc., "Control Plane signalling solution for S2b", S2-144200, SA WG2 Meeting#106, San Francisco, California, USA, Nov. 17-21, 2014, 10 pages.
Blackberry UK LTD., Motorola Mobility, Broadcom Corporation, Intel, "IP flow mobility using the IFMP protocol", S2-150528, 3GPP TSG-SA WG2 Meeting#107, Sorrento, Italy, Jan. 26-30, 2015, 10 pages.
CATT, "Network initiated NB-IFOM for S2a", S2-142597, SA WG2 Meeting#104, Dublin, Ireland, Jul. 11-14, 2014, 10 pages.
Qualcomm Incorporated, "UE-Initiated S2a NB_IFOM", S2-142677, SA WG2 Meeting#104, Dublin, Ireland, Jul. 7-11, 2014, 8 pages.
Samsung, "NBIFOM solution for operation mode", S2-143791, 3GPP TSG-SA WG2 Meeting#105, Sapporo, Japan, Oct. 13-17, 2014, 3 pages.
Samsung, Hitachi, "Discussion: Emergency Call when maximum number of EPS bearers not yet known at the UE", CI-130238, 3GPP TSG-CT WG1 Meeting#82, San Jose del Cabo, Mexico, Jan. 28-Feb. 1, 2013, 4 pages.
ZTE, "Merged proposal for IP flow mobility solutions for S2b (GTP)—UE-initiated and Network-initiated IP flow mobility", S2-150536, SA WG2 Meeting#107, Sorrento, Italy, Jan. 26-30, 2015, 21 pages.

* cited by examiner

FIG. 4A

| TWAG ID | NBIFOM capability |

FIG. 4B

| PGW ID 1 | NBIFOM capability |
| PGW ID 2 | NBIFOM capability |

FIG. 4C

| UE NBIFOM capability |
| NBIFOM allowed |

FIG. 4D

| PDN connection ID |
| Network allowed mode |
| Operation mode |
| User Plane Connection ID |
| TWAG MAC address |
| NBIFOM permission |

FIG. 4E

| TRANSFER PATH IDENTIFICATION INFORMATION |
| Routing rule |

FIG. 4F

| MME ID | NBIFOM capability |

FIG. 4G

| SGW ID | NBIFOM capability |

FIG. 6A

| IMSI |
| MSISDN |
| IMEI / IMEISV |
| Access Restriction |
| UE NBIFOM capability |

FIG. 6B

| Context ID |
| PDN Address |
| PDN Type |
| Access Point Name (APN) |
| WLAN offload ability |
| PDN GW ID |
| NBIFOM permission |

FIG. 8A

| |
|---|
| IMSI |
| EMM State |
| GUTI |
| ME Identity |
| UE NBIFOM capability |

FIG. 8B

| |
|---|
| PDN connection id |
| APN in Use |
| IP Address |
| Default Bearer |
| WLAN offload ability |
| UE allowed mode |
| Operation mode |

FIG. 8C

| |
|---|
| TRANSFER PATH IDENTIFICATION INFORMATION |
| routing rule |

FIG. 8D

| TWAG ID | NBIFOM capability |
|---|---|

FIG. 8E

| PGW ID 1 | NBIFOM capability |
|---|---|
| PGW ID 2 | NBIFOM capability |

FIG. 8F

| MME ID | NBIFOM capability |
|---|---|

FIG. 8G

| SGW ID | NBIFOM capability |
|---|---|

FIG. 10A

| IMSI |
|---|
| ME Identity |
| MSISDN |
| UE NBIFOM capability |

FIG. 10B

| IP Address |
|---|
| PDN type |
| APN |
| Network allowed mode |
| Operation mode |

FIG. 10C

| TRANSFER PATH IDENTIFICATION INFORMATION |
|---|
| routing rule |

| TWAG ID | NBIFOM capability |
|---|---|

| PGW ID 1 | NBIFOM capability |
|---|---|
| PGW ID 2 | NBIFOM capability |

FIG. 10F

| MME ID | NBIFOM capability |
|---|---|

FIG. 10G

| SGW ID | NBIFOM capability |
|---|---|

FIG. 12A

| Subscriber ID |
|---|
| UE NBIFOM capability |

FIG. 12B

| APN |
|---|
| Operation mode |
| Network Policy |
| Charging rule |
| PCC rule |
| QoS rule |

FIG. 12C

| routing rule |
|---|

FIG. 12D

| TWAG ID | NBIFOM capability |
|---|---|

FIG. 12E

| PGW ID 1 | NBIFOM capability |
|---|---|
| PGW ID 2 | NBIFOM capability |

FIG. 12F

| MME ID | NBIFOM capability |
|---|---|

FIG. 12G

| SGW ID | NBIFOM capability |
|---|---|

TERMINAL DEVICE, MME, AND PGW

TECHNICAL FIELD

The present invention relates to a terminal device and the like.

BACKGROUND ART

The 3rd Generation Partnership Project (3GPP), which undertakes activities for standardizing recent mobile communication systems, is in the process of creating specifications for the Evolved Packet System (EPS), which realizes an all-IP architecture (see NPL 1). The EPS is a mobile communication system through which mobile operators and the like provide mobile telephone services, and is structured including a core network called the Evolved Packet Core (EPC), an access network based on the radio communication standard called the Long Term Evolution (LTE), and the like.

Furthermore, in the process of creating specifications for the EPS by the 3GPP, the Network-based IP Flow Mobility (NBIFOM) has been discussed (see NPL 1). The NBIFOM is a technical item that allows one device to simultaneously utilize a 3GPP interface and an interface other than the 3GPP interface (for example, WLAN).

Conventionally, one PDN connection accommodates a communication path or a bearer or a transfer path that passes through any one access network of a 3GPP access network (for example, LTE access network) and an access network other than the 3GPP access network (for example, WLAN access network).

The NBIFOM can maintain a state in which one PDN connection simultaneously accommodates a bearer or communication path or transfer path through the 3GPP access network and a bearer or communication path or transfer path through a network other than the 3GPP access network. Such PDN connection is defined as multi-access PDN connection.

For the NBIFOM, it also has been discussed to stipulate an operation mode indicating an endpoint node that has a leading function for switching a communication path. Specifically, it has been discussed to classify an operation mode into a UE-initiated mode based on a terminal device and a Network-initiated mode based on a network.

A terminal device and each device included in a core network and an access network use an NBIFOM function to be capable of transmitting/receiving data using a communication path through an appropriate access network for each application.

Furthermore, an endpoint node configured to initiate the switching of a flow of the multi-access PDN connection established by using the NBIFOM function can be configured based on the operation mode.

CITATION LIST

Non Patent Literature

NPL 1: 3GPP TR 23.861 Technical Specification Group Services and System Aspects, Network-based IP Flow Mobility (Release 13)

SUMMARY OF INVENTION

Technical Problem

The NBIFOM does not stipulate a detailed procedure for establishing a multi-access PDN connection. Specifically, details of successful procedure and failure procedure in the multi-access PDN connection establishment procedure are not stipulated.

More specifically, details of accept means and reject procedure from a network for a request of establishing the multi-access PDN connection in which a terminal device supports an NBIFOM function, are not clarified.

The present invention has been achieved in view of such circumstances, and an object thereof is to provide a suitable way of realizing a communication control procedure accompanied with a PDN connection establishment request from a terminal device.

Solution to Problem

To solve the above-described problems, a terminal device according to an aspect of the present invention includes: an LTE interface unit configured to receive an Activate default EPS bearer context request message from a Mobility Management Entity (MME) and establish a Packet Data Network (PDN) connection, the Activate default EPS bearer context request message including information indicating a Network-based IP Flow Mobility (NBIFOM) mode.

A Mobility Management Entity (MME) according to an aspect of the present invention includes: an IP mobile communication network interface unit configured to transmit an Activate default EPS bearer context request message to a terminal device, the Activate default EPS bearer context request message including information indicating a Network-based IP Flow Mobility (NBIFOM) mode.

A PDN Gateway (PGW) according to an aspect of the present invention includes: an IP mobile communication network interface unit configured to transmit a create session response message to a Serving Gateway (SGW), the create session response message including information indicating a Network-based IP Flow Mobility (NBIFOM) mode.

Advantageous Effects of Invention

The present invention can realize a communication control procedure accompanied with a multi-access PDN connection establishment request from a terminal device.

Specifically, the present invention can support a successful procedure in establishing a multi-access PDN connection and/or a failure procedure in establishing the multi-access PDN connection.

BRIEF DESCRIPTION OF DRAWINGS

FIGS. 2A and 2B are diagrams illustrating a configuration of an IP mobile communication network and the like.

FIGS. 4A to 4G are diagrams illustrating a configuration of a storage unit of the TWAG.

FIGS. 6A and 6B are diagrams illustrating a configuration of a storage unit of the HSS.

FIGS. 8A to 8G are diagrams illustrating a configuration of a storage unit of the UE.

FIGS. 10A to 10G are diagrams illustrating a configuration of a storage unit of the PGW.

FIGS. 12A to 12G are diagrams illustrating a configuration of a storage unit of the PCRF 60.

DESCRIPTION OF EMBODIMENTS

1. First Embodiment

Hereinafter, a radio communication technology according to an embodiment of the present invention will be described in detail with reference to the drawings.

1.1. System Overview

Figure 1:
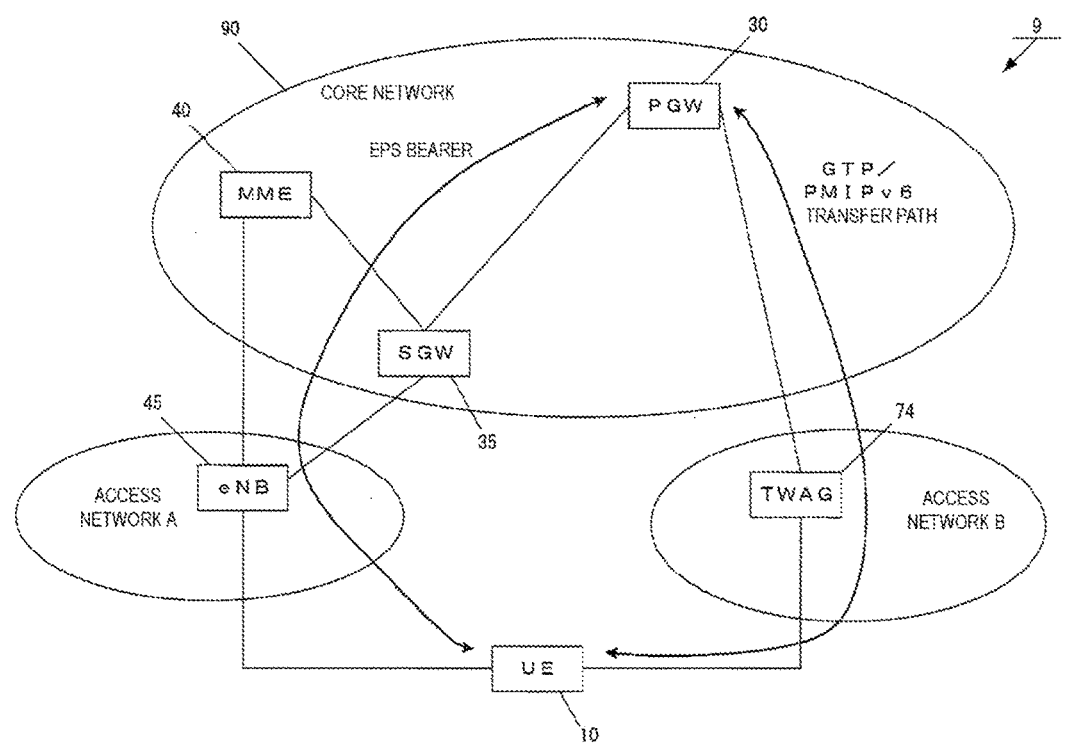
FIG. 1 is a diagram illustrating an overview of a mobile communication system.

FIG. 1 is a diagram illustrating an overview of a mobile communication system according to the present embodiment. As illustrated in the drawings, a mobile communication system 9 is constituted of a mobile terminal device UE 10, an LTE base station eNB 45 included in an access network A, a Trusted WLAN Access Gateway (Gateway TWAG) 74 included in an access network B, a Mobility Management Entity (MME) 40 included in a core network 90, a Serving Gateway (SGW) 35, and a PDN Gateway (PGW) 30.

Here, the UE 10 may be any mobile terminal device, and may be a User Equipment (UE) or a Mobile Equipment (ME) or a Mobile Station (MS).

Furthermore, the access network A may be an LTE access network, and the eNB 45 included in the access network A may be an LTE radio base station. Note that the access network A may include a plurality of radio base stations.

Furthermore, the access network B may be a WLAN access network. The TWAG 74 may be a gateway connecting between the core network 90 and the WLAN access network, the gateway connecting to the PGW 30 in the core network 90.

In the present embodiment, the UE 10 can establish a PDN connection using an EPS bearer through the access network A.

Furthermore, the UE 10 can establish a PDN connection by using a GTP/PMIPv6 transfer path between the PGW 30 and the UE 10. Note that the transfer path may be a bearer.

Here, the core network 90 refers to an IP mobile communication network run by a Mobile Operator.

For example, the core network 90 may be a core network 90 for the mobile operator that runs and manages the mobile communication system 9, or may be a core network 90 for a virtual mobile operator such as a Mobile Virtual Network Operator (MVNO).

The MME 40 is a control device configured to perform, through the access network A, location management and access control of the UE 10. Details of the MME 40 will be descried later.

Furthermore, the SGW 35 is a gateway device between the core network 90 and the access network A, and is configured to transfer user data between the UE 10 and the PGW 30.

The PGW 30 is a gateway device of a packet data service network (Packet Data Network (PDN)) configured to provide a communication service to the UE 10.

In the present embodiment, the UE 10 can establish a first PDN connection and/or a second PDN connection.

Furthermore, in the present embodiment, an NBIFOM is a technology that allows establishment of a multi-access PDN connection.

Furthermore, in the present embodiment, a multi-access PDN connection refers to a PDN connection capable of accommodating, in one PDN connection, a transfer path and/or a bearer by 3GPP access and/or WLAN access. In other words, the multi-access PDN connection can accommodate both a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection is a PDN connection capable of constituting one or more transfer paths.

Furthermore, if the multi-access PDN connection is constituted of a plurality of transfer paths, each of the transfer paths can utilize the same IP address. That is, each of the communication paths is associated with a multi-access PDN connection flow, and thus, the communication path can be switched for each flow.

In the present embodiment, to clearly distinguish from a PDN connection established based on an IP Flow Mobility (IFOM), a PDN connection in which, based on the NBIFOM, a transfer path of a specific flow can be selected is defined as "multi-access PDN connection".

Note that the IFOM is a technique for switching a communication path of a certain IP flow by using a Dual Stack Mobile IPv6 (DSMIPv6) protocol, and in the present embodiment, a PDN connection capable of switching, based on the IFOM, a communication path of a certain IP flow is described as a PDN connection for the IFOM.

Furthermore, the first PDN connection may be the above-described multi-access PDN connection.

In detail, the first PDN connection is a PDN connection in which, as one PDN connection, a communication path EPS bearer through the access network A and a communication path by a GTP/PMIPv6 tunnel through the access network B can be used. That is, this PDN connection can transmit/receive data through the 3GPP access, the WLAN access, or both of the 3GPP access and the WLAN access. The first PDN connection may be the multi-access PDN connection.

Furthermore, the second PDN connection may be a conventional PDN connection, not the multi-access PDN connection. Note that the second PDN connection may be a single-access PDN connection.

Here, the "single-access PDN connection" refers to one PDN connection constituting only a transfer path of either one of the 3GPP access or the WLAN access, unlike the multi-access PDN connection. In detail, the single-access PDN connection is a PDN connection established by the conventional attach.

That is, the second PDN connection is a PDN connection constituted of the EPS bearer through the access network A or a PDN connection constituted of the GTP/PMIPv6 transfer path through the access network B. The second PDN connection accommodates a transfer path and/or a communication path through either one of the access networks.

As described above, the single-access PDN connection is a PDN connection different from the multi-access PDN connection and the PDN connection for the IFOM. Moreover, the single-access PDN connection is a PDN connection that is also different from a PDN connection for a Local IP Access (LIPA). Here, the "LIPA" refers to communication control for performing offload to a home network. More specifically, the base station to which the terminal device is connected performs the offload by transmitting user data to a home network to which the base station is connected, the user data being conventionally delivered to the core network 90. The PDN connection for the LIPA is a PDN connection for performing such communication based on the LIPA.

Figure 2A:
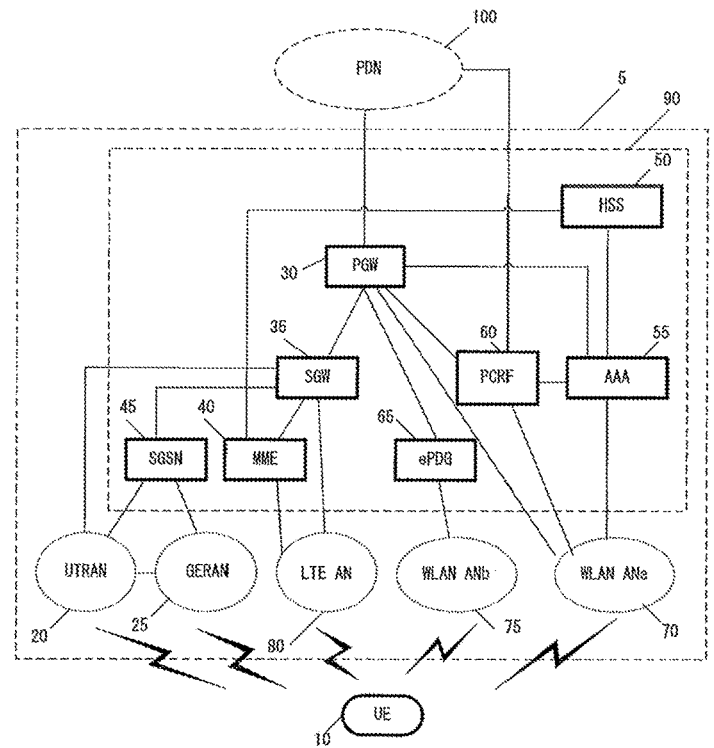

Next, an example of a configuration of the core network 90 will be described. FIG. 2A illustrates an example of a configuration of the IP mobile communication network. As illustrated in FIG. 2A, the core network 90 is constituted of a Home Subscriber Server (HSS) 50, an Authentication Authorization Accounting (AAA) 55, a Policy and Charging Rules Function (PCRF) 60, the PGW 30, an enhanced Packet Data Gateway (ePDG) 65, the SGW 35, the MME 40, and a Serving GPRS Support Node (SGSN) 45.

Furthermore, the core network 90 can be connected to a plurality of radio access networks (the LTE AN 80, the WLAN ANb 75, the WLAN ANa 70, the UTRAN 20, and the GERAN 25).

A radio access network may be constituted by being connected to a plurality of different access networks, or may be constituted by being connected to any one of the access networks. Moreover, the UE 10 can be wirelessly connected to the radio access network.

Moreover, the WLAN access network b (WLAN ANb 75) that connects to the core network 90 via the ePDG 65 and the WLAN access network a (WLAN ANa 75) that connects to the PGW 30, the PCRF 60, and the AAA 55 can be configured as the access network connectable in the WLAN access system.

Note that each device has a configuration similar to the conventional devices in a mobile communication system using EPS, and thus detailed descriptions will be omitted. Each device will be described briefly hereinafter.

The PGW 30 is connected to the PDN 100, the SGW 35, the ePDG 65, the WLAN ANa 70, the PCRF 60, and the AAA 55 and is a relay device configured to transfer user data by functioning as a gateway device between the PDN 100 and the core network 90.

The SGW 35 is connected to the PGW 30, the MME 40, the LTE AN 80, the SGSN 45, and the UTRAN 20 and is a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 5550 and is an access control device configured to perform location information management and access control for the UE 10 via the LTE AN 80. Furthermore, the core network 90 may be constituted including a plurality of location management devices. For example, a location management device different from the MME 40 may be constituted. Similarly to the MME 40, the location management device different from the MME 40 may be connected to the SGW 35, the LTE AN 80, and the HSS 5550.

Furthermore, if a plurality of MMEs 40 are included in the core network 90, the MMEs 40 may be connected to each other. As a result, the contexts of the UE 10 may be transmitted/received among the MMEs 40.

The HSS 50 is connected to the MME 40 and the AAA 55 and is a managing node configured to manage subscriber information. The subscriber information of the HSS 50 is referenced during access control for the MME 40, for example. Moreover, the HSS 5550 may be connected to the location management device different from the MME 40.

The AAA 55 is connected to the PGW 30, the HSS 5550, the PCRF 60, and the WLAN ANa 70 and is configured to perform access control for the UE 10 connected via the WLAN ANa 70.

The PCRF 60 is connected to the PGW 30, the WLAN ANa 75, the AAA 55, and the PDN 100 and is configured to perform QoS management for data delivery. For example, the PCRF 60 manages QoS of a communication path between the UE 10 and the PDN 100.

The ePDG 65 is connected to the PGW 30 and the WLAN ANb 75 and is configured to deliver user data by functioning as a gateway device between the core network 90 and the WLAN ANb 75.

The SGSN 45 is connected to the UTRAN 20, the GERAN 25, and the SGW 35 and is a control device for location management between a 3G/2G access network (UTRAN/GERAN) and the LTE access network (E-UTRAN). In addition, the SGSN 45 has functions of: selecting the PGW 30 and the SGW 35; managing a time zone of the UE 10; and selecting the MME 40 at the time of handover to the E-UTRAN.

Figure 2B:
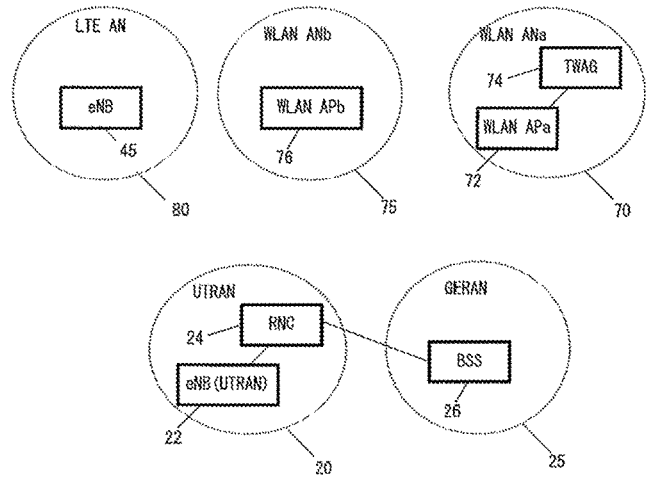

Also as illustrated in FIG. 2B, each radio access network includes devices to which the UE 10 is actually connected (for example, a base station device and an access point device), and the like. The devices used in these connections can be thought of as devices adapted to the radio access networks.

In the present embodiment, the LTE AN 80 is constituted including the eNB 45. The eNB 45 is a radio base station to which the UE 10 is connected in the LTE access system, and the LTE AN 80 may be constituted including one or more radio base stations.

The WLAN ANa 70 is constituted including the WLAN APa 72 and the TWAG 74. The WLAN APa 72 is a radio base station to which the UE 10 is connected in the WLAN access system trusted by the operator running the core network 90, and the WLAN ANa 70 may be constituted including one or more radio base stations. The TWAG 74 is a gateway device between the core network 90 and the WLAN ANa 70. Furthermore, the WLAN APa 72 and the TWAG 74 may be constituted as a single device.

In the case where the operator running the core network 90 and the operator running the WLAN ANa 70 are different, such constitution can be realized through contracts and agreements between the operators.

Furthermore, the WLAN ANb 75 is constituted including the WLAN APb 76. The WLAN APb 76 is a radio base station to which the UE 10 is connected in the WLAN access system in the case where no trusting relationship is established with the operator running the core network 90, and the WLAN ANb 75 may be constituted including one or more radio base stations.

In this manner, the WLAN ANb 75 is connected to the core network 90 via the ePDG 65, which is a device included in the core network 90, serving as a gateway. The ePDG 65 has a security function for ensuring security.

The UTRAN 20 is constituted including the Radio Network Controller (RNC) 24 and the eNB (UTRAN) 22. The eNB (UTRAN) 22 is a radio base station to which the UE 10 is connected by a UMTS Terrestrial Radio Access (UTRA) and the UTRAN 20 may be constituted including one or more radio base stations. Furthermore, the RNC 24 is a controller configured to connect the core network 90 and the eNB (UTRAN) 22, and the UTRAN 20 may be constituted including one or more RNCs. Moreover, the RNC 24 may be connected to one or more eNBs (UTRANs) 22. In addition, the RNC 24 may be connected to a radio base station (Base Station Subsystem (BSS) 26) included in the GERAN 25.

The GERAN 25 is constituted including the BSS 26. The BSS 26 is a radio base station to which the UE 10 is connected by GSM/EDGE Radio Access (GERA), and the GERAN 25 may be constituted of one or more radio base station BSSs. Furthermore, the one or more BSSs 26 may be connected to each other. Moreover, the BSS 26 may be connected to the RNC 24.

Note that in the present specification, the UE 10 being connected to each radio access network refers to the UE 10 being connected to a base station device, an access point, or the like included in each radio access network, and data, signals, and the like being transmitted and received also traverse those base station devices, access points, or the like.

1.2. Device Configuration

The configuration of each device will be described below.

1.2.1. TWAG Configuration

Figure 3:
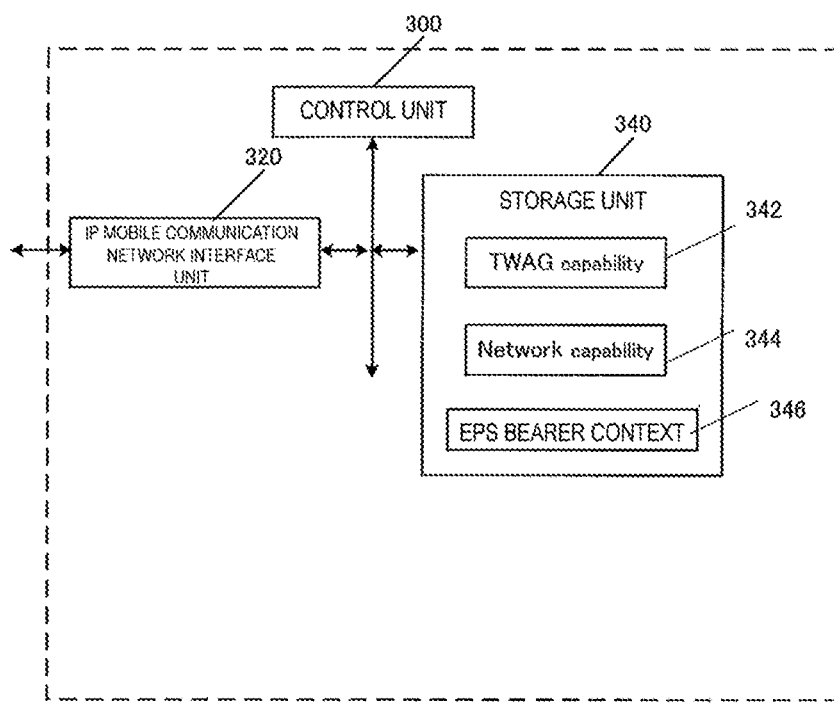
FIG. 3 is a diagram illustrating a functional configuration of a TWAG.

FIG. 3 illustrates a device configuration of the TWAG 74. As illustrated in the figure, the TWAG 74 is constituted of an IP mobile communication network interface unit 320, a control unit 300, and a storage unit 340. The IP mobile communication network interface unit 320 and the storage unit 340 are connected to the control unit 300 via a bus.

The control unit 300 is a function unit for controlling the TWAG 74. The control unit 300 implements various processes by reading out and executing various programs stored in the storage unit 340.

The IP mobile communication network interface unit 320 is a function unit through which the TWAG 74 is connected to the PGW 30.

The storage unit 340 is a function unit for storing programs, data, and the like necessary for each operation of the TWAG 74. The storage unit 340 is constituted of, for example, a semiconductor memory, a Hard Disk Drive (HDD), or the like.

As illustrated in FIG. 3, the storage unit 340 stores the TWAG capability 342, the network capability 344, and the EPS bearer context 346. Hereinafter, information elements stored in the storage unit 340 will be described.

FIGS. 4A to 4G illustrate information elements stored in the storage unit 340. FIG. 4A illustrates an example of the TWAG capability stored by the TWAG 74. The TWAG capability stores identification information (NBIFOM capability) indicating whether or not capability of establishing the first PDN connection is supported for each TWAG 74. In other words, it is identification information indicating whether or not the TWAG 74 supports an NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating the capability of establishing the first PDN connection. That is, the existence of the NBIFOM capability in the storage unit may mean that the TWAG 74 is a gateway having a function of establishing the first PDN connection. In other words, the existence of the NBIFOM capability in the storage unit may mean that the TWAG 74 is a gateway supporting the NBIFOM function.

As illustrated in the figure, the NBIFOM capability may be stored by associating with the TWAG ID, which is the identification information of the TWAG 74. If not associated with the TWAG ID, the NBIFOM capability may mean capability of the TWAG 74 to be stored.

If the TWAG ID and the NBIFOM capability are associated and stored, the TWAG 74 may store the TWAG capability of a plurality of TWAGs 74.

In this case, when the UE 10 performs handover to another TWAG 74, the TWAG 74 may select a TWAG 74 to which the handover is made, on the basis of the TWAG capability.

Next, the network capability 344 will be described. FIG. 4B illustrates an example of the network capability stored by the TWAG 74. The network capability stores the NBIFOM capability for each network, i.e., for each PGW 30.

Here, the NBIFOM capability is identification information indicating whether or not the capability of establishing the first PDN connection is supported for each network. In other words, it is identification information indicating whether or not the PGW 30 supports the NBIFOM function. More specifically, for example, the NBIFOM capability may include "allowed" or "Not allowed".

Note that the NBIFOM function may be information indicating having a function of establishing the multi-access PDN connection.

Alternatively, the NBIFOM capability may be identification information indicating having the capability of establishing the first PDN connection. In other words, the NBIFOM capability may be identification information indicating that it is a gateway supporting the NBIFOM function. That is, the existence of the NBIFOM capability in the storage unit may mean that the PGW 30 is a gateway having a function of establishing the first PDN connection. In other words, the existence of the NBIFOM capability in the storage unit may mean that the PGW 30 is a gateway supporting the NBIFOM function.

As illustrated in FIG. 4B, the TWAG 74 stores the NBIFOM capability by associating with the PGW ID. Furthermore, as illustrated in the figure, the NBIFOM capability may be stored by associating with each of a plurality of PGWs 30.

The PGW ID may be any information for identifying the PGW 30, and may be an Access Point Name (APN), for example.

Next, the EPS bearer context will be described. The EPS bearer context may be classified into an EPS bearer context for each UE 10 stored for each UE 10, an EPS bearer context for each PDN connection, and an EPS bearer context for each bearer and/or transfer path.

FIG. 4C illustrates information elements included in the EPS bearer context for each UE 10. As the figure illustrates, the TWAG 74 stores, for each UE 10, a UE NBIFOM capability and an NBIFOM allowed.

The UE NBIFOM capability is the NBIFOM capability of the UE 10. The UE NBIFOM capability is identification information indicating whether or not the capability of establishing the first PDN connection is supported for each UE 10. In other words, the UE NBIFOM capability is identification information indicating whether or not the UE 10 supports the NBIFOM function. More specifically, for example, the UE NBIFOM capability may include "allowed" or "Not allowed".

Note that the NBIFOM function may be information indicating having a function of establishing the multi-access PDN connection.

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage unit may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with a plurality of APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the conventional PDN connection, not the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2. The NBIFOM allowed may be stored before the PDN connection is established.

The TWAG 74 may access the HSS 5550 to acquire the NBIFOM allowed before the PDN connection is established and/or during the establishment procedure.

Furthermore, the EPS bearer context for each UE 10 may include the identification information of the UE 10. The identification information of the UE 10 may be IMSI.

Furthermore, FIG. 4D illustrates the EPS bearer context for each PDN connection. The EPS bearer context for each PDN connection includes a PDN connection ID, a network allowed mode, an operation mode, a User Plane Connection ID, a TWAG MAC address, and an NBIFOM permission.

The PDN connection ID is identification information for identifying a PDN connection. The UE 10, the TWAG 74, and the PGW 30 may store the same identification information.

The operation mode is identification information for a mode indicating which of the UE 10 or the network takes an initiative in transmitting/receiving data or is capable of starting communication control, if the PDN connection is the first PDN connection.

More specifically, for example, an operation mode in which the UE 10 can start the communication control may be the UE initiated mode.

Furthermore, an operation mode in which the network and/or the PGW 30 and/or the PCRF 60 can start the communication control may be a Network-initiated mode.

The network allowed mode indicates an operation mode allowed by the network. The network allowed mode may include the UE initiated mode or the Network-initiated mode or both of these modes.

The User Plane Connection ID is identification information identifying a connection used for user data transmission when the UE 10 establishes a transfer path through the TWAG 74. The TWAG MAC address is a physical address of the TWAG 74.

The NBIFOM permission is information indicating that this PDN connection has established the multi-access PDN connection. In other words, the NBIFOM permission indicates that the first PDN connection is established.

That is, the fact that the TWAG 74 stores the NBIFOM permission means that this PDN connection is the first PDN connection.

The NBIFOM permission is identification information stored by the TWAG 74 by establishing the PDN connection.

The TWAG 74 may access the HSS 5550 to acquire the NBIFOM permission during the establishment of the PDN connection. Alternatively, the TWAG 74 may store the NBIFOM permission, based on the fact that the multi-access PDN connection has been established.

Next, the EPS bearer context for each bearer and/or transfer path will be described. As illustrated in FIG. 4E, the EPS bearer context for each bearer and/or transfer path may include the transfer path identification information and the routing rule.

The transfer path identification information is information for identifying a transfer path and/or bearer. The transfer path identification information may be an EPS bearer ID, for example.

The routing rule indicates an association of a routing filter and a routing address or routing access type. Based on this association, whether using a communication path through the 3GPP access network or using a communication path through the WLAN access network is determined.

Here, the routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the TWAG 74. Alternatively, the routing address may be an IP address of a Mobile Access Gateway (MAG).

The routing rule may be notified from the PGW 30 or the PCRF 60, or may be notified from the UE 10. Alternatively, the routing rule may be a value that the TWAG 74 stores beforehand as a default value.

The routing filter may include an IP header to switch an IP flow. Alternatively, the routing filter may include an application ID to switch the flow for each application. Alternatively, the routing filter may include a TFT.

The routing rule may store a plurality of rules. Furthermore, the routing rule may include priority for each rule.

The TWAG capability and the network capability may be included in the EPS bearer context.

1.2.2. HSS Configuration

Figure 5:
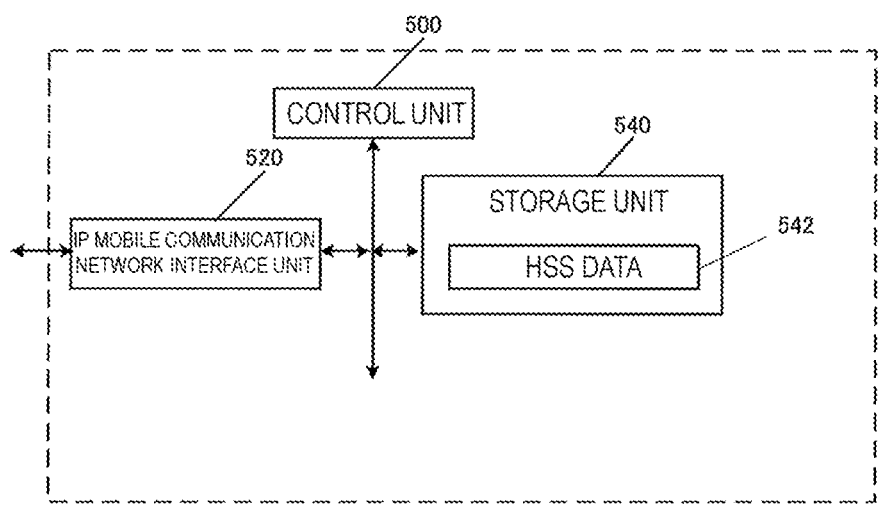
FIG. 5 is a diagram illustrating a functional configuration of an HSS.

Next, the configuration of the HSS 5550 will be described. FIG. 5 illustrates a device configuration of the HSS 5550. As illustrated in the figure, the HSS 5550 is constituted of an IP mobile communication network interface unit 520, a control unit 500, and a storage unit 540. The IP mobile communication network interface unit 520 and the storage unit 540 are connected to the control unit 500 via a bus.

The control unit 500 is a function unit for controlling the HSS 5550. The control unit 500 implements various processes by reading out and executing various programs stored in the storage unit 540.

The IP mobile communication network interface unit 520 is a function unit through which the HSS 5550 is connected to the MME 40 and/or another MME 40, and the AAA 55.

The storage unit 540 is a function unit for storing programs, data, and the like necessary for each operation of the HSS 5550. The storage unit 540 is constituted of, for example, a semiconductor memory, a Hard Disk Drive (HDD), or the like.

As illustrated in FIG. 5, the storage unit 540 stores the HSS data 542. Hereinafter, information elements stored in the storage unit 540 will be described.

FIGS. 6A and 6B illustrate information elements stored in the storage unit 540. FIG. 6A illustrates an example of HSS data for each UE 10 stored by the HSS 5550.

As the figure illustrates, the HSS data for each UE 10 includes IMSI, MSISDN, IMEI/IMEISV, access restriction, UE NBIFOM capability, and NBIFOM allowed. The IMSI is identification information to be assigned to a user (subscriber) using the UE 10. The MSISDN represents the phone number of the UE 10. The IMEI/IMISV is identification information assigned to the UE 10. The access restriction indicates registration information for access restriction.

The UE NBIFOM capability is the NBIFOM capability of the UE 10. The UE NBIFOM capability is identification information indicating whether or not the capability of establishing the first PDN connection is supported for each UE 10. In other words, the UE NBIFOM capability indicates whether or not the UE 10 supports the NBIFOM function. More specifically, for example, the NBIFOM capability may include "allowed" or "Not allowed".

Alternatively, the UE NBIFOM capability may be identification information indicating that the UE 10 has capability of establishing the first PDN connection. That is, the existence of the UE NBIFOM capability may mean that the UE 10 has a function of establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with a plurality of APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the conventional PDN connection, not the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2. The NBIFOM allowed may be stored before the PDN connection is established.

FIG. 6B illustrates an example of HSS data for each PDN connection stored by the HSS 5550. As the figure illustrates, the HSS data for each PDN connection includes at least a context ID, a PDN Address, a PDN type, an Access Point Name (APN), a WLAN offload ability, a PDN GW ID, and an NBIFOM permission.

The context ID is identification information for the context storing the HSS data for each PDN connection.

The PDN Address represents an IP address registered. The PDN Address is an IP address of the UE 10.

The PDN type indicates the type of PDN Address. That is, the PDN type is identification information for identifying IPv4 or IPv6 or IPv4v6, for example. The APN is a label indicating an access destination of the network, in accordance with DNS naming conventions.

The WLAN offload ability is identification information indicating whether traffic connected through this APN can perform offload to the WLAN by utilizing a cooperative function between the WLAN and the 3GPP, or maintains the 3GPP connection. The WLAN offload ability may vary for each RAT type. Specifically, the LTE (E-UTRA) and the 3G (UTRA) may have different WLAN offload ability.

The PDN GW identity is identification information identifying the PGW 30 utilized in this APN. This identification information may be a Fully Qualified Domain Name (FQDN) or an IP address.

The NBIFOM permission is information indicating that this PDN connection has established the multi-access PDN connection. In other words, the NBIFOM permission indicates that the first PDN connection is established.

That is, the fact that the TWAG 74 stores the NBIFOM permission means that this PDN connection is the first PDN connection.

The NBIFOM permission is identification information stored by the TWAG 74 by establishing the PDN connection.

Specifically, for example, the HSS data for each PDN connection including the APN 1 may include the NBIFOM permission, and the HSS data for each PDN connection including the APN 2 may not need to include the NBIFOM permission.

In other words, the PDN connection based on the APN 1 may be the first PDN connection, and the PDN connection based on the APN 2 must not be the first PDN connection.

1.2.3. UE Configuration

Figure 7:
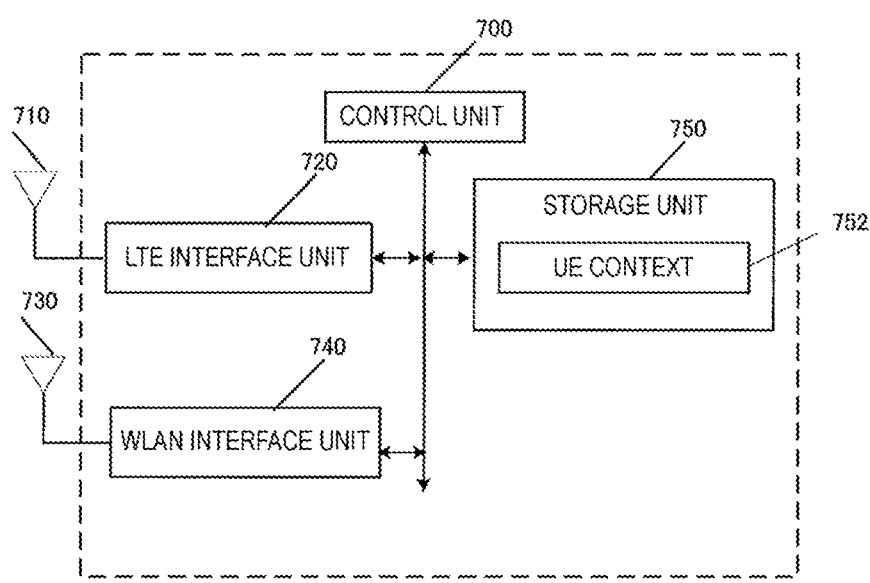
FIG. 7 is a diagram illustrating a functional configuration of a UE.

Next, the configuration of the UE 10 will be described. FIG. 7 illustrates a device configuration of the UE 10. As illustrated in the figure, the UE 10 is constituted of an LTE interface unit 720, a WLAN interface unit 740, a control unit 700, and a storage unit 750.

The LTE interface unit 720, the WLAN interface unit 740, and the storage unit 750 are connected to the control unit 700 via a bus.

The control unit 700 is a function unit for controlling the UE 10. The control unit 700 implements various processes by reading out and executing various programs stored in the storage unit 750.

The LTE interface unit 720 is a function unit through which the UE 10 is connected to an LTE base station to be connected to an IP access network. Furthermore, an external antenna 710 is connected to the LTE interface unit 720.

The WLAN interface unit 740 is a function unit through which the UE 10 is connected to the WLAN AP to be connected to the IP access network.

Furthermore, an external antenna 730 is connected to the WLAN interface unit 740.

The control unit 700 is a function unit for controlling the UE 10. The control unit 700 implements various processes by reading out and executing various programs stored in the storage unit 750.

The storage unit 750 is a function unit for storing programs, data, and the like necessary for each operation of the UE 10. The storage unit 750 is constituted of, for example, a semiconductor memory, a Hard Disk Drive (HDD), or the like.

As illustrated in FIG. 7, the storage unit 750 stores the UE context 752. Hereinafter, information elements stored in the storage unit 750 will be described. Note that the UE context 752 is classified into UE context for each UE 10, UE context for each PDN connection, and UE context for each transfer path and/or bearer.

FIG. 8A is an example of a UE context stored for each UE 10. As illustrated in the figure, the UE context for each UE 10 includes IMSI, an EMM state, GUTI, an ME identity, and a UE NBIFOM capability. The IMSI is identification information to be assigned to a user (subscriber) using the UE 10.

The EMM state indicates a mobility management state of the UE 10. For example, the EMM state may be EMM-REGISTERED in which the UE 10 is registered with the network (registered state) or EMM-DEREGISTERD in which the UE 10 is not registered with the network (deregistered state).

The GUTI is an abbreviation of Globally Unique Temporary Identity, and is temporary identification information of the UE 10. The GUTI is constituted of identification information of the MME 40 (Globally Unique MME Identifier (GUMMEI)) and identification information of the UE 10 in a specific MME 40 (M-TMSI).

The ME identity is an ID of ME, and may be the IMEI/IMISV, for example.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability is identification information indicating whether or not the NBIFOM function is supported for each UE 10. More specifically, for example, the NBIFOM capability may include "allowed" or "Not allowed".

Note that the NBIFOM function may be information indicating having a function of establishing the multi-access PDN connection.

Alternatively, the UE NBIFOM capability may be identification information indicating that the UE 10 has capability of establishing the first PDN connection. That is, the existence of the UE NBIFOM capability in the storage unit of the UE 10 may mean that the UE 10 has a function of establishing the first PDN connection.

In other words, the UE NBIFOM capability may be identification information indicating that the UE 10 supports the NBIFOM function. That is, the existence of the UE NBIFOM capability in the storage unit of the UE 10 may mean that the UE 10 supports the NBIFOM function.

FIG. 8B illustrates an example of the UE context for each PDN connection. As illustrated in the figure, the UE context for each PDN connection includes at least a PDN connection ID, an APN in use, an IP address, a default bearer, a WLAN offload ability, a UE allowed mode, and an operation mode.

The PDN connection ID is identification information for identifying a PDN connection. The UE 10, the TWAG 74, and the PGW 30 may store the same identification information.

The APN in use is an APN utilized by the UE 10 most recently. This APN may be constituted of identification information of the network and default identification information of an operator.

The IP address is an IP address assigned to the UE 10 through the PDN connection, and may be the IPv4 address or the IPv6 prefix.

The default bearer is EPS bearer identification information identifying a default bearer in this PDN connection.

The WLAN offloadability is WLAN offload permission information indicating whether or not a communication associated with this PDN connection allows offload to the WLAN using an interworking function between the WLAN and the 3GPP, or maintains the 3GPP access.

The UE allowed mode is an operation mode allowed by the UE 10. This identification information may indicate the UE initiated mode, may indicate the Network-initiated mode, or may indicate both of these modes.

The operation mode is identification information for a mode indicating which of the UE 10 or the network takes an initiative in transmitting/receiving data or is capable of starting communication control, if the current PDN connection is the first PDN connection.

FIG. 8C illustrates the UE context for each bearer. The UE context for each bearer includes transfer path identification information and a routing rule.

The transfer path identification information is information for identifying a transfer path and/or bearer. The transfer path identification information may be an EPS bearer ID, for example. Furthermore, the transfer path identification information may be associated with the TFT.

Here, the routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the TWAG 74. Alternatively, the routing address may be an IP address of a Mobile Access Gateway (MAG).

The routing rule may be notified from the PGW 30 or the PCRF 60. Alternatively, the routing rule may be a value that the UE 10 stores beforehand as a default value.

The routing filter may include an IP header to switch an IP flow. Alternatively, the UE 10 may include an application ID into the routing filter to switch the flow for each application. Alternatively, the routing filter may include the TFT.

The routing rule may store a plurality of rules (regulations). Furthermore, the routing rule may include priority for each rule.

FIG. 8D illustrates the TWAG capability. The TWAG capability stores identification information (NBIFOM capability) indicating whether or not capability of establishing the first PDN connection is supported for each TWAG 74. In other words, it is identification information indicating whether or not the TWAG 74 supports the NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating having capability of establishing the first PDN connection. That is, the existence of the NBIFOM capability in the storage unit may mean that the TWAG 74 is a gateway having a function of establishing the first PDN connection. In other words, the existence of the NBIFOM capability in the storage unit may mean that the TWAG 74 is a gateway supporting the NBIFOM function.

The UE 10 may store the NBIFOM capability by associating with the TWAG ID. Furthermore, the NBIFOM capability of a plurality of TWAGs 74 may be stored.

FIG. 8E illustrates an example of the network capability. The network capability stores the NBIFOM capability for each network, i.e., for each PGW 30.

Here, the NBIFOM capability is identification information indicating whether or not capability of establishing the first PDN connection is supported for each network. More specifically, for example, the NBIFOM capability may include "allowed" or "Not allowed".

Alternatively, the NBIFOM capability may be identification information indicating having capability of establishing the first PDN connection. That is, the existence of the NBIFOM capability may mean that the PGW 30 and/or the network is a gateway having a function of establishing the first PDN connection.

As illustrated in FIG. 8E, the TWAG 74 stores the NBIFOM capability by associating with the PGW ID. Furthermore, as illustrated in the figure, the NBIFOM capability may be stored by associating with each of a plurality of PGWs 30.

The PGW ID is information for identifying the PGW 30. The PGW ID may be an APN, for example.

FIG. 8F illustrates the MME capability. The MME capability stores identification information (NBIFOM capability) indicating whether or not capability of establishing the first PDN connection is supported for each MME 40. In other words, it is identification information indicating whether or not the MME 40 supports the NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating having capability of establishing the first PDN connection. That is, the existence of the NBIFOM capability in the storage unit may mean that the MME 40 is a gateway having a function of establishing the first PDN connection. In other words, the existence of the NBIFOM capability in the storage unit may mean that the MME 40 is a gateway supporting the NBIFOM function.

The UE 10 may store the NBIFOM capability by associating with the MME ID.

FIG. 8G illustrates the SGW capability. The SGW capability stores identification information (NBIFOM capability) indicating whether or not capability of establishing the first PDN connection is supported for each SGW 35. In other words, it is identification information indicating whether or not the SGW 35 supports the NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating the capability of establishing the first PDN connection. That is, the existence of the NBIFOM capability in the storage unit may mean that the SGW 35 is a gateway having a function of establishing the first PDN connection. In other words, the existence of the NBIFOM capability in the storage unit may mean that the SGW 35 is a gateway supporting the NBIFOM function.

The UE 10 may store the NBIFOM capability by associating with the SGW ID.

The TWAG capability, the network capability, the MME capability, and the SGW capability may be included in the UE context, or may be information separated from the UE context.

That is, the UE 10 may store the TWAG capability and the network capability by including them into the UE context, or may store the TWAG capability and the network capability separately from the UE context.

1.2.4. PGW Components

Figure 9:
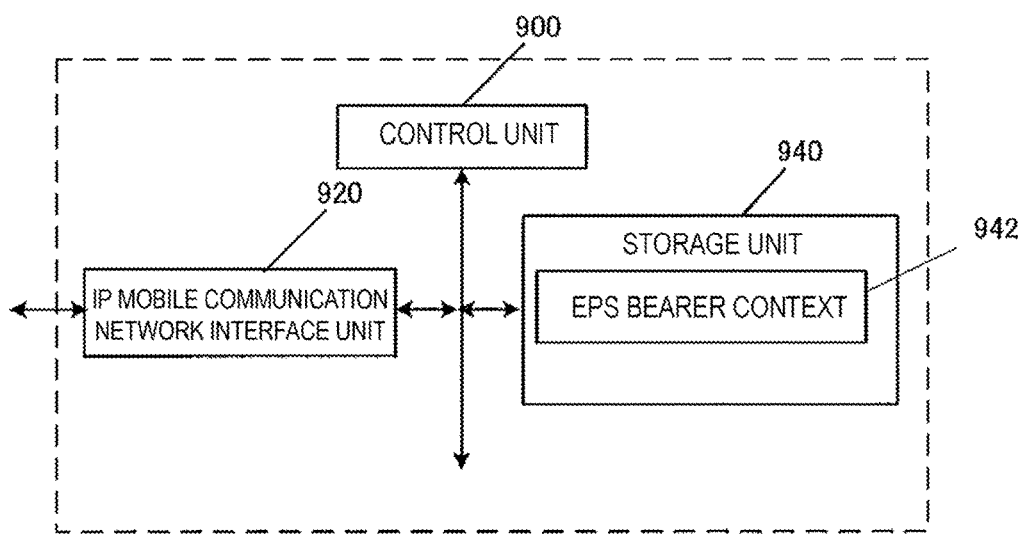
FIG. 9 is a diagram illustrating a functional configuration of a PGW.

Next, components of the PGW 30 will be described. FIG. 9 illustrates a device configuration of the PGW 30. As illustrated in the figure, the PGW 30 is constituted of an IP mobile communication network interface unit 920, a control unit 900, and a storage unit 940. The IP mobile communication network interface unit 920 and the storage unit 940 are connected to the control unit 900 via a bus.

The control unit 900 is a function unit for controlling the PGW 30. The control unit 900 implements various processes by reading out and executing various programs stored in the storage unit 940.

The IP mobile communication network interface unit 920 is a function unit through which the PGW 30 is connected to the SGW 35 and/or the PCRF 60 and/or the ePDG 65 and/or the AAA 55 and/or the GW 74.

The storage unit 940 is a function unit for storing programs, data, and the like necessary for each operation of the PGW 30. The storage unit 940 is constituted of, for example, a semiconductor memory, a Hard Disk Drive (HDD), or the like.

As illustrated in the figure, the storage unit 940 stores the EPS bearer context 942. Note that the EPS bearer context may be stored for each UE 10, stored for each APN, stored for each PDN connection, or stored for each transfer path and/or bearer.

First, the EPS bearer context for each UE 10 will be described. FIG. 10A illustrates an example of the EPS bearer context for each UE 10. As illustrated in the figure, the EPS bearer context includes at least IMSI, an ME identity, MSISDN, and a UE NBIFOM capability. The IMSI is information identifying a user of the UE 10. The ME identity is an ID of ME, and may be the IMEI/IMISV, for example. The MSISDN represents the phone number of the UE 10.

The UE NBIFOM capability is the NBIFOM capability of the UE 10. The UE NBIFOM capability is identification information indicating whether or not capability of establishing the first PDN connection is supported for each UE 10. More specifically, for example, the NBIFOM capability may include "allowed" or "Not allowed".

Alternatively, the UE NBIFOM capability may be identification information indicating that the UE 10 has capability of establishing the first PDN connection. That is, the existence of the UE NBIFOM capability may mean that the UE 10 has a function of establishing the first PDN connection.

Next, the EPS bearer context for each PDN connection will be described. FIG. 10B illustrates an example of the EPS bearer context for each PDN connection.

As illustrated in the figure, the context includes at least a PDN connection ID, an IP address, a PDN type, an APN, a network allowed mode, and an operation mode.

The PDN connection ID is identification information for identifying a PDN connection. The UE 10, the TWAG 74, the MME 40, and the PGW 30 may store the same identification information.

The IP address indicates an IP address assigned to the UE 10 for this PDN connection. The IP address may be an IPv4 and/or IPv6 prefix.

The PDN type indicates the type of the IP address. The PDN type indicates IPv4 or IPv6 or IPv4v6, for example. The APN is a label indicating an access destination of the network, in accordance with DNS naming conventions.

The network allowed mode indicates an operation mode allowed by the network. The network allowed mode may include the UE initiated mode or the Network-initiated mode or both of these modes.

The operation mode is identification information for a mode indicating which of the UE 10 or the network takes an initiative in transmitting/receiving data or is capable of starting communication control, if the current PDN connection is the first PDN connection.

More specifically, for example, the UE initiated mode in which the UE 10 can start the communication control or the Network-initiated mode in which the network can start the communication control may be identified.

Next, an example of the EPS bearer context for each transfer path and/or bearer will be described by using FIG. 10C. As illustrated in the figure, the context includes at least transfer path identification information and a routing rule.

The transfer path identification information is information for identifying a transfer path and/or bearer. The transfer path identification information may be an EPS bearer ID, for example.

Furthermore, the transfer path identification information may be associated with the TFT.

The routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the TWAG 74. Alternatively, the routing address may be an IP address of a Mobile Access Gateway (MAG).

The routing rule may be notified from the PGW 30 or the PCRF 60. Alternatively, the routing rule may be a value that the UE 10 stores beforehand as a default value.

The PGW 30 may include an IP header into the routing filter to switch the IP flow. Alternatively, the PGW 30 may include an application ID into the routing filter to switch the flow for each application. Alternatively, the routing filter may include the TFT.

The routing rule may store a plurality of rules. Furthermore, the routing rule may include priority for each rule.

FIG. 10D illustrates the TWAG capability. The TWAG capability stores identification information (NBIFOM capability) indicating whether or not the capability of establishing the first PDN connection is supported for each TWAG 74. In other words, it is identification information indicating whether or not the TWAG 74 supports the NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating having capability of establishing the first PDN connection. That is, the existence of the NBIFOM capability in the storage unit may mean that the TWAG 74 is a gateway having a function of establishing the first PDN connection. In other words, the existence of the NBIFOM capability in the storage unit may mean that the TWAG 74 is a gateway supporting the NBIFOM function.

The PGW 30 may store the NBIFOM capability by associating with the TWAG ID.

FIG. 10E illustrates an example of the network capability. The network capability stores the NBIFOM capability for each network, i.e., for each PGW 30.

Here, the NBIFOM capability is identification information indicating whether or not the capability of establishing the first PDN connection is supported for each network. More specifically, for example, the NBIFOM capability may include "allowed" or "Not allowed".

Alternatively, the NBIFOM capability may be identification information indicating having capability of establishing the first PDN connection. That is, the existence of the NBIFOM capability may mean that the PGW 30 and/or the network is a gateway having a function of establishing the first PDN connection.

As illustrated in FIG. 10E, the PGW 30 stores the NBIFOM capability by associating with the PGW ID. Furthermore, as illustrated in the figure, the NBIFOM capability may be stored by associating with each of a plurality of PGWs 30.

The PGW ID may be any information for identifying the PGW 30, and may be an APN, for example.

FIG. 10F illustrates the MME capability. The MME capability stores identification information (NBIFOM capability) indicating whether or not the capability of establishing the first PDN connection is supported for each MME 40. In other words, it is identification information indicating whether or not the MME 40 supports the NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating having the capability of establishing the first PDN connection. That is, the existence of the NBIFOM capability in the storage unit may mean that the MME 40 is a gateway having a function of establishing the first PDN connection. In other words, the existence of the NBIFOM capability in the storage unit may mean that the MME 40 is a gateway supporting the NBIFOM function.

The PGW 30 may store the NBIFOM capability by associating with the MME ID.

FIG. 10G illustrates the SGW capability. The SGW capability stores identification information (NBIFOM capability) indicating whether or not the capability of establishing the first PDN connection is supported for each SGW 35. In other words, it is identification information indicating whether or not the SGW 35 supports the NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating having the capability of establishing the first PDN connection. That is, the existence of the NBIFOM capability in the storage unit may mean that the SGW 35 is a gateway having a function of establishing the first PDN connection. In other words, the existence of the NBIFOM capability in the storage unit may mean that the SGW 35 is a gateway supporting the NBIFOM function.

The PGW 30 may store the NBIFOM capability by associating with the SGW ID.

The TWAG capability, the network capability, the MME capability, and the SGW capability may be included in the EPS bearer context, or may be information separated from the UE context.

1.2.5. PCRF Components

Figure 11:
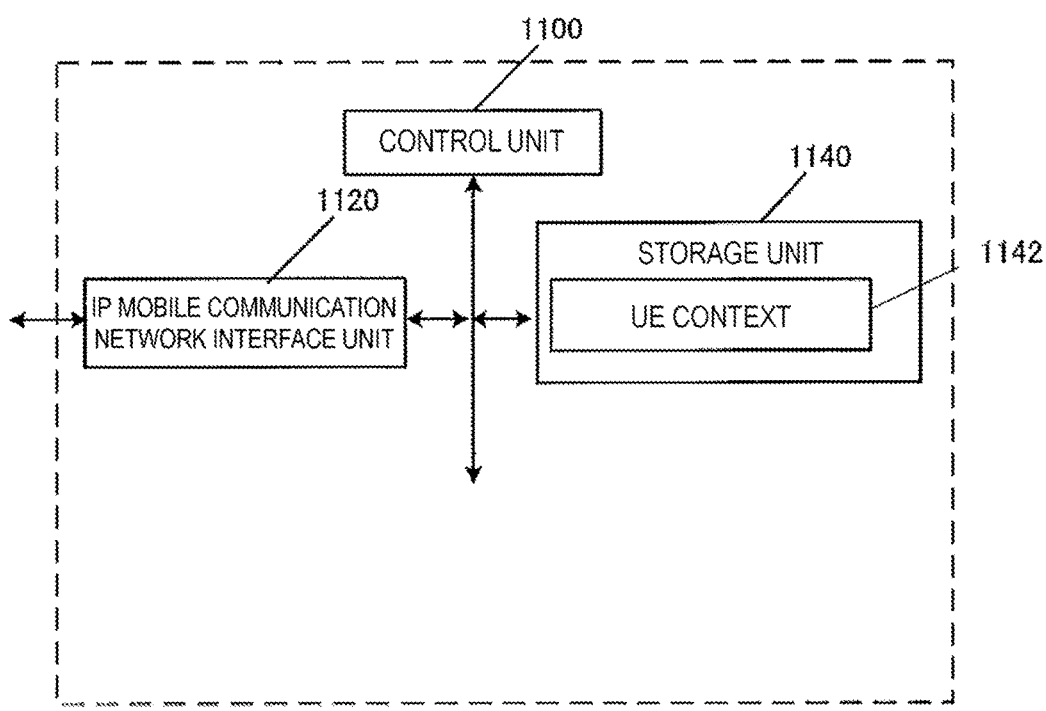
FIG. 11 is a diagram illustrating a functional configuration of a PCRF 60.

Next, components of the PCRF 60 will be described. FIG. 11 illustrates a device configuration of the PCRF 60. As illustrated in the figure, the PCRF 60 is constituted of an IP mobile communication network interface unit 1120, a control unit 1100, and a storage unit 1140. The IP mobile communication network interface unit 1120 and the storage unit 1140 are connected to the control unit 1100 via a bus.

The control unit 1100 is a function unit for controlling the PCRF 60. The control unit 1100 implements various processes by reading out and executing various programs stored in the storage unit 1140.

The IP mobile communication network interface unit 1120 is a function unit through which the PCRF 60 is connected to the PGW 30 and/or the TWAG 74 and/or the AAA 55.

The storage unit 1140 is a function unit for storing programs, data, and the like necessary for each operation of the PCRF 60. The storage unit 940 is constituted of, for example, a semiconductor memory, a Hard Disk Drive (HDD), or the like.

As illustrated in the figure, the storage unit 1140 stores a UE context 1142. Note that the UE context may be classified into the UE context stored for each UE 10 and the UE context stored for each PDN connection.

FIG. 12A illustrates the UE context for each UE 10. As illustrated in the figure, the context includes at least a subscriber ID and UE NBIFOM capability.

The subscriber ID is identification information of a user. For example, the subscriber ID may be IMSI.

The UE NBIFOM capability is the NBIFOM capability of the UE 10. The UE NBIFOM capability is identification information indicating whether or not the capability of establishing the first PDN connection is supported for each UE 10. In other words, the UE NBIFOM capability is identification information indicating whether or not the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage unit may mean that the UE 10 supports the NBIFOM function.

Next, the UE context for each PDN connection will be described. FIG. 12B illustrates an example of the UE context for each PDN connection. As illustrated in the figure, the context may include at least an APN, an operation mode, a network policy, a charging rule, a PCC rule, and a QoS rule. The APN is a label indicating an access destination of the network, in accordance with DNS naming conventions.

The operation mode is identification information for a mode indicating which of the UE 10 or the network takes an initiative in transmitting/receiving data or is capable of starting communication control, if the PDN connection is the first PDN connection.

More specifically, for example, an operation mode in which the UE 10 can start the communication control may be the UE initiated mode.

Furthermore, an operation mode in which the network and/or the PGW 30 and/or the PCRF 60 can start the communication control may be a Network-initiated mode.

The network policy is a communication control policy on the network side, and may include the network allowed mode. Alternatively, the PCRF 60 may store the network allowed mode separately from the network policy.

The charging rule is a regulation on charging. Based on the charging rule determined by the PCRF 60, a PCEF 60 performs charging.

The PCC rule is a regulation relating to control of the network policy and charging rule. Based on the PCC rule, the PCEF performs communication control and charging.

The QoS rule is a regulation relating to QoS of the flow. The QoS rule may be associated with the PCC rule.

FIG. 12C illustrates the UE context for each transfer path and/or bearer. As illustrated in the figure, the UE context for each transfer path and.or bearer includes at least the routing rule.

The routing rule indicates an association of a routing filter and a routing address or routing access type. Based on this association, it is determined whether a communication path through the 3GPP access network or a transfer path through the WLAN access network is used.

Here, the routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the TWAG 74. Alternatively, the routing address may be an IP address of a Mobile Access Gateway (MAG).

The routing rule may be notified from the UE 10 and/or the TWAG 74 and/or the PGW 30. Alternatively, the routing rule may be a value that the PCRF 60 stores beforehand as a default value. In this case, the PCRF 60 may determine the default value of the routing rule, based on the PCC rule.

The routing filter may include an IP header to switch an IP flow. Alternatively, the routing filter may include an application ID to switch the flow for each application. Alternatively, the routing filter may include a TFT.

The routing rule may store a plurality of rules. Furthermore, the routing rule may include priority for each rule.

FIG. 12D illustrates an example of the TWAG capability stored by the TWAG 74. The TWAG capability stores identification information (NBIFOM capability) indicating whether or not the capability of establishing the first PDN connection is supported for each TWAG 74. In other words, it is identification information indicating whether or not the TWAG 74 supports the NBIFOM function. Specifically, the NBIFOM capability may include "allowed" or "Not allowed".

Note that the NBIFOM function may be information indicating that it has a function of establishing the multi-access PDN connection.

Alternatively, the NBIFOM capability may be identification information indicating that it has the capability of establishing the first PDN connection. That is, the existence of the NBIFOM capability in the storage unit may mean that the TWAG 74 is a gateway that has a function of establishing the first PDN connection. In other words, the existence of the NBIFOM capability in the storage unit may mean that the TWAG 74 is a gateway supporting the NBIFOM function.

As illustrated in the figure, the NBIFOM capability may be stored by associating with the TWAG ID, which is the identification information of the TWAG 74. If not associated with the TWAG ID, the NBIFOM capability may mean capability of the TWAG 74 to be stored.

If the TWAG ID and the NBIFOM capability are associated and stored, the PCRF 60 may store the TWAG capability of a plurality of TWAGs 74.

FIG. 12E illustrates an example of the network capability stored by the PCRF 60. The network capability stores the NBIFOM capability for each network, i.e., for each PGW 30.

Here, the NBIFOM capability is identification information indicating whether or not the capability of establishing the first PDN connection is supported for each network. In other words, it is identification information indicating whether or not the PGW 30 supports the NBIFOM function. More specifically, for example, the NBIFOM capability may include "allowed" or "Not allowed".

Note that the NBIFOM function may be information indicating that it has a function of establishing the multi-access PDN connection.

Alternatively, the NBIFOM capability may be identification information indicating that it has the capability of establishing the first PDN connection. In other words, the NBIFOM capability may be identification information indicating that it is a gateway supporting the NBIFOM function. That is, the existence of the NBIFOM capability in the storage unit may mean that the PGW 30 is a gateway having a function of establishing the first PDN connection. In other words, the existence of the NBIFOM capability in the storage unit may mean that the PGW 30 is a gateway supporting the NBIFOM function.

FIG. 12F illustrates the MME capability. The MME capability stores identification information (NBIFOM capability) indicating whether or not the capability of establishing the first PDN connection is supported for each MME 40. In other words, it is identification information indicating whether or not the MME 40 supports the NBIFOM function. Specifically, the NBIFOM capability may include "allowed" or "Not allowed".

Note that the NBIFOM function may be information indicating that it has a function of establishing the multi-access PDN connection.

Alternatively, the NBIFOM capability may be identification information indicating that it has the capability of establishing the first PDN connection. That is, the existence of the NBIFOM capability in the storage unit may mean that the MME 40 is a gateway having a function of establishing the first PDN connection. In other words, the existence of the NBIFOM capability in the storage unit may mean that the MME 40 is a gateway supporting the NBIFOM function.

The PCRF 60 may store the NBIFOM capability by associating with the MME ID.

FIG. 12G illustrates the SGW capability. The SGW capability stores identification information (NBIFOM capability) indicating whether or not the capability of establishing the first PDN connection is supported for each SGW 35. In other words, it is identification information indicating whether or not the SGW 35 supports the NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating that it has the capability of establishing the first PDN connection. That is, the existence of the NBIFOM capability in the storage unit may mean that the SGW 35 is a gateway having a function of establishing the first PDN connection. In other words, the existence of the NBIFOM capability in the storage unit may mean that the SGW 35 is a gateway supporting the NBIFOM function.

The PCRF 60 may store the NBIFOM capability by associating with the SGW ID.

1.2.6. MME Configuration

A device configuration of the MME 40 will be described. The MME 40 is constituted of the IP mobile communication network interface unit 320, the control unit 300, and the storage unit 340. The IP mobile communication network interface unit 320 and the storage unit 340 are connected to the control unit 300 via a bus.

The control unit 300 is a function unit for controlling the MME 40. The control unit 300 implements various processes by reading out and executing various programs stored in the storage unit 340.

The IP mobile communication network interface unit 320 is a function unit through which the MME 40 is connected to the PGW 30.

The storage unit 340 is a function unit for storing programs, data, and the like necessary for each operation of the MME 40. The storage unit 340 is constituted of, for example, a semiconductor memory, a Hard Disk Drive (HDD), or the like.

The storage unit 340 stores the MME capability 342, the network capability 344, and the EPS bearer context 346. Hereinafter, information elements stored in the storage unit 340 will be described.

Information elements stored in the storage unit 340 will be described. An example of the MME capability stored by the MME 40 will be illustrated. The MME capability stores identification information (NBIFOM capability) indicating whether or not the capability of establishing the first PDN connection is supported for each MME 40. In other words, it is identification information indicating whether or not the MME 40 supports the NBIFOM function. Specifically, the NBIFOM capability may include "allowed" or "Not allowed".

Note that the NBIFOM function may be information indicating that it has a function of establishing the multi-access PDN connection.

Alternatively, the NBIFOM capability may be identification information indicating that it has the capability of establishing the first PDN connection. That is, the existence of the NBIFOM capability in the storage unit may mean that the MME 40 is a gateway having a function of establishing the first PDN connection. In other words, the existence of the NBIFOM capability in the storage unit may mean that the MME 40 is a gateway supporting the NBIFOM function.

The NBIFOM capability may be stored by associating with the MME ID, which is the identification information of the MME 40. If not associated with the MME ID, the NBIFOM capability may mean the capability of the MME 40 to be stored.

If the MME ID and the NBIFOM capability are associated and stored, the MME 40 may store the MME capability of a plurality of MMEs 40.

In this case, when the UE 10 performs handover to another MME 40, the MME 40 may select an MME 40 to which the handover is made, on the basis of the MME capability.

Next, the network capability 344 will be described. An example of the network capability stored by the MME 40 will be described. The network capability stores the NBIFOM capability for each network, i.e., for each PGW 30.

Here, the NBIFOM capability is identification information indicating whether or not the capability of establishing the first PDN connection is supported for each network. In other words, it is identification information indicating whether or not the PGW 30 supports the NBIFOM function. More specifically, for example, the NBIFOM capability may include "allowed" or "Not allowed".

Note that the NBIFOM function may be information indicating having a function of establishing the multi-access PDN connection.

Alternatively, the NBIFOM capability may be identification information indicating having the capability of establishing the first PDN connection. In other words, the NBIFOM capability may be identification information indicating that it is a gateway supporting the NBIFOM function. That is, the existence of the NBIFOM capability in the storage unit may mean that the PGW 30 is a gateway having a function of establishing the first PDN connection. In other words, the existence of the NBIFOM capability in the storage unit may mean that the PGW 30 is a gateway supporting the NBIFOM function.

The MME 40 stores the NBIFOM capability by associating with the PGW ID. Furthermore, the NBIFOM capability may be stored by associating with each of a plurality of PGWs 30.

The PGW ID may be any information for identifying the PGW 30, and may be an Access Point Name (APN), for example.

Next, the EPS bearer context will be described. The EPS bearer context may be classified into an EPS bearer context for each UE 10 stored for each UE 10, an EPS bearer context for each PDN connection, and an EPS bearer context for each bearer and/or transfer path.

Information elements included in the EPS bearer context for each UE 10 will be described. The MME 40 stores, for each UE 10, the UE NBIFOM capability and the NBIFOM allowed.

The UE NBIFOM capability is the NBIFOM capability of the UE 10. The UE NBIFOM capability is identification information indicating whether or not the capability of establishing the first PDN connection is supported for each UE 10. In other words, the UE NBIFOM capability is identification information indicating whether or not the UE 10 supports the NBIFOM function. More specifically, for example, the UE NBIFOM capability may include "allowed" or "Not allowed".

Note that the NBIFOM function may be information indicating that it has a function of establishing the multi-access PDN connection.

Alternatively, the UE NBIFOM capability may be identification information indicating that the UE 10 has capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage unit may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with a plurality of APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the conventional PDN connection, not the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2.

The NBIFOM allowed may be stored before the PDN connection is established.

The MME 40 may access the HSS 5550 to acquire the NBIFOM allowed before the PDN connection is established and/or during the establishment procedure.

Furthermore, the EPS bearer context for each UE 10 may include the identification information of the UE 10. The identification information of the UE 10 may be IMSI.

The EPS bearer context for each PDN connection will be described. The EPS bearer context for each PDN connection includes a PDN connection ID, a network allowed mode, an operation mode, a User Plane Connection ID, an MME MAC address, and an NBIFOM permission.

The PDN connection ID is identification information for identifying a PDN connection. The UE 10, the MME 40, and the PGW 30 may store the same identification information.

The operation mode is identification information for a mode indicating which of the UE 10 or the network takes an initiative in transmitting/receiving data or is capable of starting communication control, if the PDN connection is the first PDN connection.

More specifically, for example, an operation mode in which the UE 10 can start the communication control may be the UE initiated mode.

Furthermore, an operation mode in which the network and/or the PGW 30 and/or the PCRF 60 can start the communication control may be a Network-initiated mode.

The network allowed mode indicates an operation mode allowed by the network. The network allowed mode may include the UE initiated mode or the Network-initiated mode or both of these modes.

The User Plane Connection ID is identification information identifying a connection used for user data transmission when the UE 10 establishes a transfer path through the MME 40.

The NBIFOM permission is information indicating that this PDN connection has established the multi-access PDN connection. In other words, the NBIFOM permission indicates that the first PDN connection is established.

That is, the fact that the MME 40 stores the NBIFOM permission means that this PDN connection is the first PDN connection.

The NBIFOM permission is identification information stored by the MME 40 by establishing the PDN connection.

The MME 40 may access the HSS 5550 to acquire the NBIFOM permission during the establishment of the PDN connection. Alternatively, the MME 40 may store the NBIFOM permission, based on the fact that the multi-access PDN connection has been established.

Next, the EPS bearer context for each bearer and/or transfer path will be described. The EPS bearer context for each bearer and/or transfer path may include the transfer path identification information and the routing rule.

The transfer path identification information is information for identifying a transfer path and/or bearer. The transfer path identification information may be an EPS bearer ID, for example.

The routing rule indicates an association of a routing filter and a routing address or routing access type. Based on this association, whether using a communication path through the 3GPP access network or using a communication path through the WLAN access network is determined.

Here, the routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the MME 40. Alternatively, the routing address may be an IP address of a Mobile Access Gateway (MAG).

The routing rule may be notified from the PGW 30 or the PCRF 60, or may be notified from the UE 10. Alternatively, the routing rule may be a value that the MME 40 stores beforehand as a default value.

The routing filter may include an IP header to switch an IP flow. Alternatively, the routing filter may include an application ID to switch the flow for each application. Alternatively, the routing filter may include a TFT.

The routing rule may store a plurality of rules. Furthermore, the routing rule may include priority for each rule.

The SGW capability stores identification information (NBIFOM capability) indicating whether or not capability of establishing the first PDN connection is supported for each SGW 35. In other words, it is identification information indicating whether or not the SGW 35 supports the NBIFOM function. Specifically, the NBIFOM capability may include "allowed" or "Not allowed".

Note that the NBIFOM function may be information indicating having a function of establishing the multi-access PDN connection.

Alternatively, the NBIFOM capability may be identification information indicating that it has capability of establishing the first PDN connection. That is, the existence of the NBIFOM capability in the storage unit may mean that the SGW 35 is a gateway having a function of establishing the first PDN connection. In other words, the existence of the NBIFOM capability in the storage unit may mean that the SGW 35 is a gateway supporting the NBIFOM function.

The MME 40 may store the NBIFOM capability by associating with the SGW ID.

The MME capability and the network capability may be included in the EPS bearer context.

1.3. Description of Initial State

An initial state in the present embodiment will be described. The initial state in the present embodiment may be a first initial state described later.

Note that the initial state in the present embodiment may not be limited to the first initial state.

1.3.1. Description of First Initial State

The first initial state will be described. In the first state, the UE 10 has not established the first PDN connection with the core network 90. However, the UE 10 has already established the second PDN connection. In greater detail, the UE 10 has not established the first PDN connection with a PGW_A 1310. However, the UE 10 has established the second PDN connection with a PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be constituted of a transfer path between the UE 10 and the PGW 30 through the access network A. Thus, the second PDN connection may be constituted of a transfer path obtained by combining a transfer path between the UE 10 and the eNB 45, a transfer path between the eNB 45 and the SGW 35, and a transfer path between the SGW 35 and the PGW_B 1320. Here, the transfer path may be a bearer.

As described above, in the first initial state, the UE 10 may be in a state connected to the core network 90 via the access network A.

Note that the UE 10 may not need to be connected to the core network 90 via the access network B. In other words, the UE 10 may not need to perform an attach through the WLAN access network.

Alternatively, the UE 10 may be in a state connected to the core network 90 via the access network B. In this case, the UE 10 may perform an attach procedure started with an initiative of the UE 10 to establish a third PDN connection.

Note that the third PDN connection may be established with the gateway selected by using the APN 2. Alternatively, the third PDN connection may be established with a gateway selected by using another APN different from the APN 1 and the APN 2.

The first initial state has been described above; however, the first initial state is not limited thereto, and may be, for example, a state in which the multi-access PDN connection is not established through the access network A.

1.3.2. Description of Procedure for Leading to First Initial State

Figure 15:
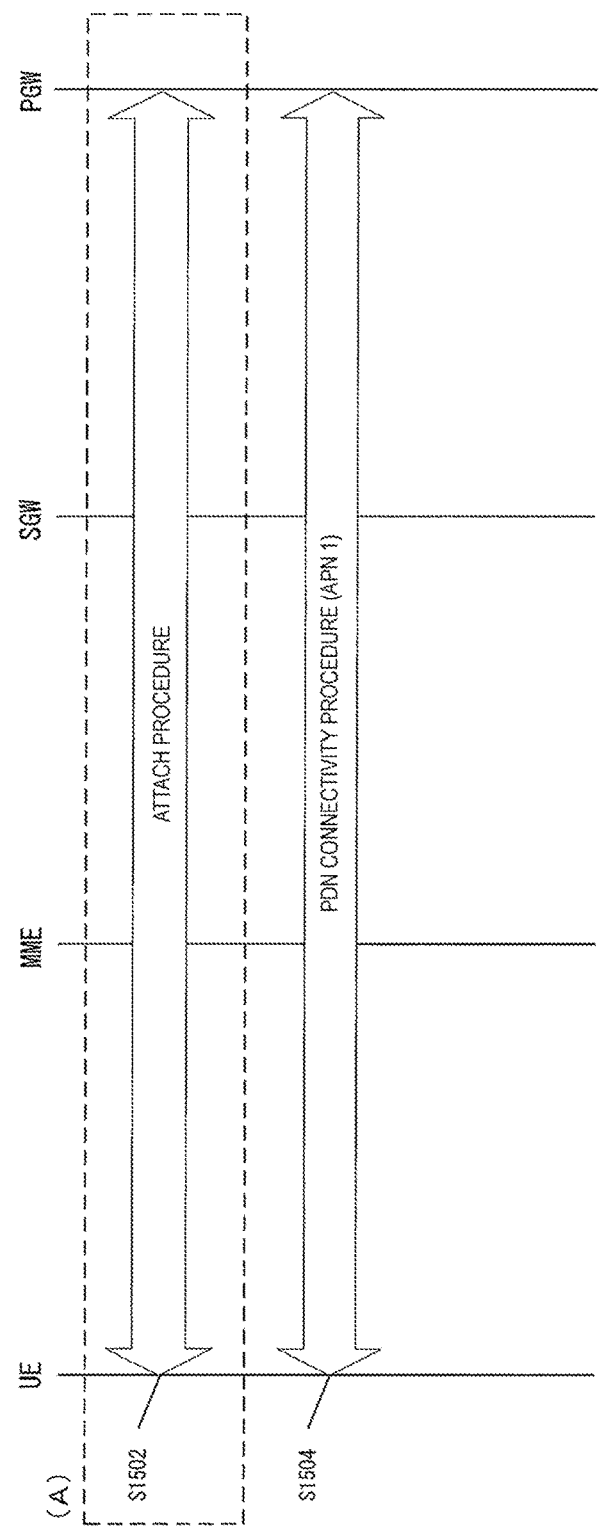
FIG. 15 is a diagram illustrating a procedure leading to an initial state.

A procedure for leading to the first initial state will be described by using FIG. 15. In the procedure for leading to the first initial state, at least a PDN connectivity procedure to the core network 90 through the access network A, illustrated by (A) in FIG. 15, is performed. The first initial state is a state after at least the attach procedure to the core network 90 through the access network A, illustrated by (A) in FIG. 15, is performed.

Next, details of the attach procedure to the core network 90 through the access network A will be described.

The UE 10 performs an attach procedure for establishing the second PDN connection with the core network 90 through the access network A. In greater detail, the UE 10 establishes, via the eNB 45 arranged in the access network A and the SGW 35 arranged in the core network 90, the PDN connection with the PGW_B 1320 arranged in the core network 90. Noted that the establishment and management of the PDN connection are performed by the MME 40 arranged in the core network 90. Furthermore, the MME 40 also performs the selection of the SGW 35 and the selection of the PGW 30 using the APN.

Specifically, when establishing the second PDN connection, the UE 10 transmits an Attach request to the MME 40 via the eNB 45. The MME 40 receives the Attach request transmitted by the UE 10. Based on the reception of the Attach request, the MME 40 performs a procedure for establishing security association with the UE 10.

Here, the UE 10 may transmit the Attach request including the APN 2. Alternatively, the UE 10 may transmit the APN 2 to the MME 40 after a security association procedure between the UE 10 and the MME 40 described later is completed.

Upon the completion of the security association procedure, the MME 40 transmits an Attach accept to the UE 10 via the eNB 45. The MME 40 may transmit an Activate default EPS bearer context request including the APN 2.

The UE 10 receives the Attach accept transmitted by the MME 40. Based on the Attach accept, the UE 10 transmits an Attach complete to the MME 40 via the eNB 45.

The MME 40 receives the Attach request transmitted by the UE 10.

1.3.3. Description of Multi-Access PDN Connection Establishment Procedure

Next, an establishment procedure of the first PDN connection will be described. Here, the initial state may be the first initial state. In the present embodiment, after the establishment of the initial state, the UE 10 performs a PDN connectivity procedure for establishing the first PDN connection with the core network 90 through the access network A. In greater detail, the UE 10 establishes, via the eNB 45 arranged in the access network A and the SGW 35 arranged in the core network 90, the first PDN connection with the PGW_A 1310 arranged in the core network 90.

Note that the first PDN connection may be constituted of a transfer path obtained by combining a transfer path between the UE 10 and the eNB 45, a transfer path between the eNB 45 and the SGW 35, and a transfer path between the eNB 45 and the PGW_A 1310. Here, the transfer path may be a bearer.

As illustrated in FIG. 15, the procedure for establishing the first PDN connection may be a PDN connectivity procedure using the APN 1.

A specific example of the PDN connectivity procedure will be described below.

1.4. Examples of PDN Connectivity Procedure

Figure 16:
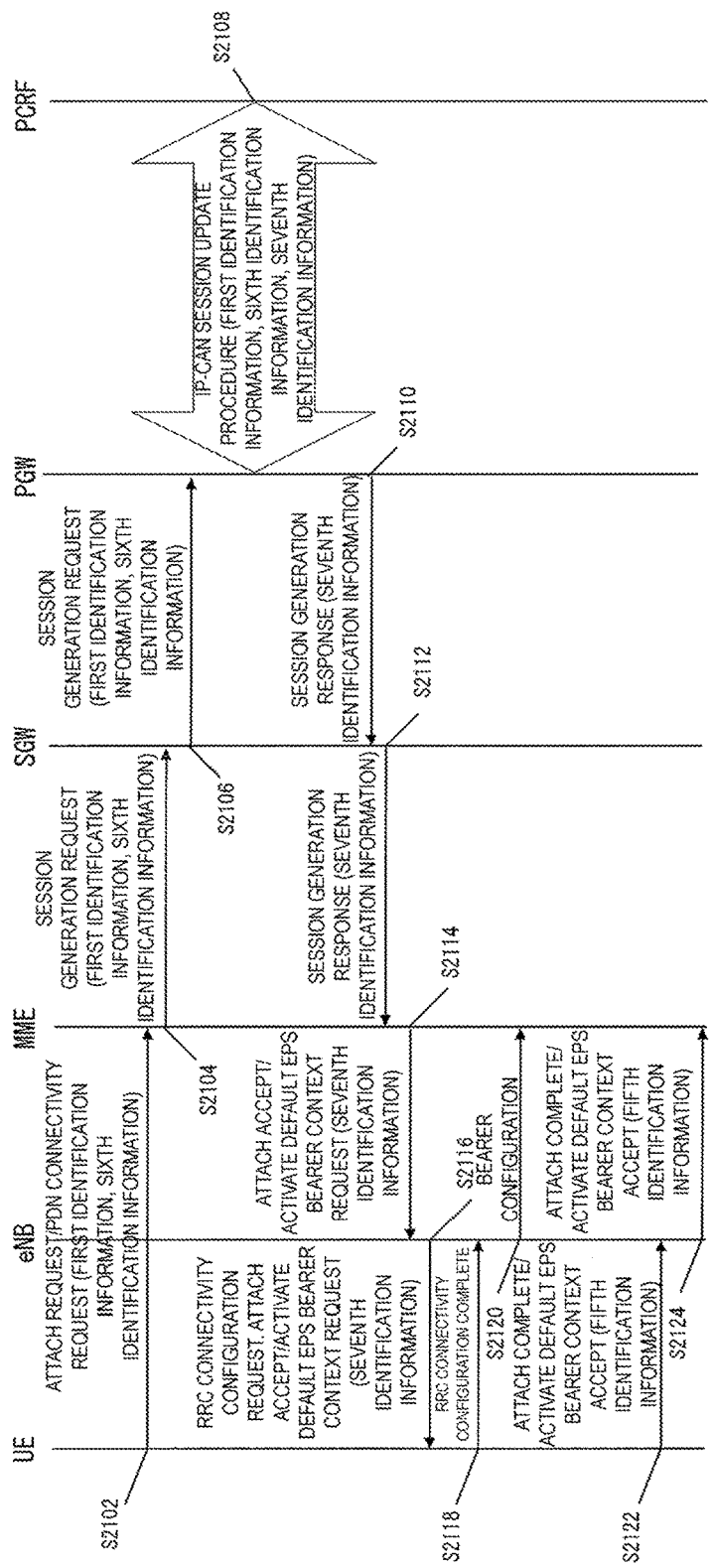
FIG. 16 is a diagram illustrating a first PDN connectivity procedure.

An example of the first PDN connectivity procedure for establishing the first PDN connection will be described by using FIG. 16.

1.4.1. Example of First PDN Connectivity Procedure

An example of the first PDN connectivity procedure will be described by using FIG. 16.

The UE 10 first transmits a PDN connectivity request to the MME 40 via the eNB 45 (S2102). The UE 10 may transmit the PDN connectivity request including at least the PDN connectivity request message identity (PDN connectivity request message ID), the Procedure transaction identity (Procedure transaction ID), the Request type, the PDN type, the Protocol discriminator, and the EPS bearer identify (EPS bearer ID). Furthermore, the UE 10 may include at least the first identification information and/or sixth identification information into the PDN connectivity request. Moreover, the UE 10 may include the Access Point Name (APN) and/or the Protocol Configuration Options (PCOs) and/or the Traffic Flow Templates (TFTs) into the PDN connectivity request. Note that the UE 10 may transmit the PCO including the first identification information and/or the sixth identification information and/or the TFT.

Here, the first identification information may be the UE NBIFOM capability representing that the UE 10 supports the NBIFOM. Note that the NBIFOM capability may be information indicating having a function of establishing the multi-access PDN connection.

In addition, the sixth identification information may be a request NBIFOM representing that the NBIFOM operation mode for the multi-access PDN connection is requested to be determined. Additionally/alternatively, the sixth identification information may be information representing that an NBIFOM operation mode allowed for the multi-access PDN connection to be established is requested.

As described above, the UE 10 may transmit the PDN connectivity request including the first identification information and/or sixth identification information to request the establishment of the multi-access PDN connection, without requesting a certain NBIFOM operation mode.

The PDN connectivity request message ID may be the message type representing the PDN connectivity request message. The Procedure transaction ID may be information identifying the PDN connectivity procedure.

The APN may be an APN to which the UE 10 requests connection. More specifically, the APN may be the APN 1. The UE 10 may include the APN 1 to establish the multi-access PDN connection. Here, the APN 1 may be an APN that is allowed to establish the multi-access PDN connection and/or an APN that is allowed to perform communication based on the NBIFOM.

The Request type may be information identifying the type of the PDN connectivity procedure to be requested. For example, since the UE 10 performs an initial connection by using the APN 1, the Request type may be the type indicating an attach, not the type indicating a handover.

The PDN type may indicate an available IP version. For example, the PDN type may be the IPv4, may be the IPv6, or may be the IPv4v6.

The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information to be requested. Note that the UE 10 may transmit the PCO including the first identification information.

The TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that in the present example, in accordance with the transmission of the PDN connectivity request, the UE 10 does not request a certain NBIFOM operation mode, and thus, the UE 10 may transmit the PDN connectivity request without including the TFT. In other words, if the UE 10 requests the establishment of the multi-access PDN connection without requesting the certain NBIFOM operation mode, the UE 10 may transmit the PDN connectivity request without including the TFT. More specifically, if the UE 10 includes the first identification information and/or the sixth identification information, the UE 10 may transmit the PDN connectivity request without including the TFT.

Note that conventionally, the UE 10 can perform transmission by including information indicating the IFOM support in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, by including the information indicating the IFOM support in the PCO, the UE 10 can switch the access network through which the communication of a certain IP flow is performed.

In the present embodiment, if the UE 10 includes the first identification information and the sixth identification information in the PCO, the UE 10 does not include the IFOM support. In contrast, if the UE 10 includes the IFOM support into the PCO, the UE 10 does not include the first identification information and/or the sixth information. As described above, it may be possible to not configure both of the first identification information and the IFOM support to be effective to ensure a clear distinction between use of the switching of the communication path on the basis of the NBIFOM and that of the switching of the communication path on the basis of the IFOM.

Thus, the UE 10 can establish either one of the PDN connection supporting the IFOM or the PDN connection supporting the NBIFOM, through the establishment procedure of a single PDN connection. In other words, the single PDN connection is any one of the PDN connection supporting the NBIFOM, the PDN connection supporting the IFOM, or the single-access PDN connection.

The MME 40 receives the PDN connectivity request transmitted by the UE 10. Based on the reception of the PDN connectivity request and/or the first identification information and/or sixth identification information included in the PDN connectivity request, the MME 40 transmits a session generation request to the SGW 35 (S2104).

Based on the reception of the PDN connectivity request and/or the first identification information and/or sixth identification information included in the PDN connectivity request, the MME 40 may transmit the session generation request (create session request) including at least the first identification information and/or sixth identification information.

Furthermore, the MME 40 may include the TFT into the session generation request, on the basis of the reception of the TFT transmitted by the UE 10.

Furthermore, the TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that if both of the first identification information and the sixth identification information are not included in the PDN connectivity request, the MME 40 may transmit the session generation request without including the first identification information and/or the sixth identification information. Moreover, if the first identification information and/or the sixth identification information is not included in the PDN connectivity request, the MME 40 may perform a procedure for establishing the single-access PDN connection.

The SGW 35 receives the session generation request transmitted by the MME 40. Based on the reception of the session connectivity request, and/or the first identification information and/or sixth identification information included in the session connectivity request, the SGW 35 transmits the session generation request to the PGW 30 (S2106).

Based on the reception of the session connectivity request and/or the first identification information and/or sixth identification information included in the session connectivity request, the SGW 35 may transmit the session generation request including at least the first identification information and/or sixth identification information.

Furthermore, the SGW 35 may include the TFT into the session generation request.

Furthermore, the TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that if both of the first identification information and the sixth identification information are not included in the PDN connectivity request, the SGW 35 may transmit the session generation request without including the first identification information and/or the sixth identification information. Moreover, if the first identification information and/or the sixth identification information is not included in the PDN connectivity request, the MME 40 may perform a procedure for establishing the single-access PDN connection.

The PGW 30 receives the session generation request transmitted by the SGW 35. Based on the reception of the session generation request, and/or the first identification information and/or sixth identification information included in the session generation request, the PGW 30 may perform the IP-CAN session update procedure with the PCRF 60 (S2108).

Based on the reception of the session generation request and/or the first identification information and/or sixth identification information included in the session generation request, the PGW 30 may perform the IP-CAN session update procedure including at least the first identification information and/or the sixth identification information.

Note that the PGW 30 may perform the IP-CAN session update procedure to notify the PCRF 60 of information of the UE 10 and/or eNB 45 and/or MME 40 and/or SGW 35.

The PGW 30 may transmit, to the PCRF 60, a control message in the IP-CAN session procedure, including information indicating whether the PDN connection to be established is the multi-access PDN connection or the single-access PDN connection, and/or the first identification information, and/or the sixth identification information.

More specifically, if the multi-access PDN connection is to be established, the PGW 30 transmits, to the PCRF 60, the information indicating the access network A, the PDN connection ID, the information indicating that the PDN connection is the multi-access PDN connection, and the first identification information and/or sixth identification information. Alternatively, if the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information uniquely identifying the PDN connection that the UE 10 establishes with the PGW 30.

Furthermore, based on the reception of the first identification information and/or sixth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Based on the reception of the session generation request or the completion of the IP-CAN session update procedure, and/or the first identification information and/or sixth identification information included in the session generation request, and/or the seventh identification information included in the IP-CAN session update procedure, the PGW 30 transmits a session generation response (create session response) to the SGW 35 (S2110).

Based on the reception of the session generation request or the completion of the IP-CAN session update procedure, and/or the first identification information and/or sixth identification information included in the session generation request, and/or the seventh identification information included in the IP-CAN session update procedure, the PGW 30 may transmit the session generation response including at least the seventh identification information.

Furthermore, the PGW 30 may include the PDN Address and/or the PDN connection ID and/or the TFT into the session generation response.

Note that a method by which the PGW 30 acquires the seventh identification information is not limited to the above-described method for acquiring the seventh identification information from the PCRF 60 through the IP-CAN session update procedure, and another example may be employed. For example, the PGW 30 may generate the seventh identification information and transmit the session generation response including the seventh identification information, without acquiring the seventh identification information from the PCRF 60 through the IP-CAN session update procedure.

Here, the seventh identification information may be the allowed mode representing the NBIFOM operation mode that is allowed for the multi-access PDN connection to be established. In other words, the seventh identification information may be an operation mode allowed by the operator.

Note that the PCRF 60 or the PGW 30 may determine the allowed mode or the seventh identification information, on the basis of the operator policy. For example, a policy that allows the establishment of only the PDN connection of the UE-initiated mode, a policy that allows the establishment of only the PDN connection of the network-initiated mode, a policy that allows the establishment of both modes, a policy that prohibits the establishment of both modes, and the like may be managed.

Note that the PCRF 60 or the PGW 30 may acquire the operator policy from the HSS 55 and the like. Alternatively, an operator policy generated by an administrator may be stored.

In addition, for the operator policy, a policy different for each subscriber may be managed. Alternatively, a policy different for each APN may be managed. For example, for each APN, a different allowed mode for the PDN connection to be established may be managed.

Based on the allowed mode, the PCRF 60 or the PGW 30 may include the allowed operation mode into the seventh identification information.

In other words, if only the Network-initiated mode is allowed, the PCRF 60 or the PGW 30 may include the Network-initiated mode into the seventh identification information. Alternatively, if only the UE-initiated mode is allowed, the PCRF 60 or the PGW 30 may include the UE-initiated mode into the seventh identification information.

Note that if both of the UE-initiated mode and the Network-initiated mode are allowed, the seventh identification information may include both operation modes. Alternatively, if both of the UE-initiated mode and the Network-initiated mode are allowed and a default operation mode is configured, the seventh identification information may include only the default operation mode. Note that which of the UE-initiated mode and the Network-initiated mode is defined as the default operation mode may be configured based on the operator policy.

Note that, if the establishment of the PDN connection of all operation modes is not allowed, the PCRF 60 may transmit, to the PGW 30, the cause information indicating that the Requested Operation Mode is not allowed.

If the establishment of the PDN connection of all operation modes is not allowed, the PGW 30 may not need to notify, via the SGW 35, the MME 40 of the seventh identification information.

If the establishment of the PDN connection of all operation modes is not allowed, the PGW 30 may transmit, to the MME 40 via the SGW 35, the session generation response including the cause information indicating that the Requested Operation Mode is not allowed.

If the establishment of the PDN connection of all operation modes is not allowed, the PGW 30 may notify, via the SGW 35, the MME 40 that there is no allowed operation.

As described above, based on the allowed mode, the PCRF 60 or the PGW 30 may regard an operation mode that is allowed to establish the PDN connection as the seventh identification information.

Note that if the Network-initiated mode is not included in the seventh identification information, the PCRF 60 may not need to transmit the TFT to the PGW 30.

In other words, only if the Network-initiated mode is included in the seventh identification information, the PCRF 60 may transmit the TFT to the PGW 30.

Note that if the Network-initiated mode is not included in the seventh identification information, the PGW 30 may not need to transmit the TFT to the MME 40 via the SGW 35. Thus, in this case, the PGW 30 may not need to include the TFT into the session generation response.

In other words, only if the Network-initiated mode is included in the seventh identification information, the PGW 30 may transmit the TFT to the MME 40 via the SGW 35. Thus, in this case, the PGW 30 may include the TFT into the session generation response.

The PDN Address may be an IP address assigned to the UE 10. For example, the PDN Address may be the IPv4 address, or may be the IPv6 prefix and an interface ID for constituting an IPv6 address. Here, the PGW 30 may assign the IP address of the UE 10. Moreover, the PGW 30 may include the IP address assigned to the UE 10 into the PDN Address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The SGW 35 receives the session generation response transmitted by the PGW 30. Based on the reception of the session generation response and/or the seventh identification information included in the session generation response, the SGW 35 transmits the session generation response to the MME 40 (S2112).

Based on the reception of the session generation response and/or the seventh identification information included in the session generation response, the SGW 35 may transmit the session generation response including at least the seventh identification information.

Furthermore, the SGW 35 may include the PDN Address and/or the PDN connection ID and/or the TFT into the session request response.

The MME 40 receives the session generation response transmitted by the SGW 35. Based on the reception of the session generation response and/or the seventh identification information included in the session generation response, the MME 40 transmits an Activate default EPS bearer context request to the eNB 45 (S2114).

Based on the reception of the session generation response and/or the seventh identification information included in the session generation response, the MME 40 may transmit the Activate default EPS bearer context request including at least the Activate default EPS bearer context request message identity (Activate default EPS bearer context request message ID), the Procedure transaction ID, the APN, the PDN Address, the Protocol discriminator, the EPS bearer ID, and the EPS QoS. Furthermore, the MME 40 may include at least the seventh identification information into the Activate default EPS bearer context request. Moreover, the MME 40 may include the PCO and/or an ESM cause and/or the TFT and/or the PDN connection ID and/or PDN connection attribute information into the Activate default EPS bearer context request. Note that the MME 40 may transmit the PCO including the seventh identification information and/or the TFT and/or the PDN connection ID.

Here, the Activate default EPS bearer context request message ID may be the message type representing the Activate default EPS bearer context request message.

The APN may be an APN to which the UE 10 is allowed to be connected. More specifically, the APN may be the APN 1. The APN 1 may be an APN that is allowed to establish the multi-access PDN connection. The MME 40 may include the APN 1 into the Activate default EPS bearer context request.

The PDN Address may be an IP address assigned to the UE 10. For example, the PDN Address may be the IPv4 address, or may be the interface ID for constituting the IPv6 address.

The EPS QoS may be a state representing QoS of the EPS bearer.

The PDN connection attribute information may be information indicating that the PDN connection established through the present PDN connectivity procedure is the multi-access PDN connection, and/or information indicating that user data transmitted/received by using the PDN connection established through the present PDN connectivity procedure is allowed to be transmitted/received through the access network A and the access network B, and/or information indicating that the PDN connection established through the present PDN connectivity procedure is the multi-access PDN connection of the operation mode indicated by the seventh identification information.

Note that the UE 10 may transmit the Activate default EPS bearer context request message, further including the connectivity type indicating the type of the PDN connection and/or the WLAN offload permission information (WLAN offload acceptability) indicating whether or not the WLAN offload can be performed. Furthermore, the MME 40 may transmit the connectivity type or the WLAN offload permission information including the PDN connection attribute information.

The ESM cause may be information representing that the PDN type of the PDN Address assigned to the UE 10 is different from the PDN type requested by the UE 10 in the PDN connectivity request.

Note that the MME 40 and/or the PGW 30 may include the seventh identification information into the PCO. However, if the MME 40 and/or the PGW 30 includes the seventh identification information into the PCO, the MME 40 and/or the PGW 30 does not include the IFOM support. In contrast, if the MME 40 and/or the PGW 30 includes the IFOM support into the PCO, the MME 40 and/or the PGW 30 does not include the seventh identification information. As described above, it may be possible to not configure both of the seventh identification information and the IFOM support to be effective to ensure a clear distinction between use of the switching of the communication path on the basis of the NBIFOM and that of the switching of the communication path on the basis of the IFOM.

The eNB 45 receives the Activate default EPS bearer context request transmitted by the MME 40. Based on the reception of the Activate default EPS bearer context request, the eNB 45 transfers the Activate default EPS bearer context request to the UE 10.

The eNB 45 may transmit, to the UE 10, at least an RRC connectivity configuration request (RRC Connection Reconfiguration), together with the Activate default EPS bearer context request (S2116).

The UE 10 receives the RRC connectivity configuration request transmitted by the eNB 45. Furthermore, the UE 10 receives the Activate default EPS bearer context request that is transmitted by the MME 40 and transferred by the eNB 45.

Based on the reception of the RRC connectivity configuration request, the UE 10 transmits an RRC connectivity configuration complete (RRC Connection Reconfiguration Complete) to the eNB 45 (S2118).

The eNB 45 receives the RRC connectivity configuration complete transmitted by the UE 10. Based on the RRC connectivity configuration complete, the eNB 45 transmits a bearer configuration to the MME 40. The MME 40 receives the bearer configuration transmitted by the eNB 45 (S2120).

Based on the reception of the Activate default EPS bearer context request and/or the seventh identification information included in the Activate default EPS bearer context request, the UE 10 transmits an activate default EPS bearer context accept to the MME 40 (S2122) (S2124).

The UE 10 may transmit the activate default EPS bearer context accept including at least the activate default EPS bearer context accept message identity (activate default EPS bearer context accept message ID), the Procedure transaction ID, the Protocol discriminator, and the EPS bearer ID.

Furthermore, the UE 10 may include the PCO into the activate default EPS bearer context accept.

Furthermore, if a plurality of INFOM operation modes are included in the seventh identification information, the UE 10 may include at least the fifth identification information into the activate default EPS bearer context accept. In other words, if the plurality of INFOM operation modes are allowed, the UE 10 may select one mode of the allowed modes and transmit the fifth identification information including the one mode. Here, the fifth identification information may be the mode indication representing an NBIFOM operation mode for the multi-access PDN connection, the establishment of the multi-access PDN connection being requested by the UE 10. Note that the UE 10 may include the UE-initiated mode or the Network-initiated mode into the fifth identification information.

Specifically, if the UE-initiated mode and the Network-initiated mode are included in the seventh identification information included in the Activate default EPS bearer context request, the UE 10 may include the UE-initiated mode or the Network-initiated mode into the fifth identification information.

Which of the UE-initiated mode and the Network-initiated mode is to be included into the fifth identification information may be determined on the basis of the UE policy.

Note that the UE policy may be any information configured to the UE 10. For example, the UE policy may be information configured by a user.

Here, the activate default EPS bearer context accept message ID may be the message type representing the activate default EPS bearer context accept message.

After the first PDN connectivity procedure is completed, the UE 10 and the PGW 30 establish the first PDN connection of the operation mode determined by the operator policy. Alternatively, the UE 10 establishes the first PDN connection of an operation mode selected from one of the operation modes allowed by the operator policy. Note that based on the reception of the Activate default EPS bearer context request and/or the PDN connection attribute information and/or the seventh identification information and/or the operation mode selected based on the seventh identification information, the UE 10 may identify the NBIFOM operation mode for the established PDN connection. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified based on the TFT. More specifically, the UE 10 and the PGW 30 transmit/receive a flow identified based on the TFT by using the first PDN connection.

Note that in the example of the first PDN connectivity procedure, a case has been described in which the transmission/reception of the TFT is included in the PDN connectivity procedure; however, the example is not limited thereto. The transmission/reception of the TFT may be performed after the multi-access PDN connection is established.

Therefore, the UE 10 and the MME 40 may perform transmission/reception without including the TFT into the PDN connectivity request and/or the Activate default EPS bearer context request, and establish the multi-access PDN connection. In other words, at the time point when the PDN connection is established, there may be no IP flow transmitting/receiving user data by using the PDN connection. In this case, the UE 10 and the MME 40 transmit the TFT after the multi-access PDN connection is established.

More specifically, if the PDN connection of the UE-initiated mode is established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified based on the TFT.

Meanwhile, if the PDN connection of the Network-initiated mode is established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45.

Thus, the UE 10 and the PGW 30 can determine a PDN connection and/or a transfer path (such as an EPS bearer) for transmitting/receiving the IP flow by using the TFT, and transmit/receive user data corresponding to the IP flow identified based on the TFT.

Furthermore, in the example of the first PDN connectivity procedure, a case has been described in which the UE 10 and the PGW 30 establish the first PDN connection of the operation mode selected by the UE 10 from one of the operation mode determined by the operator policy and the operation mode allowed by the operator policy; however, the example is not limited thereto. The UE 10 may reject the establishment of the first PDN connection.

For example, if the UE 10 does not support the operation mode allowed by the operator policy and/or if the operation mode allowed by the operator policy does not comply with the policy of the UE 10, the UE 10 may reject the establishment of the first PDN connection.

In greater detail, based on the reception of the Activate default EPS bearer context request and/or the seventh identification information included in the Activate default EPS bearer context request and/or the PDN connection attribute information and/or the policy of the UE 10, the UE 10 may transmit the Activate default EPS bearer context reject to the MME 40 via the eNB 45.

The UE 10 may transmit the Activate default EPS bearer context reject including at least the Activate default EPS bearer context reject message identity (Activate default EPS bearer context reject message ID), the Procedure transaction ID, the Protocol discriminator, the EPS bearer ID, and the ESM cause. Furthermore, the UE 10 may further include fourth identification information into the Activate default EPS bearer context reject. Furthermore, the UE 10 may further include the PCO into the Activate default EPS bearer context reject. Note that the UE 10 may transmit the PCO including the fourth identification information.

The fourth identification information may be information representing that the UE 10 does not support the operation mode allowed by the operator policy and/or information representing that the operation mode allowed by the operator policy does not comply with the policy of the UE 10.

The Activate default EPS bearer context reject message ID may be the message type representing the Activate default EPS bearer context reject message.

The ESM cause may be information representing a reason why the Activate default EPS bearer context request is rejected. Here, the UE 10 may notify the UE 10 of the fourth identification information by including the information into the ESM cause.

The MME 40 may receive the Activate default EPS bearer context reject transmitted by the UE 10. Based on the reception of the Activate default EPS bearer context reject and/or the fourth identification information included in the Activate default EPS bearer context reject, the MME 40 may delete the EPS bearer context, held by the MME 40, relating to the established PDN connection. Furthermore, the MME 40 may transmit, to the SGW 35, the fourth identification information included in the Activate default EPS bearer context reject.

The SGW 35 may receive the fourth identification information transmitted by the MME 40. Based on the reception of the fourth identification information and/or the operator policy, the SGW 35 may delete the EPS bearer context, held by the SGW 35, relating to the established PDN connection.

Furthermore, the SGW 35 may transmit, to the PGW 30, the fourth identification information received from the MME 40.

The PGW 30 may receive the fourth identification information transmitted by the SGW 35. Based on the reception of the fourth identification information and/or the operator policy, the PGW 30 may delete the EPS bearer context, held by the PGW 30, relating to the established PDN connection.

Furthermore, the PGW 30 may perform the IP-CAN session update procedure with the PCRF 60, on the basis of the reception of the fourth identification information. The PGW 30 may include the fourth identification information into the IP-CAN session update procedure.

The PCRF 60 may change the operator policy, on the basis of the IP-CAN session update procedure. Note that based on the change of the operator policy, the PGW 30 may delete the EPS bearer context, held by the PGW 30, relating to the established PDN connection.

Note that if the multi PDN connection is established, it is possible to perform a procedure for adding a new transfer path. Meanwhile, if the single-access PDN connection is established, it is possible to change the transfer path, but not possible to perform a procedure for adding a transfer path.

1.4.2. Description of State After PDN Connection Establishment Procedure

Performing the above-described first to first PDN connectivity procedure leads to a first state and a second state described later.

Note that an initial state in the additional attach procedure may be the second state. The initial state in the additional attach procedure may not be limited to the second state.

1.4.3. Description of First State

Figure 13:
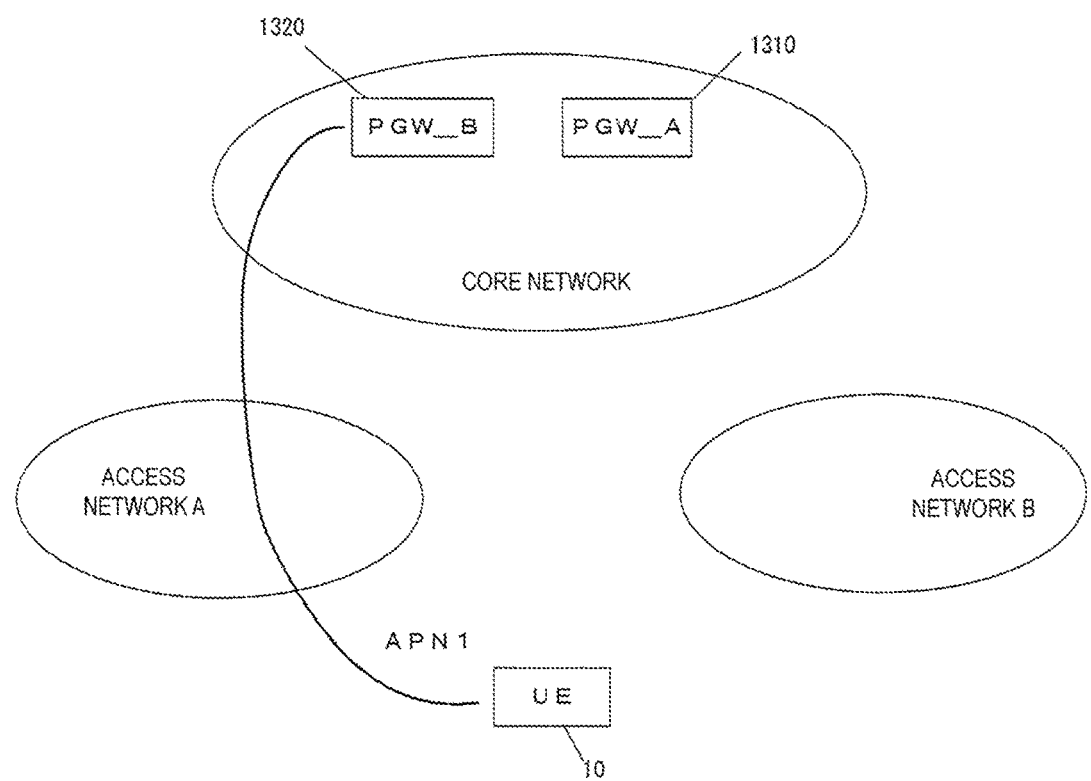
FIG. 13 is a diagram illustrating a state from a first initial state to a state after a PDN connectivity procedure is completed.

The first state will be described by using FIG. 13. In the first state, the UE 10 has established the first PDN connection with the core network 90. However, the UE 10 has not yet established the second PDN connection. In greater detail, the UE 10 has established the first PDN connection with the PGW_A 1310. However, the UE 10 has not established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network A. Thus, the first PDN connection may be constituted of a transfer path obtained by combining a transfer path between the UE 10 and the eNB 45, a transfer path between the eNB 45 and the SGW 35, and a transfer path between the SGW 35 and the PGW_A 1310. Here, the transfer path may be a bearer.

As described above, in the first state, the UE 10 may be in a state in which the multi-access PDN connection is established via the access network A. In addition, in the first state, the UE 10 may be in a state not connected to the core network 90 via the access network B.

Note that the UE 10 may not need to establish the single-access PDN connection via the access network A.

Alternatively, the UE 10 may be in a state in which the single-access PDN connection is established via the access network A. In this case, the UE 10 may perform, in the LTE access network, the attach procedure in the single-access PDN connection started with an initiative of the UE 10 or the PDN connectivity procedure, to establish the third PDN connection.

Note that the third PDN connection may be established with the gateway selected by using the APN 2. Alternatively, the third PDN connection may be established with a gateway selected by using another APN different from the APN 1 and the APN 2.

The first state has been described above; however the first state is not limited thereto, and may be, for example, a state in which the multi-access PDN connection is established through the access network A and the PDN connection is not established through the access network B.

1.4.4. Description of Second State

Figure 14:
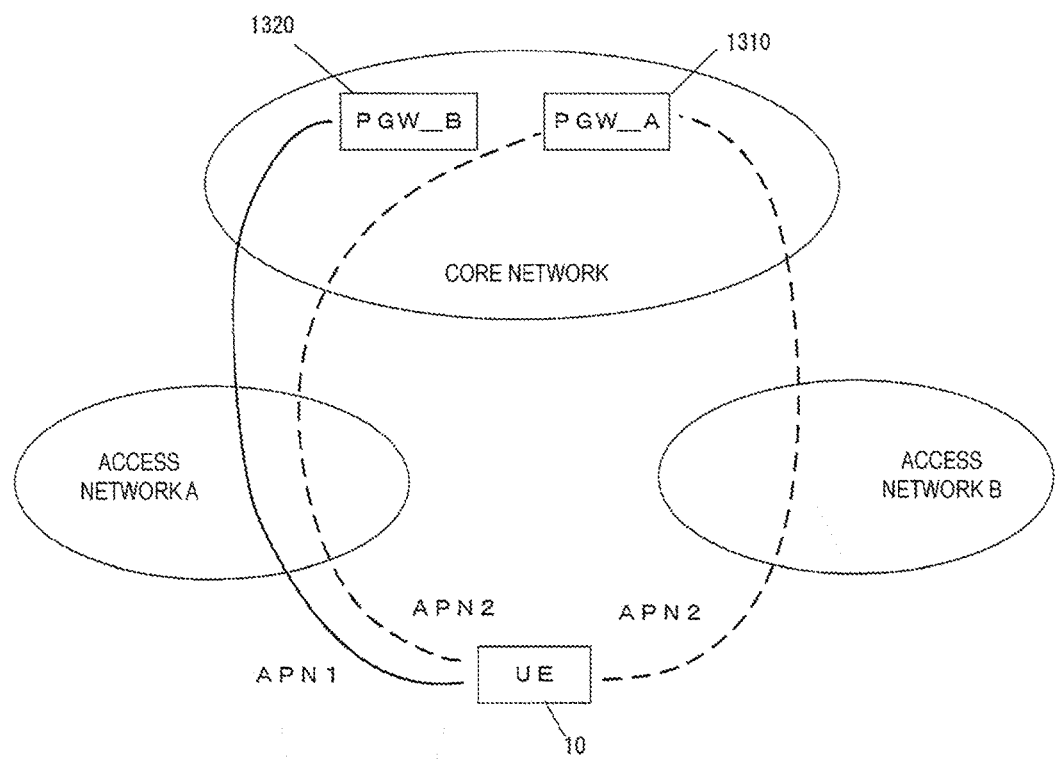
FIG. 14 is a diagram illustrating a state from a second initial state to a state after the PDN connectivity procedure is completed.

The second state will be described by using FIG. 14. In the second state, the UE 10 has established the first PDN connection with the core network 90. Furthermore, the UE 10 has established the second PDN connection with the core network 90. In greater detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network A. Thus, the first PDN connection may be constituted of a transfer path obtained by combining a transfer path between the UE 10 and the eNB 45, a transfer path between the eNB 45 and the SGW 35, and a transfer path between the SGW 35 and the PGW_A 1310. Here, the transfer path may be a bearer.

In addition, the second PDN connection may be constituted of a transfer path between the UE 10 and the PGW 30 through the access network B. Thus, the second PDN connection may be constituted of a transfer path between the UE 10 and the TWAG 74 and a transfer path between the TWAG 74 and the PGW_B 1320. Here, the transfer path may be a bearer.

As described above, in the first state, the UE 10 may be in a state in which the multi-access PDN connection is established via the access network A.

Furthermore, the UE 10 may be in a state in which the single-access PDN connection is established via the access network B.

Note that the UE 10 may not need to establish the single-access PDN connection via the access network A.

Alternatively, the UE 10 may be in a state in which the single-access PDN connection is established via the access network A. In this case, the UE 10 may perform, in the LTE access network, the attach procedure in the single-access PDN connection started with an initiative of the UE 10 or the PDN connectivity procedure, to establish the third PDN connection.

Note that the third PDN connection may be established with the gateway selected by using the APN 2. Alternatively, the third PDN connection may be established with a gateway selected by using another APN different from the APN 1 and the APN 2.

The second state has been described above; however the second state is not limited thereto, and may be, for example, a state in which the multi-access PDN connection is established through the access network B and the single-access PDN connection is established through the access network A.

1.5. Additional Attach Procedure

Hereinafter, the additional attach procedure will be described.

The additional attach procedure is a procedure for adding, on the basis of a function of the multi PDN connection capable of constituting multiple transfer paths, a transfer path constituted in the multi PDN connection.

Specifically, the purpose of the procedure is to add a transfer path through the access network B to the multi-access PDN connection including only a transfer path through the access network A.

For example, if describing the operation mode of the first PDN connection being the Network-initiated mode, in another way, it means that flow switching and/or update of the routing rule for the PDN connection, which are initiated by the UE 10, are not possible. On the other hand, the PDN connectivity procedure and/or the attach procedure are initiated by the UE 10.

As described above, the second state is a state in which the UE 10 has established the first PDN connection only through the access network A. In other words, the transfer path through the access network B is not included in the first PDN connection. Note that the transfer path may be a bearer and/or a communication path.

Therefore, if the first PDN connection in the second state is in the Network-initiated mode, it is not possible for the network and/or the PCRF 60 to include the transfer path through the access network B to the first PDN connection.

Therefore, the UE 10 may perform a procedure to establish the transfer path though the access network B on the basis of state transition to the second state and the operation mode being the Network-initiated mode.

In addition, if the operation mode of the first PDN connection in the second state is the UE-initiated mode, the UE 10 may perform the establishment procedure to establish the transfer path though the access network B on the basis of the routing rule stored in the UE 10.

Specifically, if the routing rule of the first PDN connection indicates a priority for a WLAN access, the UE 10 may perform a procedure for adding the transfer path through the access network B to the first PDN connection.

More specifically, if the UE 10 stores the routing rule in which a specific flow and a WLAN access are associated with each other with respect to the first PDN connection, the UE 10 may perform the procedure for adding the transfer path through the access network B.

In other words, if the routing rule of the first PDN connection does not indicate a priority for a WLAN access, the UE 10 does not perform the procedure for adding the transfer path through the access network B to the first PDN connection.

More specifically, if the UE 10 does not store the routing rule in which a specific flow and a WLAN access are associated with each other with respect to the first PDN connection, the UE 10 does not perform the procedure for adding the transfer path through the access network B.

Hereinafter, details of the procedure will be described.

1.5.1 Example of Second Additional Attach Procedure

Figure 17:
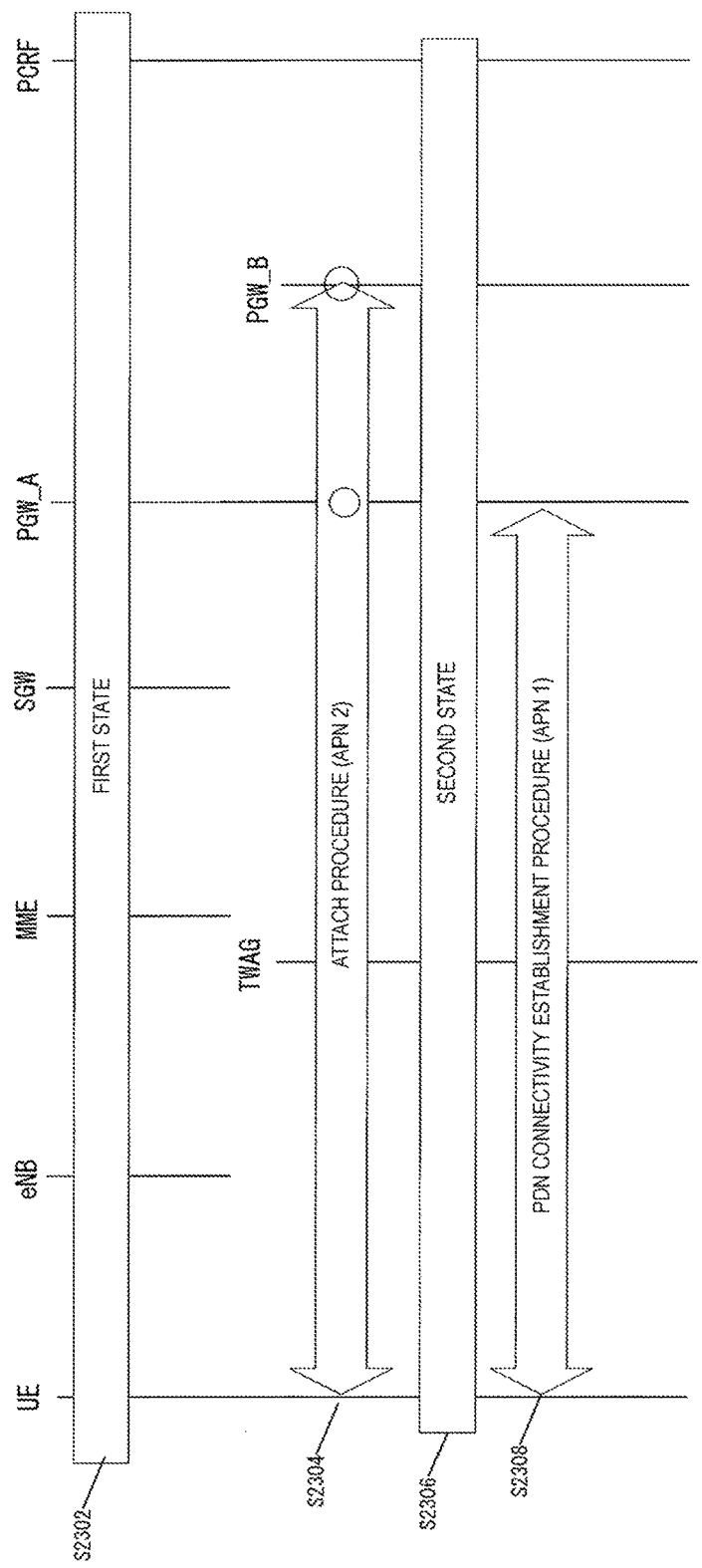
FIG. 17 is a diagram illustrating a first additional attach procedure.

Next, an example of the second additional attach procedure will be described by using FIG. 17. As illustrated in the figure, an initial state of the example of the present procedure is a first initial (S2302). Note that the procedure for changing a state into the first state may be the same as the procedure described above, and thus detailed descriptions will be omitted.

The first state may be a state in which the UE 10 has established the first PDN connection with the PGW 30 and/or the network through the access network A. Specifically, the first initial state is a state in which the UE 10 has established the first PDN connection with the PGW_A selected by using the APN 1 through the eNB 45 and the SGW 35. Note that the first PDN connection may be the multi-access PDN connection.

The UE 10 performs the attach procedure through the access network B, on the basis of the transition to the first state and establishment of the first PDN connection in the Network-initiated mode (S2304).

Alternatively, the UE 10 may perform the attach procedure through the access network B on the basis of the transition to the first initial state in which the first PDN connection in the UE-initiated mode has been established and the routing rule.

Specifically, on the basis of the routing rule indicating a priority for a WLAN access, the UE 10 may perform the attach procedure through the access network B.

Specifically, if the state is changed to the first initial state in which the first PDN connection in the UE-initiated mode has been established and the routing rule of the first PDN connection indicates a priority for a WLAN access, the UE 10 may perform the attach procedure through the access network B.

More specifically, if the state is changed to the first initial state in which the first PDN connection in the UE-initiated mode has been established and the UE 10 stores the routing rule in which a specific flow and a WLAN access are associated with each other with respect to the first PDN connection, the UE 10 may perform the attach procedure through the access network B.

In other words, if the routing rule of the first PDN connection does not indicate a priority for a WLAN access even when the state is changed to the first initial state in which the first PDN connection in the UE-initiated mode has been established, the UE 10 does not perform the attach procedure through the access network B.

More specifically, if the UE 10 does not store the routing rule in which a specific flow and a WLAN access are associated with each other with respect to the first PDN connection even when the state is changed to the first initial state in which the first PDN connection in the UE-initiated mode has been established, the UE 10 does not perform the attach procedure through the access network B.

The UE 10 may transmit the Attach request including at least the APN and/or the PDN connection ID.

The APN may be an APN to which the UE 10 requests connection. More specifically, the APN may be the APN 2. The UE 10 may include the APN 2 to establish the single-access PDN connection. Here, the APN 2 may be an APN that is not allowed to establish the multi-access PDN connection and/or an APN that is not allowed to perform communication based on the NBIFOM.

In other words, the UE 10 may request the establishment of the single access PDN connection using the APN 2 different from the APN 1 acquired from the network when establishing the first PDN connection.

The PDN connection ID may be an ID assigned when the PGW 30 establishes the PDN connection in the PDN connectivity procedure, or may be information uniquely identifying the PDN connection that the UE 10 establishes with the PGW 30.

Note that the UE 10 performs authentication and a security association procedure with the MME 40, the PGW_A and the PGW_B during the attach procedure.

The UE 10 may acquire the APN from the network upon completion of the attach procedure.

The APN may be an APN to which the UE 10 requests connection. More specifically, the APN may be the APN 2. The UE 10 may include the APN 2 to establish the single-access PDN connection. Here, the APN 2 may be an APN that is not allowed to establish the multi-access PDN connection and/or an APN that is not allowed to perform communication based on the NBIFOM.

In other words, the UE 10 may establish the single access PDN connection using the APN 2 different from the APN 1 acquired from the network when establishing the first PDN connection.

Through the above-described processes, the UE 10 and the core network 90 change their states from the first state to the second state (S2306).

Next, the UE 10 performs the PDN connectivity procedure through the access network B on the basis of the transition to the second state and establishment of the first PDN connection in the Network-initiated mode (S2308).

Alternatively, the UE 10 may perform the PDN connectivity procedure through the access network B on the basis of the transition to the second state and the routing rule of the first PDN connection established in the UE-initiated mode.

Specifically, on the basis of the routing rule indicating a priority for a WLAN access, the UE 10 may perform the attach procedure through the access network B.

Specifically, if the state is changed to the second state in which the first PDN connection in the UE-initiated mode has been established and the routing rule of the first PDN connection indicates a priority for a WLAN access, the UE 10 may perform a procedure for adding a transfer path through the access network B to the first PDN connection.

More specifically, if the state is changed to the second state in which the first PDN connection in the UE-initiated mode has been established and the UE 10 stores the routing rule in which a specific flow and a WLAN access are associated with each other with respect to the first PDN connection, the UE 10 may perform the procedure for adding the transfer path through the access network B.

In other words, if the routing rule of the first PDN connection does not indicate a priority for a WLAN access even when the state is changed to the second state in which the first PDN connection in the UE-initiated mode has been established, the UE 10 does not perform the procedure for adding the transfer path through the access network B to the first PDN connection.

More specifically, if the UE 10 does not store the routing rule in which a specific flow and a WLAN access are associated with each other with respect to the first PDN connection even when the state is changed to the second state in which the first PDN connection in the UE-initiated mode has been established, the UE 10 does not perform the procedure for adding the transfer path through the access network B.

Figure 18:
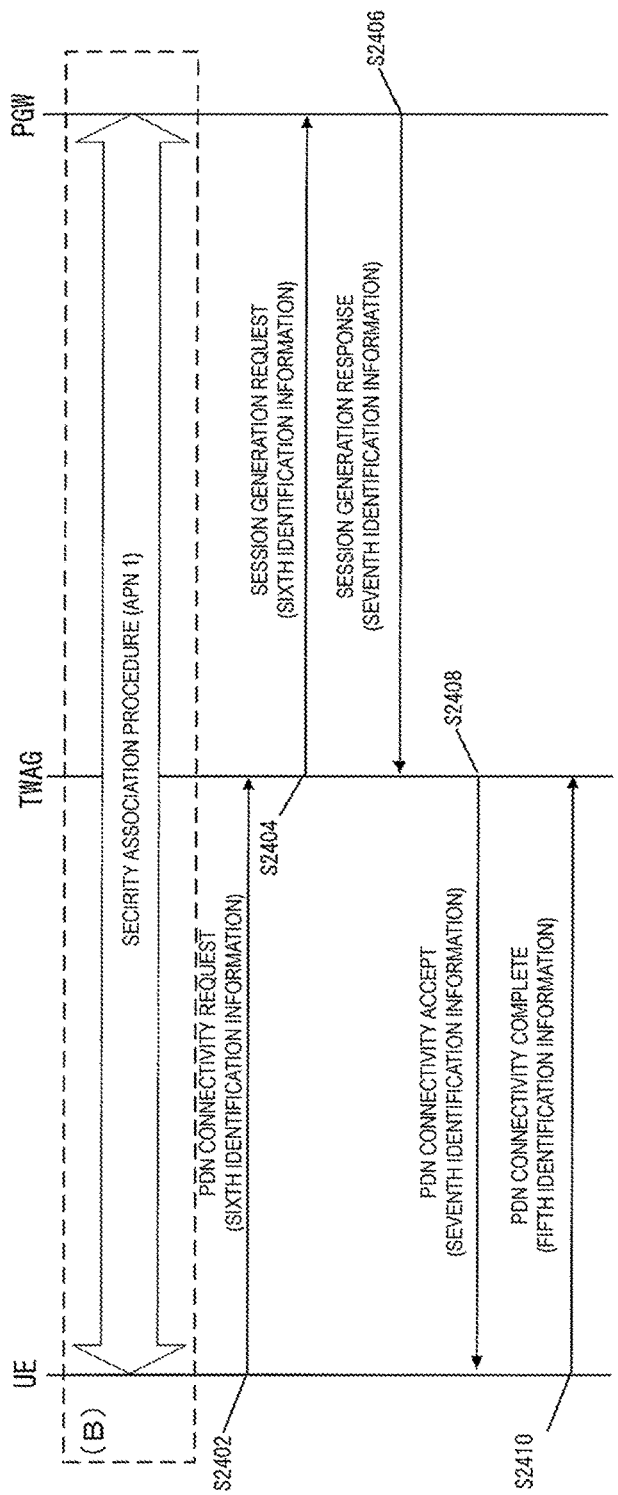
FIG. 18 is a diagram illustrating a PDN connectivity procedure through an access network B.

The PDN connectivity procedure through the access network B will be described by using FIG. 18.

First, the UE 10 transmits a PDN connectivity request to the TWAG 74 (S2402). The UE 10 may transmit the PDN connectivity request including at least the PDN connectivity request message identity (PDN connectivity request message ID), the Procedure transaction identity (Procedure transaction ID), the Request type, and the PDN type. Furthermore, the UE 10 may include at least the first identification information and/or the sixth identification information and/or the PDN connection ID into the PDN connectivity request. Moreover, the UE 10 may include the Access Point Name (APN) and/or the Protocol Configuration Options (PCOs) and/or the Traffic Flow Templates (TFTs) into the PDN connectivity request. Note that the UE 10 may transmit the PCO including the first identification information and/or the sixth identification information and/or the PDN connection ID and/or the TFT.

Here, the first identification information may be the UE NBIFOM capability representing that the UE 10 supports the NBIFOM. Note that the NBIFOM capability may be information indicating having a function of establishing the multi-access PDN connection.

In addition, the sixth identification information may be a request NBIFOM representing that the NBIFOM operation mode for the multi-access PDN connection is requested to be determined. Additionally/alternatively, the sixth identification information may be information representing that an NBIFOM operation mode allowed for the multi-access PDN connection to be established is requested.

As described above, the UE 10 may transmit the PDN connectivity request including the first identification information and/or sixth identification information to request the establishment of the multi-access PDN connection, without requesting a certain NBIFOM operation mode.

The PDN connectivity request message ID may be the message type representing the PDN connectivity request message.

The Procedure transaction ID may be information identifying the PDN connectivity procedure.

The APN may be an APN to which the UE 10 requests connection. More specifically, the APN may be the APN 1. The UE 10 may include the APN 1 to establish the multi-access PDN connection. Here, the APN 1 may be an APN that is allowed to establish the multi-access PDN connection and/or an APN that is allowed to perform communication based on the NBIFOM. The APN may be identification information identifying the first PDN connection.

The PDN connection ID may be an ID assigned when the PGW 30 establishes the PDN connection in the PDN connectivity procedure, or may be information uniquely identifying the PDN connection that the UE 10 establishes with the PGW 30. The PDN connection ID may be identification information identifying the first PDN connection. The PDN connection ID may be associated with the APN.

Note that the UE 10 may identify the first PDN connection by using the APN and/or the PDN connection ID.

The Request type may be information identifying the type of the PDN connectivity procedure to be requested. For example, since the UE 10 performs an initial connection by using the APN 1, the Request type may be the type indicating an attach, not the type indicating a handover.

The PDN type may indicate an available IP version. For example, the PDN type may be the IPv4, the IPv6, or the IPv4v6. The PCO may be protocol information associated with the PDN connection. Furthermore, the PCO may include identification information to be requested. Note that the UE 10 may transmit the PCO including the first identification information.

The TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that in the present example, in accordance with the transmission of the PDN connectivity request, the UE 10 does not request a certain NBIFOM operation mode, and thus, the UE 10 may transmit the PDN connectivity request without including the TFT. In other words, if the UE 10 requests the establishment of the multi-access PDN connection without requesting the certain NBIFOM operation mode, the UE 10 may transmit the PDN connectivity request without including the TFT. More specifically, if the UE 10 includes the first identification information and/or the sixth identification information, the UE 10 may transmit the PDN connectivity request without including the TFT. Note that conventionally, the UE 10 can perform transmission by including information indicating the IFOM support in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, by including the information indicating the IFOM support in the PCO, the UE 10 can switch the access network through which the communication of a certain IP flow is performed.

In the present embodiment, if the UE 10 includes the first identification information and the sixth identification information in the PCO, the UE 10 does not include the IFOM support. In contrast, if the UE 10 includes the IFOM support into the PCO, the UE 10 does not include the first identification information and/or the sixth information. As described above, it may be possible to not configure both of the first identification information and the IFOM support to be effective to ensure a clear distinction between use of the switching of the communication path on the basis of the NBIFOM and that of the switching of the communication path on the basis of the IFOM.

Thus, the UE 10 can establish either one of the PDN connection supporting the IFOM or the PDN connection supporting the NBIFOM, through the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Based on the reception of the PDN connectivity request and/or the first identification information and/or sixth identification information included in the PDN connectivity request, the TWAG 74 transmits a session generation request to the PGW 30 (S2404).

Based on the reception of the PDN connectivity request and/or the first identification information and/or sixth identification information included in the PDN connectivity request, the TWAG 74 may transmit the session generation request including at least the first identification information and/or sixth identification information. Furthermore, the TWAG 74 may include the TFT into the session generation request, on the basis of the reception of the TFT transmitted from the UE 10.

Furthermore, the TWAG 74 may include the APN and/or the PDN connection ID into the session generation request, on the basis of the reception of the APN and/or the PDN connection ID transmitted from the UE 10. Note that the TWAG 74 may identify the first PDN connection by using the received APN and/or PDN connection ID.

Furthermore, the TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that if both of the first identification information and the sixth identification information are not included in the PDN connectivity request, the TWAG 74 may transmit the session generation request without including the first identification information and/or the sixth identification information. Moreover, if the first identification information and/or the sixth identification information is not included in the PDN connectivity request, the TWAG 74 may perform a procedure for establishing the single-access PDN connection.

The PGW 30 receives the session generation request transmitted from the TWAG 74. Based on the reception of the session generation request, and/or the first identification information and/or sixth identification information included in the session generation request, the PGW 30 may perform the IP-CAN session update procedure with the PCRF 60.

Based on the reception of the session generation request and/or the first identification information and/or sixth identification information included in the session generation request, the PGW 30 may perform the IP-CAN session update procedure including at least the first identification information and/or the sixth identification information.

Furthermore, on the basis of the reception of APN and/or PDN connection ID transmitted by the TWAG 74, the PGW 30 may identify the first PDN connection by using the received APN and/or PDN connection ID.

Note that the PGW 30 may perform the IP-CAN session update procedure to notify the PCRF 60 of information of the UE 10 and/or TWAG 74.

The PGW 30 may transmit, to the PCRF 60, a control message in the IP-CAN session procedure, including information indicating whether the PDN connection to be established is the multi-access PDN connection or the single-access PDN connection, and/or the first identification information, and/or the sixth identification information.

More specifically, if the multi-access PDN connection is to be established, the PGW 30 transmits, to the PCRF 60, the information indicating the access network B, the PDN connection ID, the information indicating that the PDN connection is the multi-access PDN connection, and the first identification information and/or sixth identification information. Alternatively, if the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information uniquely identifying the PDN connection that the UE 10 establishes with the PGW 30.

Furthermore, based on the reception of the first identification information and/or sixth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Based on the reception of the session generation request or the completion of the IP-CAN session update procedure, and/or the first identification information and/or sixth identification information included in the session generation request, and/or the seventh identification information included in the IP-CAN session update procedure, the PGW 30 transmits a session generation response to the TWAG 74 (S2406).

Based on the reception of the session generation request or the completion of the IP-CAN session update procedure, and/or the first identification information and/or sixth identification information included in the session generation request, and/or the seventh identification information included in the IP-CAN session update procedure, the PGW 30 may transmit the session generation response including at least the seventh identification information.

Furthermore, the PGW 30 may include the PDN Address and/or the PDN connection ID and/or the TFT into the session generation response.

Note that a method by which the PGW 30 acquires the seventh identification information is not limited to the above-described method for acquiring the seventh identification information from the PCRF 60 through the IP-CAN session update procedure, and another example may be employed. For example, the PGW 30 may generate the seventh identification information and transmit the session generation response including the seventh identification information, without acquiring the seventh identification information from the PCRF 60 through the IP-CAN session update procedure.

Here, the seventh identification information may be the allowed mode representing the NBIFOM operation mode that is allowed for the multi-access PDN connection to be established. In other words, the seventh identification information may be an operation mode allowed by the operator.

Note that the PCRF 60 or the PGW 30 may determine the allowed mode and the seventh identification information, on the basis of the operator policy. For example, a policy that allows the establishment of only the PDN connection of the UE-initiated mode, a policy that allows the establishment of only the PDN connection of the network-initiated mode, a policy that allows the establishment of both modes, a policy that prohibits the establishment of both modes, and the like may be managed.

Note that the PCRF 60 or the PGW 30 may acquire the operator policy from the HSS 55 and the like. Alternatively, an operator policy generated by an administrator may be stored.

In addition, for the operator policy, a policy different for each subscriber may be managed. Alternatively, a policy different for each APN may be managed. For example, for each APN, a different allowed mode for the PDN connection to be established may be managed.

Based on the allowed mode, the PCRF 60 or the PGW 30 may include the allowed operation mode into the seventh identification information.

In other words, if only the Network-initiated mode is allowed, the PCRF 60 or the PGW 30 may include the Network-initiated mode into the seventh identification information. Alternatively, if only the UE-initiated mode is allowed, the PCRF 60 or the PGW 30 may include the UE-initiated mode into the seventh identification information.

Note that if both of the UE-initiated mode and the Network-initiated mode are allowed, the seventh identification information may include both operation modes. Alternatively, if both of the UE-initiated mode and the Network-initiated mode are allowed and a default operation mode is configured, the seventh identification information may include only the default operation mode. Note that which of the UE-initiated mode and the Network-initiated mode is defined as the default operation mode may be configured based on the operator policy.

Note that, if the establishment of the PDN connection of all operation modes is not allowed, the PCRF 60 may transmit, to the PGW 30, the cause information indicating that the Requested Operation Mode is not allowed.

If the establishment of the PDN connection of all operation modes is not allowed, the PGW 30 may not need to notify the TWAG 74 of the seventh identification information.

If the establishment of the PDN connection of all operation modes is not allowed, the PGW 30 may transmit, to the TWAG 74, the session generation response including the cause information indicating that the Requested Operation Mode is not allowed.

If the establishment of the PDN connection of all operation modes is not allowed, the PGW 30 may notify the TWAG 74 that there is no allowed operation.

As described above, on the basis of the allowed mode, the PCRF 60 or the PGW 30 may regard an operation mode that is allowed to establish the PDN connection as the seventh identification information.

Note that if the Network-initiated mode is not included in the seventh identification information, the PCRF 60 may not need to transmit the TFT to the PGW 30.

In other words, only if the Network-initiated mode is included in the seventh identification information, the PCRF 60 may transmit the TFT to the PGW 30.

Note that if the Network-initiated mode is not included in the seventh identification information, the PGW 30 may not need to transmit the TFT to the TWAG 74. Thus, in this case, the PGW 30 may not need to include the TFT into the session generation response.

In other words, only if the Network-initiated mode is included in the seventh identification information, the PGW 30 may transmit the TFT to the TWAG 74. Thus, in this case, the PGW 30 may include the TFT into the session generation response.

The PDN Address may be an IP address assigned to the UE 10. For example, the PDN Address may be the IPv4 address, or may be the IPv6 prefix and an interface ID for constituting an IPv6 address. Here, the PGW 30 may assign the IP address of the UE 10. Moreover, the PGW 30 may include the IP address already assigned to the UE 10 into the PDN Address. Specifically, the PDN Address may be the same as the PDN Address acquired at the time of establishment of the multi-access PDN connection, the connection being established in the initial state.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The TWAG 74 receives the session generation response transmitted from the PGW 30. Based on the reception of the session generation response and/or the seventh identification information included in the session generation response, the TWAG 74 transmits a PDN connectivity accept to the UE 10 (S2408).

Based on the reception of the session generation response and/or the seventh identification information included in the session generation response, the TWAG 74 may transmit the PDN connectivity accept including at least a PDN connectivity accept message identity (PDN connectivity accept message ID), the Procedure transaction ID, the APN, the PDN Address, the PDN connection ID, and the User Plane Connection ID. Furthermore, the TWAG 74 may include at least the seventh identification information into the PDN connectivity accept. Moreover, the TWAG 74 may include the PCO and/or a cause and/or the TFT and/or PDN connection attribute information, into the PDN connectivity accept. Note that the TWAG 74 may transmit the PCO including the seventh identification information and/or the TFT.

Here, the PDN connectivity accept message ID may be a message type representing the PDN connectivity accept message.

The APN may be an APN to which the UE 10 is allowed to be connected. More specifically, the APN may be the APN 1. The APN 1 may be an APN that is allowed to establish the multi-access PDN connection. The TWAG 74 may include the APN 1 in the PDN connectivity accept.

The PDN Address may be an IP address assigned to the UE 10. For example, the PDN Address may be the IPv4 address, or may be the interface ID for constituting the IPv6 address.

The PDN connection ID may be information for uniquely identifying the PDN connection established between the UE 10 and the PGW 30. The PDN connection ID may be an ID assigned by the PGW 30, or may be an ID assigned by the TWAG 74. In other words, the TWAG 74 may assign the PDN connection ID.

The User Plane Connection ID is information identifying a user plane. The user plain is a transfer path or transfer paths to be used for transfer of user data through the PDN connection. The TWAG 74 may assign the user plain connection ID.

The cause may be information representing that the PDN type of the PDN Address assigned to the UE 10 is different from the PDN type requested by the UE 10 in the PDN connectivity request.

Note that the TWAG 74 and/or the PGW 30 may include the seventh identification information into the PCO. However, if the TWAG 74 and/or the PGW 30 includes the seventh identification information into the PCO, the TWAG 74 and/or the PGW 30 does not include the IFOM support.

In contrast, if the TWAG 74 and/or the PGW 30 includes the IFOM support into the PCO, the TWAG 74 and/or the PGW 30 does not include the seventh identification information. As described above, it may be possible to not configure both of the seven identification information and the IFOM support to be effective to ensure a clear distinction between use of the switching of the communication path on the basis of the NBIFOM and that of the switching of the communication path on the basis of the IFOM.

The PDN connection attribute information may be information indicating that the PDN connection established through the present PDN connectivity procedure is the multi-access PDN connection, and/or information indicating that user data transmitted/received by using the PDN connection established through the present PDN connectivity procedure is allowed to be transmitted/received through the access network A and the access network B, and/or if there is only one operation mode indicated by the seventh identification information, information indicating that the PDN connection established through the present PDN connectivity procedure is the multi-access PDN connection of the operation mode indicated by the seventh identification information.

Note that the UE 10 may transmit the PDN connectivity accept message, further including the connectivity type indicating the type of the PDN connection and/or the WLAN offload permission information (WLAN offload acceptability) indicating whether or not the WLAN offload can be performed. Furthermore, the TWAG 74 may transmit the connectivity type or the WLAN offload permission information including the PDN connection attribute information.

The UE 10 receives the PDN connectivity accept transmitted from the TWAG 74. The UE 10 transmits PDN connectivity complete to the TWAG 74 on the basis of the reception of PDN connectivity accept and/or the seventh identification information included in the PDN connectivity accept (S2410). The UE 10 may transmit the PDN connectivity complete including at least a PDN connectivity complete message ID (PDN connectivity complete), the Procedure transaction ID, and the PDN connection ID.

Furthermore, if a plurality of INFOM operation modes are included in the seventh identification information, the UE 10 may include at least the fifth identification information into the PDN connectivity complete. In other words, if the plurality of INFOM operation modes are allowed, the UE 10 may select one mode of the allowed modes and transmit the fifth identification information including the one mode.

Here, the fifth identification information may be the mode indication representing an NBIFOM operation mode for the multi-access PDN connection, the establishment of the multi-access PDN connection being requested by the UE 10. Note that the UE 10 may include the UE-initiated mode or the Network-initiated mode into the fifth identification information.

Specifically, if the UE-initiated mode and the Network-initiated mode are included in the seventh identification information included in the PDN connectivity accept, the UE 10 may include the UE-initiated mode or the Network-initiated mode in the fifth identification information.

Which of the UE-initiated mode and the Network-initiated mode is to be included into the fifth identification information may be determined on the basis of the UE policy. Note that the UE policy may be any information configured to the UE 10. For example, the UE policy may be information configured by a user.

The PDN connectivity complete message ID may be the message type representing the PDN connectivity complete message.

Through these processes, the UE 10 completes the additional attach procedure.

The UE 10 can acquire the same PDN Address as the PDN Address assigned for the multi-access PDN connection, the connection being established in the initial state.

The UE 10 can establish the additional transfer path through the access network B on the basis of the transition to the first initial state and the operation mode of the first PDN connection.

Specifically, the UE 10 can perform the attach procedure and the PDN connectivity procedure to the access network B and establish the additional transfer path through the TWAG 74, on the basis of the transition to the first initial state and the first PDN connection being in the Network-initiated mode. Note that the transfer path may be a bearer and/or a communication path.

More specifically, the UE 10 can add the transfer path through the access network B to the first PDN connectivity between the PGW_A selected using the APN 1 and the UE 10, by performing the attach procedure and performing the PDN connectivity procedure after establishing the second PDN connection between the PGW_B selected using the APN 2 and the UE 10. Note that the transfer path may be a bearer and/or a communication path.

Alternatively, the UE 10 can perform the attach procedure and the PDN connectivity procedure through the access network B on the basis of the transition to the first initial state and the routing rule of the first PDN connection in the UE-initiated mode, to establish the additional transfer path through the TWAG 74. Note that the transfer path may be a bearer and/or a communication path.

Specifically, the UE 10 can add the transfer path through the access network B to the first PDN connectivity between the PGW_A selected using the APN 1 and the UE 10, by performing the attach procedure and performing the PDN connectivity procedure after establishing the second PDN connection between the PGW_B selected using the APN 2 and the UE 10. Note that the transfer path may be a bearer and/or a communication path.

Furthermore, the UE 10 can establish the additional transfer path through the access network B on the basis of the transition to the second initial state and the operation mode of the first PDN connection.

Specifically, the UE 10 can perform the PDN connectivity procedure to the access network B and establish the additional transfer path through the TWAG 74, on the basis of the transition to the second initial state and the first PDN connection being in the Network-initiated mode. Note that the transfer path may be a bearer and/or a communication path.

More specifically, the UE 10 can add the transfer path through the access network B to the first PDN connectivity between the PGW_A selected using the APN 1 and the UE 10, by performing the PDN connectivity procedure. Note that the transfer path may be a bearer and/or a communication path.

Alternatively, the UE 10 can perform the PDN connectivity procedure through the access network B, on the basis of the transition to the second initial state and the routing rule of the first PDN connection in the UE-initiated mode, to establish the additional transfer path through the eNB 45. Note that the transfer path may be a bearer and/or a communication path.

Specifically, the UE 10 can add the transfer path through the access network B to the first PDN connectivity between the PGW_A selected using the APN 1 and the UE 10, by performing the PDN connectivity procedure. Note that the transfer path may be a bearer and/or a communication path.

2. Second Embodiment

Hereinafter, a radio communication technology according to an embodiment of the present invention will be described in detail with reference to the drawings.

2.1. System Overview

FIG. 1 is a diagram illustrating an overview of a mobile communication system according to the present embodiment. As illustrated in the drawings, a mobile communication system 9 is constituted of a mobile terminal device UE 10, an LTE base station eNB 45 included in an access network A, a Trusted WLAN Access Gateway (Gateway TWAG) 74 included in an access network B, a Mobility Management Entity (MME) 40, a Serving Gateway (SGW) 35, and a PDN Gateway (PGW) 30 included in a core network 90.

Here, the UE 10 may be any mobile terminal device, and may be a User Equipment (UE) or a Mobile Equipment (ME) or a Mobile Station (MS).

Furthermore, the access network A may be an LTE access network, and the eNB 45 included in the access network A may be an LTE radio base station. Note that the access network A may include a plurality of radio base stations.

Furthermore, the access network B may be a WLAN access network. The TWAG 74 may be a gateway connecting the core network 90 and the WLAN access network, the gateway connecting to the PGW 30 in the core network 90.

In the present embodiment, the UE 10 can establish a PDN connection using an EPS bearer through the access network A.

Furthermore, the UE 10 can establish a PDN connection by using a GTP/PMIPv6 transfer path between the PGW 30 and the UE 10. Note that the transfer path may be a bearer.

Here, the core network 90 refers to an IP mobile communication network run by a mobile operator.

For example, the core network 90 may be a core network 90 for the mobile operator that runs and manages the mobile communication system 9, or may be a core network 90 for a virtual mobile operator such as a Mobile Virtual Network Operator (MVNO).

The MME 40 is a control device configured to perform, through the access network A, location management and access control of the UE 10. Details of the MME 40 will be descried later.

Furthermore, the SGW 35 is a gateway device between the core network 90 and the access network A, and is configured to transfer user data between the UE 10 and the PGW 30.

The PGW 30 is a gateway device of a packet data service network (Packet Data Network (PDN)) configured to provide a communication service to the UE 10.

In the present embodiment, the UE 10 can establish a first PDN connection and/or a second PDN connection.

Furthermore, in the present embodiment, an NBIFOM is a technology that allows establishment of a multi-access PDN connection.

Furthermore, in the present embodiment, a multi-access PDN connection refers to a PDN connection capable of accommodating, in one PDN connection, a transfer path and/or a bearer by 3GPP access and/or WLAN access. In other words, the multi-access PDN connection can accommodate both a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection is a PDN connection capable of constituting one or more transfer paths.

Note that in the present embodiment, unlike the first embodiment, the multi-access PDN connection may be a PDN connection established based on the NBIFOM or a PDN connection established based on the IP Flow Mobility (IFOM). Thus, in the present embodiment, the multi-access PDN connection may be either one of the multi-access PDN connection of the PDN connection in which a transfer path of a certain flow can be selected on the basis of the NBIFOM or the multi-access PDN connection of the PDN connection in which a transfer path of a certain flow can be selected on the basis of the IFOM.

Note that the IFOM is a technology for switching a communication path of a certain IP flow by using the Dual Stack Mobile IPv6 (DSMIPv6) protocol. Meanwhile, the NBIFOM is a technique for switching a communication path of a certain IP flow by using a network-based mobility management protocol such as a General Packet Radio System Tunneling Protocol (GTP) and a Proxy Mobile IP (PMIP).

Furthermore, the first PDN connection may be the above-described multi-access PDN connection.

In detail, the first PDN connection is a PDN connection in which, as one PDN connection, a communication path EPS bearer through the access network A and a communication path by a GTP/PMIPv6 tunnel through the access network B can be used. That is, this PDN connection can transmit/receive data through the 3GPP access, the WLAN access, or both of the 3GPP access and the WLAN access. The first PDN connection may be the multi-access PDN connection.

Furthermore, the second PDN connection may be a conventional PDN connection, not the multi-access PDN connection. Note that the second PDN connection may be the single-access PDN connection.

Here, the "single-access PDN connection" refers to one PDN connection constituting only a transfer path of either one of the 3GPP access or the WLAN access, unlike the multi-access PDN connection. In detail, the single-access PDN connection is a PDN connection established by the conventional attach.

That is, the second PDN connection is a PDN connection constituted of the EPS bearer through the access network A or a PDN connection constituted of the GTP/PMIPv6 transfer path through the access network B. The second PDN connection accommodates a transfer path and/or a communication path through either one of the access networks.

As described above, the single-access PDN connection is a PDN connection different from the multi-access PDN connection. Moreover, the single-access PDN connection is a PDN connection that is also different from a PDN connection for a local IP access (LIPA). Here, the "LIPA" refers to communication control for performing offload to a home network. More specifically, the base station to which the terminal device is connected performs the offload by transmitting user data to a home network to which the base station is connected, the user data being conventionally delivered to the core network 90. The PDN connection for the LIPA is a PDN connection for performing such communication based on the LIPA.

Next, an example of a configuration of the core network 90 will be described. FIG. 2A illustrates an example of a configuration of the IP mobile communication network. As illustrated in FIG. 2A, the core network 90 is constituted of the Home Subscriber Server 55 (HSS) 50, the Authentication Authorization Accounting (AAA) 55, the Policy and Charging Rules Function (PCRF) 60, the PGW 30, the enhanced Packet Data Gateway (ePDG) 65, the SGW 35, the MME 40, and the Serving GPRS Support Node (SGSN) 45.

Furthermore, the core network 90 can be connected to a plurality of radio access networks (the LTE AN 80, the WLAN ANb 75, the WLAN ANa 70, the UTRAN 20, and the GERAN 25).

A radio access network may be constituted by being connected to a plurality of different access networks, or may be constituted by being connected to any one of the access networks. Moreover, the UE 10 can be wirelessly connected to the radio access network.

Moreover, the WLAN access network b (WLAN ANb 75) that connects to the core network 90 via the ePDG 65 and the WLAN access network a (WLAN ANa 75) that connects to the PGW 30, the PCRF 60, and the AAA 55 can be configured as the access network connectable in the WLAN access system.

Note that each device has a configuration similar to the conventional devices in a mobile communication system using EPS, and thus detailed descriptions will be omitted. Each device will be described briefly hereinafter.

The PGW 30 is connected to the PDN 100, the SGW 35, the ePDG 65, the WLAN ANa 70, the PCRF 60, and the AAA 55 and is a relay device configured to transfer user data by functioning as a gateway device between the PDN 100 and the core network 90.

The SGW 35 is connected to the PGW 30, the MME 40, the LTE AN 80, the SGSN 45, and the UTRAN 20 and is a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 5550 and is an access control device configured to perform location information management and access control for the UE 10 via the LTE AN 80. Furthermore, the core network 90 may be constituted including a plurality of location management devices. For example, a location management device different from the MME 40 may be constituted. Similarly to the MME 40, the location management device different from the MME 40 may be connected to the SGW 35, the LTE AN 80, and the HSS 5550.

Furthermore, if a plurality of MMEs 40 are included in the core network 90, the MMEs 40 may be connected to each other. As a result, the contexts of the UE 10 may be transmitted/received among the MMEs 40.

The HSS 5550 is connected to the MME 40 and the AAA 55 and is a managing node configured to manage subscriber information. The subscriber information of the HSS 5550 is referenced during access control for the MME 40, for example. Moreover, the HSS 5550 may be connected to the location management device different from the MME 40.

The AAA 55 is connected to the PGW 30, the HSS 5550, the PCRF 60, and the WLAN ANa 70 and is configured to perform access control for the UE 10 connected via the WLAN ANa 70.

The PCRF 60 is connected to the PGW 30, the WLAN ANa 75, the AAA 55, and the PDN 100 and is configured to perform QoS management for data delivery. For example, the PCRF 60 manages QoS of a communication path between the UE 10 and the PDN 100.

The ePDG 65 is connected to the PGW 30 and the WLAN ANb 75 and is configured to deliver user data by functioning as a gateway device between the core network 90 and the WLAN ANb 75.

The SGSN 45 is connected to the UTRAN 20, the GERAN 25, and the SGW 35 and is a control device for location management between a 3G/2G access network (UTRAN/GERAN) and the LTE access network (E-UTRAN). In addition, the SGSN 45 has functions of: selecting the PGW 30 and the SGW 35; managing a time zone of the UE 10; and selecting the MME 40 at the time of handover to the E-UTRAN.

Also as illustrated in FIG. 2B, each radio access network includes devices to which the UE 10 is actually connected (for example, a base station device and an access point device), and the like. The devices used in these connections can be thought of as devices adapted to the radio access networks.

In the present embodiment, the LTE AN 80 is constituted including the eNB 45. The eNB 45 is a radio base station to which the UE 10 is connected in the LTE access system, and the LTE AN 80 may be constituted including one or more radio base stations.

The WLAN ANa 70 is constituted including the WLAN APa 72 and the TWAG 74. The WLAN APa 72 is a radio base station to which the UE 10 is connected in the WLAN access system trusted by the operator running the core network 90, and the WLAN ANa 70 may be constituted including one or more radio base stations. The TWAG 74 is a gateway device between the core network 90 and the WLAN ANa 70. Furthermore, the WLAN APa 72 and the TWAG 74 may be constituted as a single device.

In the case where the operator running the core network 90 and the operator running the WLAN ANa 70 are different, such constitution can be realized through contracts and agreements between the operators.

Furthermore, the WLAN ANb 75 is constituted including the WLAN APb 76. The WLAN APb 76 is a radio base station to which the UE 10 is connected in the WLAN access system in the case where no trusting relationship is established with the operator running the core network 90, and the WLAN ANb 75 may be constituted including one or more radio base stations.

In this manner, the WLAN ANb 75 is connected to the core network 90 via the ePDG 65, which is a device included in the core network 90, serving as a gateway. The ePDG 65 has a security function for ensuring security.

The UTRAN 20 is constituted including the Radio Network Controller (RNC) 24 and the eNB (UTRAN) 22. The eNB (UTRAN) 22 is a radio base station to which the UE 10 is connected by a UMTS Terrestrial Radio Access (UTRA) and the UTRAN 20 may be constituted including one or more radio base stations. Furthermore, the RNC 24 is a controller configured to connect the core network 90 and the eNB (UTRAN) 22, and the UTRAN 20 may be constituted including one or more RNCs. Moreover, the RNC 24 may be connected to one or more eNBs (UTRANs) 22. In addition, the RNC 24 may be connected to a radio base station (Base Station Subsystem (BSS) 26) included in the GERAN 25.

The GERAN 25 is constituted including the BSS 26. The BSS 26 is a radio base station to which the UE 10 is connected by GSM/EDGE Radio Access (GERA), and the GERAN 25 may be constituted of one or more radio base station BSSs. Furthermore, the one or more BSSs 26 may be connected to each other. Moreover, the BSS 26 may be connected to the RNC 24.

Note that in the present specification, the UE 10 being connected to each radio access network refers to the UE 10 being connected to a base station device, an access point, or the like included in each radio access network, and data, signals, and the like being transmitted and received also traverse those base station devices, access points, or the like.

2.2 Device Configuration

The configuration of each device will be described below.

2.2.1. TWAG Configuration

FIG. 3 illustrates a device configuration of the TWAG 74. As illustrated in the figure, the TWAG 74 is constituted of the IP mobile communication network interface unit 320, the control unit 300, and the storage unit 340. The IP mobile communication network interface unit 320 and the storage unit 340 are connected to the control unit 300 via a bus.

The control unit 300 is a function unit for controlling the TWAG 74. The control unit 300 implements various processes by reading out and executing various programs stored in the storage unit 340.

The IP mobile communication network interface unit 320 is a function unit through which the TWAG 74 is connected to the PGW 30.

The storage unit 340 is a function unit for storing programs, data, and the like necessary for each operation of the TWAG 74. The storage unit 340 is constituted of, for example, a semiconductor memory, a Hard Disk Drive (HDD), or the like.

As illustrated in FIG. 3, the storage unit 340 stores the TWAG capability 342, the network capability 344, and the EPS bearer context 346. Hereinafter, information elements stored in the storage unit 340 will be described.

FIGS. 4A to 4G illustrate information elements stored in the storage unit 340. FIG. 4A illustrates an example of the TWAG capability stored by the TWAG 74. The TWAG capability stores identification information (NBIFOM capability) indicating whether or not capability of establishing the first PDN connection is supported for each TWAG 74. In other words, it is identification information indicating whether or not the TWAG 74 supports an NBIFOM function. Specifically, the NBIFOM capability may include "allowed" or "Not allowed".

Note that the NBIFOM function may be information indicating having a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the TWAG 74 is a gateway having a function of establishing the first PDN connection. In other words, the existence of the NBIFOM capability in the storage unit may mean that the TWAG 74 is a gateway supporting the NBIFOM function.

As illustrated in the figure, the NBIFOM capability may be stored by associating with the TWAG ID, which is the identification information of the TWAG 74. If not associated with the TWAG ID, the NBIFOM capability may mean the capability of the TWAG 74 to be stored.

If the TWAG ID and the NBIFOM capability are associated and stored, the TWAG 74 may store the TWAG capability of a plurality of TWAGs 74.

In this case, when the UE 10 performs handover to another TWAG 74, the TWAG 74 may select a TWAG 74 to which the handover is made, on the basis of the TWAG capability.

Next, the network capability 344 will be described. FIG. 4B illustrates an example of the network capability stored by the TWAG 74. The network capability stores the NBIFOM capability for each network, i.e., for each PGW 30.

Here, the NBIFOM capability is identification information indicating whether or not capability of establishing the first PDN connection is supported for each network. In other words, it is identification information indicating whether or not the PGW 30 supports the NBIFOM function. More specifically, for example, the NBIFOM capability may include "allowed" or "Not allowed".

Note that the NBIFOM function may be information indicating having a function of establishing the multi-access PDN connection based on the NBIFOM.

Alternatively, the NBIFOM capability may be identification information indicating that it has the capability of establishing the first PDN connection. In other words, the NBIFOM capability may be identification information indicating that it is a gateway supporting the NBIFOM function. That is, the existence of the NBIFOM capability in the storage unit may mean that the PGW 30 is a gateway having a function of establishing the first PDN connection. In other words, the existence of the NBIFOM capability in the storage unit may mean that the PGW 30 is a gateway supporting the NBIFOM function.

As illustrated in FIG. 4B, the TWAG 74 stores the NBIFOM capability by associating with the PGW ID. Furthermore, as illustrated in the figure, the NBIFOM capability may be stored by associating with each of a plurality of PGWs 30.

The PGW ID may be any information for identifying the PGW 30, and may be an Access Point Name (APN), for example.

Next, the EPS bearer context will be described. The EPS bearer context may be classified into an EPS bearer context for each UE 10 stored for each UE 10, an EPS bearer context for each PDN connection, and an EPS bearer context for each bearer and/or transfer path.

FIG. 4C illustrates information elements included in the EPS bearer context for each UE 10. As the figure illustrates, the TWAG 74 stores, for each UE 10, a UE NBIFOM capability and an NBIFOM allowed.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability is identification information indicating whether or not the UE 10 supports the NBIFOM function. More specifically, for example, the UE NBIFOM capability may include "allowed" or "Not allowed".

Note that the NBIFOM function may be information indicating that it has a function of establishing the multi-access PDN connection based on the NBIFOM.

Alternatively, the UE NBIFOM capability may be identification information indicating that the UE 10 has capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage unit may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with a plurality of APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the conventional PDN connection, not the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2.

The NBIFOM allowed may be stored before the PDN connection is established.

The TWAG 74 may access the HSS 5550 to acquire the NBIFOM allowed before the PDN connection is established and/or during the establishment procedure.

Furthermore, the EPS bearer context for each UE 10 may include the identification information of the UE 10. The identification information of the UE 10 may be IMSI.

Furthermore, FIG. 4D illustrates the EPS bearer context for each PDN connection. The EPS bearer context for each PDN connection includes a PDN connection ID, a network allowed mode, an operation mode, a User Plane Connection ID, a TWAG MAC address, and an NBIFOM permission.

The PDN connection ID is identification information for identifying a PDN connection. The UE 10, the TWAG 74, and the PGW 30 may store the same identification information.

The operation mode is identification information for a mode indicating which of the UE 10 or the network takes an initiative in transmitting/receiving data or is capable of starting communication control, if the PDN connection is the first PDN connection.

More specifically, for example, an operation mode in which the UE 10 can start the communication control may be the UE initiated mode.

Furthermore, an operation mode in which the network and/or the PGW 30 and/or the PCRF 60 can start the communication control may be a Network-initiated mode.

The network allowed mode indicates an operation mode allowed by the network. The network allowed mode may include the UE initiated mode or the Network-initiated mode or both of these modes.

The User Plane Connection ID is identification information identifying a connection used for user data transmission when the UE 10 establishes a transfer path through the TWAG 74. The TWAG MAC address is a physical address of the TWAG 74.

The NBIFOM permission is information indicating that this PDN connection establishes the multi-access PDN connection based on the NBIFOM. In other words, the NBIFOM permission indicates that the first PDN connection is established.

That is, the fact that the TWAG 74 stores the NBIFOM permission means that this PDN connection is the first PDN connection.

The NBIFOM permission is identification information stored by the TWAG 74 by establishing the PDN connection.

The TWAG 74 may access the HSS 5550 to acquire the NBIFOM permission during the establishment of the PDN connection. Alternatively, the TWAG 74 may store the NBIFOM permission on the basis of the establishment of the multi-access PDN connection based on the NBIFOM.

Next, the EPS bearer context for each bearer and/or transfer path will be described. As illustrated in FIG. 4E, the EPS bearer context for each bearer and/or transfer path may include the transfer path identification information and the routing rule.

The transfer path identification information is information for identifying a transfer path and/or bearer. The transfer path identification information may be an EPS bearer ID, for example.

The routing rule indicates an association of a routing filter and a routing address or routing access type. Based on this association, whether using a communication path through the 3GPP access network or using a communication path through the WLAN access network is determined.

Here, the routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the TWAG 74. Alternatively, the routing address may be an IP address of a Mobile Access Gateway (MAG).

The routing rule may be notified from the PGW 30 or the PCRF 60, or may be notified from the UE 10. Alternatively, the routing rule may be a value that the TWAG 74 stores beforehand as a default value.

The routing filter may include an IP header to switch an IP flow. Alternatively, the routing filter may include an application ID to switch the flow for each application. Alternatively, the routing filter may include a TFT.

The routing rule may store a plurality of rules. Furthermore, the routing rule may include priority for each rule.

The TWAG capability and the network capability may be included in the EPS bearer context.

2.2.2. HSS Configuration

Next, the configuration of the HSS 5550 will be described. FIG. 5 illustrates a device configuration of the HSS 5550. As illustrated in the figure, the HSS 5550 is constituted of an IP mobile communication network interface unit 520, a control unit 500, and a storage unit 540. The IP mobile communication network interface unit 520 and the storage unit 540 are connected to the control unit 500 via a bus.

The control unit 500 is a function unit for controlling the HSS 5550. The control unit 500 implements various processes by reading out and executing various programs stored in the storage unit 540.

The IP mobile communication network interface unit 520 is a function unit through which the HSS 5550 is connected to the MME 40 and/or another MME 40, and the AAA 55.

The storage unit 540 is a function unit for storing programs, data, and the like necessary for each operation of the HSS 5550. The storage unit 540 is constituted of, for example, a semiconductor memory, a Hard Disk Drive (HDD), or the like.

As illustrated in FIG. 5, the storage unit 540 stores the HSS data 542. Hereinafter, information elements stored in the storage unit 540 will be described.

FIGS. 6A and 6B illustrate information elements stored in the storage unit 540. FIG. 6A illustrates an example of HSS data for each UE 10 stored by the HSS 5550.

As the figure illustrates, the HSS data for each UE 10 includes IMSI, MSISDN, IMEI/IMEISV, access restriction, UE NBIFOM capability, and NBIFOM allowed. The IMSI is identification information to be assigned to a user (subscriber) using the UE 10. The MSISDN represents the phone number of the UE 10. The IMEI/IMISV is identification information assigned to the UE 10. The access restriction indicates registration information for access restriction.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability indicates whether or not the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with a plurality of APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the conventional PDN connection, not the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2. The NBIFOM allowed may be stored before the PDN connection is established.

FIG. 6B illustrates an example of HSS data for each PDN connection stored by the HSS 5550. As the figure illustrates, the HSS data for each PDN connection includes at least a context ID, a PDN Address, a PDN type, an Access Point Name (APN), a WLAN offload ability, a PDN GW ID, and an NBIFOM permission.

The context ID is identification information for the context storing the HSS data for each PDN connection.

The PDN Address represents an IP address registered. The PDN Address is an IP address of the UE 10.

The PDN type indicates the type of PDN Address. That is, the PDN type is identification information for identifying IPv4 or IPv6 or IPv4v6, for example. The APN is a label indicating an access destination of the network, in accordance with DNS naming conventions.

The WLAN offload ability is identification information indicating whether traffic connected through this APN can perform offload to the WLAN by utilizing a cooperative function between the WLAN and the 3GPP, or maintains the 3GPP connection. The WLAN offload ability may vary for each RAT type. Specifically, the LTE (E-UTRA) and the 3G (UTRA) may have different WLAN offload ability.

The PDN GW identity is identification information identifying the PGW 30 utilized in this APN. This identification information may be a Fully Qualified Domain Name (FQDN) or an IP address.

The NBIFOM permission is information indicating that this PDN connection establishes the multi-access PDN connection based on the NBIFOM. In other words, the NBIFOM permission indicates that the first PDN connection is established.

That is, the fact that the TWAG 74 stores the NBIFOM permission means that this PDN connection is the first PDN connection.

The NBIFOM permission is identification information stored by the TWAG 74 by establishing the PDN connection based on the NBIFOM.

Specifically, for example, the HSS data for each PDN connection including the APN 1 may include the NBIFOM permission, and the HSS data for each PDN connection including the APN 2 may not need to include the NBIFOM permission.

In other words, the PDN connection based on the APN 1 may be the first PDN connection, and the PDN connection based on the APN 2 must not be the first PDN connection.

2.2.3. UE Configuration

Next, the configuration of the UE 10 will be described. FIG. 7 illustrates a device configuration of the UE 10. As illustrated in the figure, the UE 10 is constituted of the LTE interface unit 720, the WLAN interface unit 740, the control unit 700, and the storage unit 750.

The LTE interface unit 720, the WLAN interface unit 740, and the storage unit 750 are connected to the control unit 700 via a bus.

The control unit 700 is a function unit for controlling the UE 10. The control unit 700 implements various processes by reading out and executing various programs stored in the storage unit 750.

The LTE interface unit 720 is a function unit through which the UE 10 is connected to an LTE base station to be connected to an IP access network. Furthermore, an external antenna 710 is connected to the LTE interface unit 720.

The WLAN interface unit 740 is a function unit through which the UE 10 is connected to the WLAN AP to be connected to the IP access network. Furthermore, an external antenna 730 is connected to the WLAN interface unit 740.

The control unit 700 is a function unit for controlling the UE 10. The control unit 700 implements various processes by reading out and executing various programs stored in the storage unit 750.

The storage unit 750 is a function unit for storing programs, data, and the like necessary for each operation of the UE 10. The storage unit 750 is constituted of, for example, a semiconductor memory, a Hard Disk Drive (HDD), or the like.

As illustrated in FIG. 7, the storage unit 750 stores the UE context 752. Hereinafter, information elements stored in the storage unit 750 will be described. Note that the UE context 752 is classified into UE context for each UE 10, UE context for each PDN connection, and UE context for each transfer path and/or bearer.

FIG. 8A is an example of a UE context stored for each UE 10. As illustrated in the figure, the UE context for each UE 10 includes IMSI, an EMM state, GUTI, an ME identity, and a UE NBIFOM capability.

The IMSI is identification information to be assigned to a user (subscriber) using the UE 10.

The EMM state indicates a mobility management state of the UE 10. For example, the EMM state may be EMM-REGISTERED in which the UE 10 is registered with the network (registered state) or EMM-DEREGISTERD in which the UE 10 is not registered with the network (deregistered state).

The GUTI is an abbreviation of Globally Unique Temporary Identity, and is temporary identification information of the UE 10. The GUTI is constituted of identification information of the MME 40 (Globally Unique MME Identifier (GUMMEI)) and identification information of the UE 10 in a specific MME 40 (M-TMSI).

The ME identity is an ID of ME, and may be the IMEI/IMISV, for example.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability is identification information indicating whether or not the NBIFOM function is supported for each UE 10. More specifically, for example, the NBIFOM capability may include "allowed" or "Not allowed".

Note that the NBIFOM function may be information indicating having a function of establishing the multi-access PDN connection based on the NBIFOM.

Alternatively, the UE NBIFOM capability may be identification information indicating that the UE 10 has capability of establishing the first PDN connection. That is, the existence of the UE NBIFOM capability in the storage unit of the UE 10 may mean that the UE 10 has a function of establishing the first PDN connection.

In other words, the UE NBIFOM capability may be identification information indicating that the UE 10 supports the NBIFOM function. That is, the existence of the UE NBIFOM capability in the storage unit of the UE 10 may mean that the UE 10 supports the NBIFOM function.

FIG. 8B illustrates an example of the UE context for each PDN connection. As illustrated in the figure, the UE context for each PDN connection includes at least a PDN connection ID, an APN in use, an IP address, a default bearer, a WLAN offload ability, a UE allowed mode, and an operation mode.

The PDN connection ID is identification information for identifying a PDN connection. The UE 10, the TWAG 74, and the PGW 30 may store the same identification information.

The APN in use is an APN utilized by the UE 10 most recently. This APN may be constituted of identification information of the network and default identification information of an operator.

The IP address is an IP address assigned to the UE 10 through the PDN connection, and may be the IPv4 address or the IPv6 prefix.

The default bearer is EPS bearer identification information identifying a default bearer in this PDN connection.

The WLAN offloadability is WLAN offload permission information indicating whether or not a communication associated with this PDN connection allows offload to the WLAN using an interworking function between the WLAN and the 3GPP, or maintains the 3GPP access.

The UE allowed mode is an operation mode allowed by the UE 10. This identification information may indicate the UE initiated mode, may indicate the Network-initiated mode, or may indicate both of these modes.

The operation mode is identification information for a mode indicating which of the UE 10 or the network takes an initiative in transmitting/receiving data or is capable of starting communication control, if the current PDN connection is the first PDN connection.

FIG. 8C illustrates the UE context for each bearer. The UE context for each bearer includes transfer path identification information and a routing rule.

The transfer path identification information is information for identifying a transfer path and/or bearer. The transfer path identification information may be an EPS bearer ID, for example.

Furthermore, the transfer path identification information may be associated with the TFT.

Here, the routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the TWAG 74. Alternatively, the routing address may be an IP address of a Mobile Access Gateway (MAG).

The routing rule may be notified from the PGW 30 or the PCRF 60. Alternatively, the routing rule may be a value that the UE 10 stores beforehand as a default value.

The routing filter may include an IP header to switch an IP flow. Alternatively, the UE 10 may include an application ID into the routing filter to switch the flow for each application. Alternatively, the routing filter may include the TFT.

The routing rule may store a plurality of rules (regulations). Furthermore, the routing rule may include priority for each rule.

FIG. 8D illustrates the TWAG capability. The TWAG capability stores identification information (NBIFOM capability) indicating whether or not capability of establishing the first PDN connection is supported for each TWAG 74. In other words, it is identification information indicating whether or not the TWAG 74 supports the NBIFOM function. Specifically, the NBIFOM capability may include "allowed" or "Not allowed".

Note that the NBIFOM function may be information indicating that it has a function of establishing the multi-access PDN connection based on the NBIFOM.

Alternatively, the NBIFOM capability may be identification information indicating having capability of establishing the first PDN connection. That is, the existence of the NBIFOM capability in the storage unit may mean that the TWAG 74 is a gateway having a function of establishing the first PDN connection. In other words, the existence of the NBIFOM capability in the storage unit may mean that the TWAG 74 is a gateway supporting the NBIFOM function.

The UE 10 may store the NBIFOM capability by associating with the TWAG ID. Furthermore, the NBIFOM capability of a plurality of TWAGs 74 may be stored.

FIG. 8E illustrates an example of the network capability. The network capability stores the NBIFOM capability for each network, i.e., for each PGW 30.

Here, the NBIFOM capability is identification information indicating whether or not capability of establishing the first PDN connection is supported for each network. More specifically, for example, the NBIFOM capability may include "allowed" or "Not allowed".

Alternatively, the NBIFOM capability may be identification information indicating having capability of establishing the first PDN connection. That is, the existence of the NBIFOM capability may mean that the PGW 30 and/or the network is a gateway having a function of establishing the first PDN connection.

As illustrated in FIG. 8E, the TWAG 74 stores the NBIFOM capability by associating with the PGW ID. Furthermore, as illustrated in the figure, the NBIFOM capability may be stored by associating with each of a plurality of PGWs 30.

The PGW ID is information for identifying the PGW 30. The PGW ID may be an APN, for example.

FIG. 8F illustrates the MME capability. The MME capability stores identification information (NBIFOM capability) indicating whether or not capability of establishing the first PDN connection is supported for each MME 40. In other words, it is identification information indicating whether or not the MME 40 supports the NBIFOM function. Specifically, the NBIFOM capability may include "allowed" or "Not allowed".

Note that the NBIFOM function may be information indicating that it has a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the MME 40 is a gateway having a function of establishing the first PDN connection. In other words, the existence of the NBIFOM capability in the storage unit may mean that the MME 40 is a gateway supporting the NBIFOM function.

The UE 10 may store the NBIFOM capability by associating with the MME ID.

FIG. 8G illustrates the SGW capability. The SGW capability stores identification information (NBIFOM capability) indicating whether or not capability of establishing the first PDN connection is supported for each SGW 35. In other words, it is identification information indicating whether or not the SGW 35 supports the NBIFOM function. Specifically, the NBIFOM capability may include "allowed" or "Not allowed".

Note that the NBIFOM function may be information indicating having a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the SGW 35 is a gateway having a function of establishing the first PDN connection. In other words, the existence of the NBIFOM capability in the storage unit may mean that the SGW 35 is a gateway supporting the NBIFOM function.

The UE 10 may store the NBIFOM capability by associating with the SGW ID.

The TWAG capability, the network capability, the MME capability, and the SGW capability may be included in the UE context, or may be information separated from the UE context.

That is, the UE 10 may store the TWAG capability and the network capability by including them into the UE context, or may store the TWAG capability and the network capability separately from the UE context.

2.2.4. PGW Components

Next, components of the PGW 30 will be described. FIG. 9 illustrates a device configuration of the PGW 30. As illustrated in the figure, the PGW 30 is constituted of the IP mobile communication network interface unit 920, the control unit 900, and the storage unit 940. The IP mobile communication network interface unit 920 and the storage unit 940 are connected to the control unit 900 via a bus.

The control unit 900 is a function unit for controlling the PGW 30. The control unit 900 implements various processes by reading out and executing various programs stored in the storage unit 940.

The IP mobile communication network interface unit 920 is a function unit through which the PGW 30 is connected to the SGW 35 and or the PCRF 60 and/or the ePDG 65 and/or the AAA 55 and/or the GW 74.

The storage unit 940 is a function unit for storing programs, data, and the like necessary for each operation of the PGW 30. The storage unit 940 is constituted of, for example, a semiconductor memory, a Hard Disk Drive (HDD), or the like.

As illustrated in the figure, the storage unit 940 stores the EPS bearer context 942. Note that the EPS bearer context may be stored for each UE 10, stored for each APN, stored for each PDN connection, or stored for each transfer path and/or bearer.

First, the EPS bearer context for each UE 10 will be described. FIG. 10A illustrates an example of the EPS bearer context for each UE 10. As illustrated in the figure, the EPS bearer context includes at least IMSI, an ME identity, MSISDN, and a UE NBIFOM capability. The IMSI is information identifying a user of the UE 10. The ME identity is an ID of ME, and may be the IMEI/IMISV, for example. The MSISDN represents the phone number of the UE 10.

The UE NBIFOM capability is the NBIFOM capability of the UE 10. The UE NBIFOM capability is identification information indicating whether or not capability of establishing the first PDN connection is supported for each UE 10. More specifically, for example, the NBIFOM capability may include "allowed" or "Not allowed".

Alternatively, the UE NBIFOM capability may be identification information indicating that the UE 10 has capability of establishing the first PDN connection. That is, the existence of the UE NBIFOM capability may mean that the UE 10 has a function of establishing the first PDN connection.

Next, the EPS bearer context for each PDN connection will be described. FIG. 10B illustrates an example of the EPS bearer context for each PDN connection.

As illustrated in the figure, the context includes at least a PDN connection ID, an IP address, a PDN type, an APN, a network allowed mode, and an operation mode.

The PDN connection ID is identification information for identifying a PDN connection. The UE 10, the TWAG 74, the MME 40, and the PGW 30 may store the same identification information.

The IP address indicates an IP address assigned to the UE 10 for this PDN connection. The IP address may be an IPv4 and/or IPv6 prefix.

The PDN type indicates the type of the IP address. The PDN type indicates IPv4 or IPv6 or IPv4v6, for example. The APN is a label indicating an access destination of the network, in accordance with DNS naming conventions.

The network allowed mode indicates an operation mode allowed by the network. The network allowed mode may include the UE initiated mode or the Network-initiated mode or both of these modes.

The operation mode is identification information for a mode indicating which of the UE 10 or the network takes an initiative in transmitting/receiving data or is capable of starting communication control, if the current PDN connection is the first PDN connection.

More specifically, for example, the UE initiated mode in which the UE 10 can start the communication control or the Network-initiated mode in which the network can start the communication control may be identified.

Next, an example of the EPS bearer context for each transfer path and/or bearer will be described by using FIG. 10C. As illustrated in the figure, the context includes at least transfer path identification information and a routing rule.

The transfer path identification information is information for identifying a transfer path and/or bearer. The transfer path identification information may be an EPS bearer ID, for example.

Furthermore, the transfer path identification information may be associated with the TFT.

The routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the TWAG 74. Alternatively, the routing address may be an IP address of a Mobile Access Gateway (MAG).

The routing rule may be notified from the PGW 30 or the PCRF 60. Alternatively, the routing rule may be a value that the UE 10 stores beforehand as a default value.

The PGW 30 may include an IP header into the routing filter to switch the IP flow. Alternatively, the PGW 30 may include an application ID in the routing filter to switch the flow for each application. Alternatively, the routing filter may include the TFT.

The routing rule may store a plurality of rules. Furthermore, the routing rule may include priority for each rule.

FIG. 10D illustrates the TWAG capability. The TWAG capability stores identification information (NBIFOM capability) indicating whether or not capability of establishing the first PDN connection is supported for each TWAG 74. In other words, it is identification information indicating whether or not the TWAG 74 supports the NBIFOM function. Specifically, the NBIFOM capability may include "allowed" or "Not allowed".

Note that the NBIFOM function may be information indicating that it has a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the TWAG 74 is a gateway having a function of establishing the first PDN connection. In other words, the existence of the NBIFOM capability in the storage unit may mean that TWAG 74 is a gateway supporting the NBIFOM function.

The PGW 30 may store the NBIFOM capability by associating with the TWAG ID.

FIG. 10E illustrates an example of the network capability. The network capability stores the NBIFOM capability for each network. i.e., for each PGW 30.

Here, the NBIFOM capability is identification information indicating whether or not capability of establishing the first PDN connection is supported for each network. More specifically, for example, the NBIFOM capability may include "allowed" or "Not allowed".

Alternatively, the NBIFOM capability may be identification information indicating that it has the capability of establishing the first PDN connection. That is, the existence of the NBIFOM capability may mean that the PGW 30 and/or the network is a gateway having a function of establishing the first PDN connection.

As illustrated in FIG. 10E, the PGW 30 stores the NBIFOM capability by associating with the PGW ID. Furthermore, as illustrated in the figure, the NBIFOM capability may be stored by associating with each of a plurality of PGWs 30.

The PGW ID may be any information for identifying the PGW 30, and may be an APN, for example.

FIG. 10F illustrates the MME capability. The MME capability stores identification information (NBIFOM capability) indicating whether or not capability of establishing the first PDN connection is supported for each MME 40. In other words, it is identification information indicating whether or not the MME 40 supports the NBIFOM function. Specifically, the NBIFOM capability may include "allowed" or "Not allowed".

Note that the NBIFOM function may be information indicating having a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the MME 40 is a gateway having a function of establishing the first PDN connection. In other words, the existence of the NBIFOM capability in the storage unit may mean that the MME 40 is a gateway supporting the NBIFOM function.

The PGW 30 may store the NBIFOM capability by associating with the MME ID.

FIG. 10G illustrates the SGW capability. The SGW capability stores identification information (NBIFOM capability) indicating whether or not capability of establishing the first PDN connection is supported for each SGW 35. In other words, it is identification information indicating whether or not the SGW 35 supports the NBIFOM function. Specifically, the NBIFOM capability may include "allowed" or "Not allowed".

Note that the NBIFOM function may be information indicating that it has a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the SGW 35 is a gateway having a function of establishing the first PDN connection. In other words, the existence of the NBIFOM capability in the storage unit may mean that the SGW 35 is a gateway supporting the NBIFOM function.

The PGW 30 may store the NBIFOM capability by associating with the SGW ID.

The TWAG capability, the network capability, the MME capability, and the SGW capability may be included in the EPS bearer context, or may be information separated from the UE context.

2.2.5. PCRF Components

Next, components of the PCRF 60 will be described. FIG. 11 illustrates a device configuration of the PCRF 60. As illustrated in the figure, the PCRF 60 is constituted of the IP mobile communication network interface unit 1120, the control unit 1100, and the storage unit 1140. The IP mobile communication network interface unit 1120 and the storage unit 1140 are connected to the control unit 1100 via a bus.

The control unit 1100 is a function unit for controlling the PCRF 60. The control unit 1100 implements various processes by reading out and executing various programs stored in the storage unit 1140.

The IP mobile communication network interface unit 1120 is a function unit through which the PCRF 60 is connected to the PGW 30 and/or the TWAG 74 and/or the AAA 55.

The storage unit 1140 is a function unit for storing programs, data, and the like necessary for each operation of the PCRF 60. The storage unit 940 is constituted of, for example, a semiconductor memory, a Hard Disk Drive (HDD), or the like.

As illustrated in the figure, the storage unit 1140 stores a UE context 1142. Note that the UE context may be classified into the UE context stored for each UE 10 and the UE context stored for each PDN connection.

FIG. 12A illustrates the UE context for each UE 10. As illustrated in the figure, the context includes at least a subscriber ID and UE NBIFOM capability.

The subscriber ID is identification information of a user. For example, the subscriber ID may be IMSI.

The UE NBIFOM capability is the NBIFOM capability of the UE 10. The UE NBIFOM capability is identification information indicating whether or not the capability of establishing the first PDN connection is supported for each UE 10. In other words, the UE NBIFOM capability is identification information indicating whether or not the UE 10 supports the NBIFOM function. More specifically, for example, the NBIFOM capability may include "allowed" or "Not allowed".

Alternatively, the UE NBIFOM capability may be identification information indicating that the UE 10 has capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage unit may mean that the UE 10 supports the NBIFOM function.

Next, the UE context for each PDN connection will be described. FIG. 12B illustrates an example of the UE context for each PDN connection. As illustrated in the figure, the context may include at least an APN, an operation mode, a network policy, a charging rule, a PCC rule, and a QoS rule.

The APN is a label indicating an access destination of the network, in accordance with DNS naming conventions.

The operation mode is identification information for a mode indicating which of the UE 10 or the network takes an initiative in transmitting/receiving data or is capable of starting communication control, if the PDN connection is the first PDN connection.

More specifically, for example, an operation mode in which the UE 10 can start the communication control may be the UE initiated mode.

Furthermore, an operation mode in which the network and/or the PGW 30 and/or the PCRF 60 can start the communication control may be a Network-initiated mode.

The network policy is a communication control policy on the network side, and may include the network allowed mode. Alternatively, the PCRF 60 may store the network allowed mode separately from the network policy.

The charging rule is a regulation on charging. Based on the charging rule determined by the PCRF 60, a PCEF 60 performs charging.

The PCC rule is a regulation relating to control of the network policy and charging rule. Based on the PCC rule, the PCEF performs communication control and charging.

The QoS rule is a regulation relating to QoS of the flow. The QoS rule may be associated with the PCC rule.

FIG. 12C illustrates the UE context for each transfer path and/or bearer. As illustrated in the figure, the UE context for each transfer path and.or bearer includes at least the routing rule.

The routing rule indicates an association of a routing filter and a routing address or routing access type. Based on this association, whether using a communication path through the 3GPP access network or using a transfer path through the WLAN access network is determined.

Here, the routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the TWAG 74. Alternatively, the routing address may be an IP address of a Mobile Access Gateway (MAG).

The routing rule may be notified from the UE 10 and/or the TWAG 74 and/or the PGW 30. Alternatively, the routing rule may be a value that the PCRF 60 stores beforehand as a default value. In this case, the PCRF 60 may determine the default value of the routing rule, based on the PCC rule.

The routing filter may include an IP header to switch an IP flow. Alternatively, the routing filter may include an application ID to switch the flow for each application. Alternatively, the routing filter may include a TFT.

The routing rule may store a plurality of rules. Furthermore, the routing rule may include priority for each rule.

FIG. 12D illustrates an example of the TWAG capability stored by the TWAG 74. The TWAG capability stores identification information (NBIFOM capability) indicating whether or not capability of establishing the first PDN connection is supported for each TWAG 74. In other words, it is identification information indicating whether or not the TWAG 74 supports the NBIFOM function. Specifically, the NBIFOM capability may include "allowed" or "Not allowed".

Note that the NBIFOM function may be information indicating having a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the TWAG 74 is a gateway having a function of establishing the first PDN connection. In other words, the existence of the NBIFOM capability in the storage unit may mean that the TWAG 74 is a gateway supporting the NBIFOM function.

As illustrated in the figure, the NBIFOM capability may be stored by associating with the TWAG ID, which is the identification information of the TWAG 74. If not associated with the TWAG ID, the NBIFOM capability may mean the capability of the TWAG 74 to be stored.

If the TWAG ID and the NBIFOM capability are associated and stored, the PCRF 60 may store the TWAG capability of a plurality of TWAGs 74.

FIG. 12E illustrates an example of the network capability stored by the PCRF 60. The network capability stores the NBIFOM capability for each network, i.e., for each PGW 30.

Here, the NBIFOM capability is identification information indicating whether or not capability of establishing the first PDN connection is supported for each network. In other words, it is identification information indicating whether or not the PGW 30 supports the NBIFOM function. More specifically, for example, the NBIFOM capability may include "allowed" or "Not allowed".

Note that the NBIFOM function may be information indicating that it has a function of establishing the multi-access PDN connection based on the NBIFOM.

Alternatively, the NBIFOM capability may be identification information indicating that it has the capability of establishing the first PDN connection. In other words, the NBIFOM capability may be identification information indicating that it is a gateway supporting the NBIFOM function. That is, the existence of the NBIFOM capability in the storage unit may mean that the PGW 30 is a gateway having a function of establishing the first PDN connection. In other words, the existence of the NBIFOM capability in the storage unit may mean that the PGW 30 is a gateway supporting the NBIFOM function.

FIG. 12F illustrates the MME capability. The MME capability stores identification information (NBIFOM capability) indicating whether or not capability of establishing the first PDN connection is supported for each MME 40. In other words, it is identification information indicating whether or not the MME 40 supports the NBIFOM function. Specifically, the NBIFOM capability may include "allowed" or "Not allowed".

Note that the NBIFOM function may be information indicating that it has a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the MME 40 is a gateway having a function of establishing the first PDN connection. In other words, the existence of the NBIFOM capability in the storage unit may mean that the MME 40 is a gateway supporting the NBIFOM function.

The PCRF 60 may store the NBIFOM capability by associating with the MME ID.

FIG. 12G illustrates the SGW capability. The SGW capability stores identification information (NBIFOM capability) indicating whether or not capability of establishing the first PDN connection is supported for each SGW 35. In other words, it is identification information indicating whether or not the SGW 35 supports the NBIFOM function. Specifically, the NBIFOM capability may include "allowed" or "Not allowed".

Note that the NBIFOM function may be information indicating having a function of establishing the multi-access PDN connection based on the NBIFOM.

Alternatively, the NBIFOM capability may be identification information indicating having capability of establishing the first PDN connection. That is, the existence of the NBIFOM capability in the storage unit may mean that the SGW 35 is a gateway having a function of establishing the first PDN connection. In other words, the existence of the NBIFOM capability in the storage unit may mean that the SGW 35 is a gateway supporting the NBIFOM function.

The PCRF 60 may store the NBIFOM capability by associating with the SGW ID.

2.2.6. MME Configuration

A device configuration of the MME 40 will be described. The MME 40 is constituted of the IP mobile communication network interface unit 320, the control unit 300, and the storage unit 340. The IP mobile communication network interface unit 320 and the storage unit 340 are connected to the control unit 300 via a bus.

The control unit 300 is a function unit for controlling the MME 40. The control unit 300 implements various processes by reading out and executing various programs stored in the storage unit 340.

The IP mobile communication network interface unit 320 is a function unit through which the MME 40 is connected to the PGW 30.

The storage unit 340 is a function unit for storing programs, data, and the like necessary for each operation of the MME 40. The storage unit 340 is constituted of, for example, a semiconductor memory, a Hard Disk Drive (HDD), or the like.

The storage unit 340 stores the MME capability 342, the network capability 344, and the EPS bearer context 346. Hereinafter, information elements stored in the storage unit 340 will be described.

Information elements stored in the storage unit 340 will be described. An example of the MME capability stored by the MME 40 will be illustrated. The MME capability stores identification information (NBIFOM capability) indicating whether or not capability of establishing the first PDN connection is supported for each MME 40. In other words, it is identification information indicating whether or not the MME 40 supports the NBIFOM function. Specifically, the NBIFOM capability may include "allowed" or "Not allowed".

Note that the NBIFOM function may be information indicating that it has a function of establishing the multi-access PDN connection based on the NBIFOM.

Alternatively, the NBIFOM capability may be identification information indicating that it has the capability of establishing the first PDN connection. That is, the existence of the NBIFOM capability in the storage unit may mean that the MME 40 is a location management device having a function of establishing the first PDN connection. In other words, the existence of the NBIFOM capability in the storage unit may mean that the MME 40 is a location management device supporting the NBIFOM function.

The NBIFOM capability may be stored by associating with the MME ID, which is the identification information of the MME 40. If not associated with the MME ID, the NBIFOM capability may mean capability of the MME 40 to be stored.

If the MME ID and the NBIFOM capability are associated and stored, the MME 40 may store the MME capability of a plurality of MMEs 40.

In this case, when the UE 10 performs handover to another MME 40, the MME 40 may select an MME 40 to which the handover is made, on the basis of the MME capability.

Next, the network capability 344 will be described. An example of the network capability stored by the MME 40 will be described. The network capability stores the NBIFOM capability for each network, i.e., for each PGW 30.

Here, the NBIFOM capability is identification information indicating whether or not capability of establishing the first PDN connection is supported for each network. In other words, it is identification information indicating whether or not the PGW 30 supports the NBIFOM function. More specifically, for example, the NBIFOM capability may include "allowed" or "Not allowed".

Note that the NBIFOM function may be information indicating that it has a function of establishing the multi-access PDN connection based on the NBIFOM.

Alternatively, the NBIFOM capability may be identification information indicating that it has the capability of establishing the first PDN connection. In other words, the NBIFOM capability may be identification information indicating that it is a location management device supporting the NBIFOM function. That is, the existence of the NBIFOM capability in the storage unit may mean that the PGW 30 is a gateway having a function of establishing the first PDN connection. In other words, the existence of the NBIFOM capability in the storage unit may mean that the PGW 30 is a location management device supporting the NBIFOM function.

The MME 40 stores the NBIFOM capability by associating with the PGW ID. Furthermore, the NBIFOM capability may be stored by associating with each of a plurality of PGWs 30.

The PGW ID may be any information for identifying the PGW 30, and may be an Access Point Name (APN), for example.

Next, the EPS bearer context will be described. The EPS bearer context may be classified into an EPS bearer context for each UE 10 stored for each UE 10, an EPS bearer context for each PDN connection, and an EPS bearer context for each bearer and/or transfer path.

Information elements included in the EPS bearer context for each UE 10 will be described. The MME 40 stores, for each UE 10, the UE NBIFOM capability and the NBIFOM allowed.

The UE NBIFOM capability is the NBIFOM capability of the UE 10. The UE NBIFOM capability is identification information indicating whether or not capability of establishing the first PDN connection is supported for each UE 10. In other words, the UE NBIFOM capability is identification information indicating whether or not the UE 10 supports the NBIFOM function. More specifically, for example, the UE NBIFOM capability may include "allowed" or "Not allowed".

Note that the NBIFOM function may be information indicating that it has a function of establishing the multi-access PDN connection based on the NBIFOM.

Alternatively, the UE NBIFOM capability may be identification information indicating that the UE 10 has capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage unit may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with a plurality of APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection based on the NBIFOM by using the APN 1. Note that the APN 1 is also allowed to establish the conventional PDN connection, not the multi-access PDN connection.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2. The NBIFOM allowed may be stored before the PDN connection is established.

The MME 40 may access the HSS 5550 to acquire the NBIFOM allowed before the PDN connection is established and/or during the establishment procedure.

Furthermore, the EPS bearer context for each UE 10 may include the identification information of the UE 10. The identification information of the UE 10 may be IMSI.

The EPS bearer context for each PDN connection will be described. The EPS bearer context for each PDN connection includes a PDN connection ID, a network allowed mode, an operation mode, a User Plane Connection ID, an MME MAC address, and an NBIFOM permission.

The PDN connection ID is identification information for identifying a PDN connection. The UE 10, the MME 40, and the PGW 30 may store the same identification information.

The operation mode is identification information for a mode indicating which of the UE 10 or the network takes an initiative in transmitting/receiving data or is capable of starting communication control, if the PDN connection is the first PDN connection.

More specifically, for example, an operation mode in which the UE 10 can start the communication control may be the UE initiated mode.

Furthermore, an operation mode in which the network and/or the PGW 30 and/or the PCRF 60 can start the communication control may be a Network-initiated mode.

The network allowed mode indicates an operation mode allowed by the network. The network allowed mode may include the UE-initiated mode or the Network-initiated mode or both of these modes.

The User Plane Connection ID is identification information identifying a connection used for user data transmission when the UE 10 establishes a transfer path through the MME 40.

The NBIFOM permission is information indicating that this PDN connection has established the multi-access PDN connection. In other words, the NBIFOM permission indicates that the first PDN connection is established.

That is, the fact that the MME 40 stores the NBIFOM permission means that this PDN connection is the first PDN connection.

The NBIFOM permission is identification information stored by the MME 40 by establishing the PDN connection. The MME 40 may access the HSS 5550 to acquire the NBIFOM permission during the establishment of the PDN connection. Alternatively, the MME 40 may store the NBIFOM permission, based on the fact that the multi-access PDN connection has been established.

Next, the EPS bearer context for each bearer and/or transfer path will be described. The EPS bearer context for each bearer and/or transfer path may include the transfer path identification information and the routing rule.

The transfer path identification information is information for identifying a transfer path and/or bearer. The transfer path identification information may be an EPS bearer ID, for example.

The routing rule indicates an association of a routing filter and a routing address or routing access type. Based on this association, whether using a communication path through the 3GPP access network or using a communication path through the WLAN access network is determined.

Here, the routing access type indicates an access network through which the flow passes. For example, the routing access type indicates the 3GPP or the WLAN.

Furthermore, the routing address indicates an IP address that can be passed through. For example, the routing address may be an IP address of the SGW 35. Alternatively, the routing address may be an IP address of the MME 40. Alternatively, the routing address may be an IP address of a Mobile Access Gateway (MAG).

The routing rule may be notified from the PGW 30 or the PCRF 60, or may be notified from the UE 10. Alternatively, the routing rule may be a value that the MME 40 stores beforehand as a default value.

The routing filter may include an IP header to switch an IP flow. Alternatively, the routing filter may include an application ID to switch the flow for each application. Alternatively, the routing filter may include a TFT.

The routing rule may store a plurality of rules. Furthermore, the routing rule may include priority for each rule.

The SGW capability stores identification information (NBIFOM capability) indicating whether or not capability of establishing the first PDN connection is supported for each SGW 35. In other words, it is identification information indicating whether or not the SGW 35 supports the NBIFOM function. Specifically, the NBIFOM capability may include "allowed" or "Not allowed".

Note that the NBIFOM function may be information indicating having a function of establishing the multi-access PDN connection based on the NBIFOM.

Alternatively, the NBIFOM capability may be identification information indicating having capability of establishing the first PDN connection. That is, the existence of the NBIFOM capability in the storage unit may mean that the SGW 35 is a gateway having a function of establishing the first PDN connection. In other words, the existence of the NBIFOM capability in the storage unit may mean that the SGW 35 is a gateway supporting the NBIFOM function.

The MME 40 may store the NBIFOM capability by associating with the SGW ID.

The MME capability and the network capability may be included in the EPS bearer context.

2.3. Description of Initial State

An initial state in the present embodiment will be described. The initial state in the present embodiment may be a first initial state described later.

Note that the initial state in the present embodiment may not be limited to the first initial state.

2.3.1. Description of First Initial State

The first initial state will be described. In the first state, the UE 10 has not established the first PDN connection with the core network 90. However, the UE 10 has already established the second PDN connection. In greater detail, the UE 10 has not established the first PDN connection with the PGW_A 1310.

However, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be constituted of a transfer path between the UE 10 and the PGW 30 through the access network A. Thus, the second PDN connection may be constituted of a transfer path obtained by combining a transfer path between the UE 10 and the eNB 45, a transfer path between the eNB 45 and the SGW 35, and a transfer path between the SGW 35 and the PGW_B 1320. Here, the transfer path may be a bearer.

As described above, in the first initial state, the UE 10 may be in a state connected to the core network 90 via the access network A.

Note that the UE 10 may not need to be connected to the core network 90 via the access network B. In other words, the UE 10 may not need to perform an attach through the WLAN access network.

Alternatively, the UE 10 may be in a state connected to the core network 90 via the access network B. In this case, the UE 10 may perform an attach procedure started with an initiative of the UE 10 to establish a third PDN connection.

Note that the third PDN connection may be established with the gateway selected by using the APN 2. Alternatively, the third PDN connection may be established with a gateway selected by using another APN different from the APN 1 and the APN 2.

The first initial state has been described above; however, the first initial state is not limited thereto, and may be, for example, a state in which the multi-access PDN connection based on the NBIFOM is not established through the access network A.

2.3.2. Description of Procedure for Leading to First Initial State

A procedure for leading to the first initial state will be described by using FIG. 15. In the procedure for leading to the first initial state, at least a PDN connectivity procedure to the core network 90 through the access network A, illustrated by (A) in FIG. 15, is performed. The first initial state is a state after at least the attach procedure to the core network 90 through the access network A, illustrated by (A) in FIG. 15, is performed.

Next, details of the attach procedure to the core network 90 through the access network A will be described.

The UE 10 performs an attach procedure for establishing the second PDN connection with the core network 90 through the access network A. In greater detail, the UE 10 establishes, via the eNB 45 arranged in the access network A and the SGW 35 arranged in the core network 90, the PDN connection with the PGW_B 1320 arranged in the core network 90. Note that the establishment and management of the PDN connection are performed by the MME 40 arranged in the core network 90. Furthermore, the MME 40 also performs the selection of the SGW 35 and the selection of the PGW 30 using the APN.

Specifically, when establishing the second PDN connection, the UE 10 transmits an Attach request to the MME 40 via the eNB 45. The MME 40 receives the Attach request transmitted by the UE 10. Based on the reception of the Attach request, the MME 40 performs a procedure for establishing security association with the UE 10.

Here, the UE 10 may transmit the Attach request including the APN 2. Alternatively, the UE 10 may transmit the APN 2 to the MME 40 after a security association procedure between the UE 10 and the MME 40 described later is completed.

Upon the completion of the security association procedure, the MME 40 transmits an Attach accept to the UE 10 via the eNB 45. The MME 40 may transmit an Activate default EPS bearer context request including the APN 2.

The UE 10 receives the Attach accept transmitted by the MME 40. Based on the Attach accept, the UE 10 transmits an Attach complete to the MME 40 via the eNB 45.

The MME 40 receives the Attach request transmitted by the UE 10.

2.3.3. Description of Multi-Access PDN Connection Establishment Procedure

Next, an establishment procedure of the first PDN connection will be described. Here, the initial state may be the first initial state. In the present embodiment, after the establishment of the initial state, the UE 10 performs a PDN connectivity procedure for establishing the first PDN connection with the core network 90 through the access network A. In greater detail, the UE 10 establishes, via the eNB 45 arranged in the access network A and the SGW 35 arranged in the core network 90, the first PDN connection with the PGW_A 1310 arranged in the core network 90.

Note that the first PDN connection may be constituted of a transfer path obtained by combining a transfer path between the UE 10 and the eNB 45, a transfer path between the eNB 45 and the SGW 35, and a transfer path between the eNB 45 and the PGW_A 1310. Here, the transfer path may be a bearer.

As illustrated in FIG. 15, the procedure for establishing the first PDN connection may be a PDN connectivity procedure using the APN 1.

A specific example of the PDN connectivity procedure will be described below.

2.4. Examples of PDN Connectivity Procedure

An example of the PDN connectivity procedure for establishing the first PDN connection will be described by using FIG. 16.

2.4.1. Example of First PDN Connectivity Procedure

An example of the first PDN connectivity procedure will be described by using FIG. 16.

The UE 10 first transmits a PDN connectivity request to the MME 40 via the eNB 45 (S2102). The UE 10 may transmit the PDN connectivity request including at least the PDN connectivity request message identity (PDN connectivity request message ID), the Procedure transaction identity (Procedure transaction ID), the Request type, the PDN type, the Protocol discriminator, and the EPS bearer identify (EPS bearer ID). Furthermore, the UE 10 may include at least the first identification information and/or sixth identification information into the PDN connectivity request. Moreover, the UE 10 may include the Access Point Name (APN) and/or the Protocol Configuration Options (PCOs) and/or the Traffic Flow Templates (TFTs) into the PDN connectivity request. Note that the UE 10 may transmit the PCO including the first identification information and/or the sixth identification information and/or the TFT.

Here, the first identification information may be the UE NBIFOM capability representing that the UE 10 supports the NBIFOM. Note that the NBIFOM capability may be information indicating that it has a function of establishing the multi-access PDN connection based on the NBIFOM.

In addition, the sixth identification information may be a request NBIFOM representing that the NBIFOM operation mode for the multi-access PDN connection is requested to be determined. Additionally/alternatively, the sixth identification information may be information representing that an NBIFOM operation mode allowed for the multi-access PDN connection based on the NBIFOM to be established is requested.

As described above, the UE 10 may transmit the PDN connectivity request including the first identification information and/or sixth identification information to request the establishment of the multi-access PDN connection based on the NBIFOM, without requesting a certain NBIFOM operation mode.

The PDN connectivity request message ID may be the message type representing the PDN connectivity request message.

The Procedure transaction ID may be information identifying the PDN connectivity procedure.

The APN may be an APN to which the UE 10 requests connection. More specifically, the APN may be the APN 1. The UE 10 may include the APN 1 to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The Request type may be information identifying the type of the PDN connectivity procedure to be requested. For example, since the UE 10 performs an initial connection by using the APN 1, the Request type may be the type indicating an attach, not the type indicating a handover.

The PDN type may indicate an available IP version. For example, the PDN type may be the IPv4, may be the IPv6, or may be the IPv4v6.

The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information to be requested. Note that the UE 10 may transmit the PCO including the first identification information.

The TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that in the present example, in accordance with the transmission of the PDN connectivity request, the UE 10 does not request a certain NBIFOM operation mode, and thus, the UE 10 may transmit the PDN connectivity request without including the TFT. In other words, if the UE 10 requests the establishment of the multi-access PDN connection based on the NBIFOM without requesting the certain NBIFOM operation mode, the UE 10 may transmit the PDN connectivity request without including the TFT. More specifically, if the UE 10 includes the first identification information and/or the sixth identification information, the UE 10 may transmit the PDN connectivity request without including the TFT.

Note that conventionally, the UE 10 can perform transmission by including information indicating the IFOM support in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, by including the information indicating the IFOM support in the PCO, the UE 10 can switch the access network through which the communication of a certain IP flow is performed.

In the present embodiment, if the UE 10 includes the first identification information and the sixth identification information in the PCO, the UE 10 does not include the IFOM support. In contrast, if the UE 10 includes the IFOM support into the PCO, the UE 10 does not include the first identification information and/or the sixth information. As described above, it may be possible to not configure both of the first identification information and the IFOM support to be effective to ensure a clear distinction between use of the switching of the communication path on the basis of the NBIFOM and that of the switching of the communication path on the basis of the IFOM.

Thus, the UE 10 can establish either one of the PDN connection supporting the IFOM or the PDN connection supporting the NBIFOM, through the establishment procedure of a single PDN connection. In other words, the single PDN connection is any one of the PDN connection supporting the NBIFOM, the PDN connection supporting the IFOM, or the single-access PDN connection.

The MME 40 receives the PDN connectivity request transmitted by the UE 10. Based on the reception of the PDN connectivity request and/or the first identification information and/or sixth identification information included in the PDN connectivity request, the MME 40 transmits a session generation request to the SGW 35 (S2104).

Based on the reception of the PDN connectivity request and/or the first identification information and/or sixth identification information included in the PDN connectivity request, the MME 40 may transmit the session generation request including at least the first identification information and/or sixth identification information.

Furthermore, the MME 40 may include the TFT into the session generation request, on the basis of the reception of the TFT transmitted by the UE 10.

Furthermore, the TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that if both of the first identification information and the sixth identification information are not included in the PDN connectivity request, the MME 40 may transmit the session generation request without including the first identification information and/or the sixth identification information. Moreover, if the first identification information and/or the sixth identification information is not included in the PDN connectivity request, the MME 40 may perform a procedure for establishing the single-access PDN connection.

The SGW 35 receives the session generation request transmitted by the MME 40. Based on the reception of the session connectivity request, and/or the first identification information and/or sixth identification information included in the session connectivity request, the SGW 35 transmits the session generation request to the PGW 30 (S2106).

Based on the reception of the session connectivity request and/or the first identification information and/or sixth identification information included in the session connectivity request, the SGW 35 may transmit the session generation request including at least the first identification information and/or sixth identification information. Furthermore, the SGW 35 may include the TFT into the session generation request.

Furthermore, the TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that if both of the first identification information and the sixth identification information are not included in the PDN connectivity request, the SGW 35 may transmit the session generation request without including the first identification information and/or the sixth identification information. Moreover, if the first identification information and/or the sixth identification information is not included in the PDN connectivity request, the MME 40 may perform a procedure for establishing the single-access PDN connection.

The PGW 30 receives the session generation request transmitted by the SGW 35. Based on the reception of the session generation request, and/or the first identification information and/or sixth identification information included in the session generation request, the PGW 30 may perform the IP-CAN session update procedure with the PCRF 60 (S2108).

Based on the reception of the session generation request and/or the first identification information and/or sixth identification information included in the session generation request, the PGW 30 may perform the IP-CAN session update procedure including at least the first identification information and/or the sixth identification information.

Note that the PGW 30 may perform the IP-CAN session update procedure to notify the PCRF 60 of information of the UE 10 and/or eNB 45 and/or MME 40 and/or SGW 35.

The PGW 30 may transmit, to the PCRF 60, a control message in the IP-CAN session procedure, including information indicating whether the PDN connection to be established is the multi-access PDN connection or the single-access PDN connection, and/or the first identification information, and/or the sixth identification information.

More specifically, if the multi-access PDN connection is to be established, the PGW 30 transmits, to the PCRF 60, the information indicating the access network A, the PDN connection ID, the information indicating that the PDN connection is the multi-access PDN connection, and the first identification information and/or sixth identification information. Alternatively, if the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information uniquely identifying the PDN connection that the UE 10 establishes with the PGW 30.

Furthermore, based on the reception of the first identification information and/or sixth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Based on the reception of the session generation request or the completion of the IP-CAN session update procedure, and/or the first identification information and/or sixth identification information included in the session generation request, and/or the seventh identification information included in the IP-CAN session update procedure, the PGW 30 transmits a session generation response to the SGW 35 (S2110).

Based on the reception of the session generation request or the completion of the IP-CAN session update procedure, and/or the first identification information and/or sixth identification information included in the session generation request, and/or the seventh identification information included in the IP-CAN session update procedure, the PGW 30 may transmit the session generation response including at least the seventh identification information.

Furthermore, the PGW 30 may include the PDN Address and/or the PDN connection ID and/or the TFT into the session generation response.

Note that a method by which the PGW 30 acquires the seventh identification information is not limited to the above-described method for acquiring the seventh identification information from the PCRF 60 through the IP-CAN session update procedure, and another example may be employed. For example, the PGW 30 may generate the seventh identification information and transmit the session generation response including the seventh identification information, without acquiring the seventh identification information from the PCRF 60 through the IP-CAN session update procedure.

Here, the seventh identification information may be the allowed mode representing the NBIFOM operation mode that is allowed for the multi-access PDN connection based on the NBIFOM to be established. In other words, the seventh identification information may be the operation mode allowed by the operator.

Note that the PCRF 60 or the PGW 30 may determine the allowed mode and the seventh identification information, on the basis of the operator policy. For example, a policy that allows the establishment of only the PDN connection of the UE-initiated mode, a policy that allows the establishment of only the PDN connection of the newtork-initiated mode, a policy that allows the establishment of both modes, a policy that prohibits the establishment of both modes, and the like may be managed.

Note that the PCRF 60 or the PGW 30 may acquire the operator policy from the HSS 55 and the like. Alternatively, an operator policy generated by an administrator may be stored.

In addition, for the operator policy, a policy different for each subscriber may be managed. Alternatively, a policy different for each APN may be managed. For example, for each APN, a different allowed mode for the PDN connection to be established may be managed.

Based on the allowed mode, the PCRF 60 or the PGW 30 may include the allowed operation mode into the seventh identification information.

In other words, if only the Network-initiated mode is allowed, the PCRF 60 or the PGW 30 may include the Network-initiated mode into the seventh identification information. Alternatively, if only the UE-initiated mode is allowed, the PCRF 60 or the PGW 30 may include the UE-initiated mode into the seventh identification information.

Note that if both of the UE-initiated mode and the Network-initiated mode are allowed, the seventh identification information may include both operation modes. Alternatively, if both of the UE-initiated mode and the Network-initiated mode are allowed and a default operation mode is configured, the seventh identification information may include only the default operation mode. Note that which of the UE-initiated mode and the Network-initiated mode is defined as the default operation mode may be configured based on the operator policy.

Note that, if the establishment of the PDN connection of all operation modes is not allowed, the PCRF 60 may transmit, to the PGW 30, the cause information indicating that the Requested Operation Mode is not allowed.

If the establishment of the PDN connection of all operation modes is not allowed, the PGW 30 may not need to notify, via the SGW 35, the MME 40 of the seventh identification information.

If the establishment of the PDN connection of all operation modes is not allowed, the PGW 30 may transmit, to the MME 40 via the SGW 35, the session generation response including the cause information indicating that the Requested Operation Mode is not allowed.

If the establishment of the PDN connection of all operation modes is not allowed, the PGW 30 may notify, via the SGW 35, the MME 40 that there is no allowed operation.

As described above, on the basis of the allowed mode, the PCRF 60 or the PGW 30 may regard an operation mode that is allowed to establish the PDN connection as the seventh identification information.

Note that if the Network-initiated mode is not included in the seventh identification information, the PCRF 60 may not need to transmit the TFT to the PGW 30.

In other words, only if the Network-initiated mode is included in the seventh identification information, the PCRF 60 may transmit the TFT to the PGW 30.

Note that if the Network-initiated mode is not included in the seventh identification information, the PGW 30 may not need to transmit the TFT to the MME 40 via the SGW 35. Thus, in this case, the PGW 30 may not need to include the TFT into the session generation response.

In other words, only if the Network-initiated mode is included in the seventh identification information, the PGW 30 may transmit the TFT to the MME 40 via the SGW 35. Thus, in this case, the PGW 30 may include the TFT into the session generation response.

The PDN Address may be an IP address assigned to the UE 10. For example, the PDN Address may be the IPv4 address, or may be the IPv6 prefix and an interface ID for constituting an IPv6 address. Here, the PGW 30 may assign the IP address of the UE 10. Moreover, the PGW 30 may include the IP address assigned to the UE 10 into the PDN Address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The SGW 35 receives the session generation response transmitted by the PGW 30. Based on the reception of the session generation response and/or the seventh identification information included in the session generation response, the SGW 35 transmits the session generation response to the MME 40 (S2112).

Based on the reception of the session generation response and/or the seventh identification information included in the session generation response, the SGW 35 may transmit the session generation response including at least the seventh identification information.

Furthermore, the SGW 35 may include the PDN Address and/or the PDN connection ID and/or the TFT into the session request response.

The MME 40 receives the session generation response transmitted by the SGW 35. Based on the reception of the session generation response and/or the seventh identification information included in the session generation response, the MME 40 transmits an Activate default EPS bearer context request to the eNB 45 (S2114).

Based on the reception of the session generation response and/or the seventh identification information included in the session generation response, the MME 40 may transmit the Activate default EPS bearer context request including at least the Activate default EPS bearer context request message identity (Activate default EPS bearer context request message ID), the Procedure transaction ID, the APN, the PDN Address, the Protocol discriminator, the EPS bearer ID, and the EPS QoS. Furthermore, the MME 40 may include at least the seventh identification information into the Activate default EPS bearer context request. Moreover, the MME 40 may include the PCO and/or an ESM cause and/or the TFT and/or the PDN connection ID and/or PDN connection attribute information into the Activate default EPS bearer context request. Note that the MME 40 may transmit the PCO including the seventh identification information and/or the TFT and/or the PDN connection ID.

Here, the Activate default EPS bearer context request message ID may be the message type representing the Activate default EPS bearer context request message.

The APN may be an APN to which the UE 10 is allowed to be connected. More specifically, the APN may be the APN 1. The APN 1 may be an APN that is allowed to establish the multi-access PDN connection based on the NBIFOM. The MME 40 may include the APN 1 into the Activate default EPS bearer context request.

The PDN Address may be an IP address assigned to the UE 10. For example, the PDN Address may be the IPv4 address, or may be the interface ID for constituting the IPv6 address. The EPS QoS may be a state representing QoS of the EPS bearer.

The PDN connection attribute information may be information indicating that the PDN connection established through the present PDN connectivity procedure is the multi-access PDN connection, and/or information indicating that user data transmitted/received by using the PDN connection established through the present PDN connectivity procedure is allowed to be transmitted/received through the access network A and the access network B, and/or information indicating that the PDN connection established through the present PDN connectivity procedure is the multi-access PDN connection of the operation mode indicated by the seventh identification information.

Note that the UE 10 may transmit the Activate default EPS bearer context request message, further including the connectivity type indicating the type of the PDN connection and/or the WLAN offload permission information (WLAN offload acceptability) indicating whether or not the WLAN offload can be performed. Furthermore, the MME 40 may transmit the connectivity type or the WLAN offload permission information including the PDN connection attribute information.

The ESM cause may be information representing that the PDN type of the PDN Address assigned to the UE 10 is different from the PDN type requested by the UE 10 in the PDN connectivity request.

Note that the MME 40 and/or the PGW 30 may include the seventh identification information into the PCO. However, if the MME 40 and/or the PGW 30 includes the seventh identification information into the PCO, the MME 40 and/or the PGW 30 does not include the IFOM support. In contrast, if the MME 40 and/or the PGW 30 includes the IFOM support into the PCO, the MME 40 and/or the PGW 30 does not include the seventh identification information. As described above, it may be possible to not configure both of the seventh identification information and the IFOM support to be effective to ensure a clear distinction between use of the switching of the communication path on the basis of the NBIFOM and that of the switching of the communication path on the basis of the IFOM.

The eNB 45 receives the Activate default EPS bearer context request transmitted by the MME 40. Based on the reception of the Activate default EPS bearer context request, the eNB 45 transfers the Activate default EPS bearer context request to the UE 10.

The eNB 45 may transmit, to the UE 10, at least an RRC connectivity configuration request (RRC Connection Reconfiguration), together with the Activate default EPS bearer context request (S2116).

The UE 10 receives the RRC connectivity configuration request transmitted by the eNB 45. Furthermore, the UE 10 receives the Activate default EPS bearer context request that is transmitted by the MME 40 and transferred by the eNB 45.

Based on the reception of the RRC connectivity configuration request, the UE 10 transmits an RRC connectivity configuration complete (RRC Connection Reconfiguration Complete) to the eNB 45 (S2118).

The eNB 45 receives the RRC connectivity configuration complete transmitted by the UE 10. Based on the RRC connectivity configuration complete, the eNB 45 transmits a bearer configuration to the MME 40. The MME 40 receives the bearer configuration transmitted by the eNB 45 (S2120).

Based on the reception of the Activate default EPS bearer context request and/or the seventh identification information included in the Activate default EPS bearer context request, the UE 10 transmits an activate default EPS bearer context accept to the MME 40 (S2122) (S2124).

The UE 10 may transmit the activate default EPS bearer context accept including at least the activate default EPS bearer context accept message identity (activate default EPS bearer context accept message ID), the Procedure transaction ID, the Protocol discriminator, and the EPS bearer ID.

Furthermore, the UE 10 may include the PCO into the activate default EPS bearer context accept.

Furthermore, if a plurality of INFOM operation modes are included in the seventh identification information, the UE 10 may include at least the fifth identification information into the activate default EPS bearer context accept. In other words, if the plurality of INFOM operation modes are allowed, the UE 10 may select one mode of the allowed modes and transmit the fifth identification information including the one mode.

Specifically, if the UE-initiated mode and the Network-initiated mode are included in the seventh identification information included in the Activate default EPS bearer context request, the UE 10 may include the UE-initiated mode or the Network-initiated mode into the fifth identification information.

Which of the UE-initiated mode and the Network-initiated mode is to be included into the fifth identification information may be determined on the basis of the UE policy.

Note that the UE policy may be any information configured to the UE 10. For example, the UE policy may be information configured by a user.

Here, the activate default EPS bearer context accept message ID may be the message type representing the activate default EPS bearer context accept message.

After the first PDN connectivity procedure is completed, the UE 10 and the PGW 30 establish the first PDN connection of the operation mode determined by the operator policy. Alternatively, the UE 10 establishes the first PDN connection of an operation mode selected from one of the operation modes allowed by the operator policy. Note that based on the reception of the Activate default EPS bearer context request and/or the PDN connection attribute information and/or the seventh identification information and/or the operation mode selected based on the seventh identification information, the UE 10 may identify the NBIFOM operation mode for the established PDN connection. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified based on the TFT. More specifically, the UE 10 and the PGW 30 transmit/receive a flow identified based on the TFT by using the first PDN connection.

Note that in the example of the first PDN connectivity procedure, a case has been described in which the transmission/reception of the TFT is included in the PDN connectivity procedure; however, the example is not limited thereto. The transmission/reception of the TFT may be performed after the multi-access PDN connection based on the NBIFOM is established.

Therefore, the UE 10 and the MME 40 may perform transmission/reception without including the TFT into the PDN connectivity request and/or the Activate default EPS bearer context request, and establish the multi-access PDN connection based on the NBIFOM. In other words, at the time point when the PDN connection is established, there may be no IP flow transmitting/receiving user data by using the PDN connection. In this case, the UE 10 and the MME 40 transmit the TFT after the multi-access PDN connection is established.

More specifically, if the PDN connection of the UE-initiated mode is established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified based on the TFT.

Meanwhile, if the PDN connection of the Network-initiated mode is established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45.

Thus, the UE 10 and the PGW 30 can determine a PDN connection and/or a transfer path (such as an EPS bearer) for transmitting/receiving the IP flow by using the TFT, and transmit/receive user data corresponding to the IP flow identified based on the TFT.

Furthermore, in the example of the first PDN connectivity procedure, a case has been described in which the UE 10 and the PGW 30 establish the first PDN connection of the operation mode selected by the UE 10 from one of the operation mode determined by the operator policy and the operation mode allowed by the operator policy; however, the example is not limited thereto. The UE 10 may reject the establishment of the first PDN connection.

For example, if the UE 10 does not support the operation mode allowed by the operator policy and/or if the operation mode allowed by the operator policy does not comply with the policy of the UE 10, the UE 10 may reject the establishment of the first PDN connection.

In greater detail, based on the reception of the Activate default EPS bearer context request and/or the seventh identification information included in the Activate default EPS bearer context request and/or the PDN connection attribute information and/or the policy of the UE 10, the UE 10 may transmit the Activate default EPS bearer context reject to the MME 40 via the eNB 45.

The UE 10 may transmit the Activate default EPS bearer context reject including at least the Activate default EPS bearer context reject message identity (Activate default EPS bearer context reject message ID), the Procedure transaction ID, the Protocol discriminator, the EPS bearer ID, and the ESM cause. Furthermore, the UE 10 may further include fourth identification information into the Activate default EPS bearer context reject. Furthermore, the UE 10 may further include the PCO into the Activate default EPS bearer context reject. Note that the UE 10 may transmit the PCO including the fourth identification information.

The fourth identification information may be information representing that the UE 10 does not support the operation mode allowed by the operator policy and/or information representing that the operation mode allowed by the operator policy does not comply with the policy of the UE 10.

The Activate default EPS bearer context reject message ID may be the message type representing the Activate default EPS bearer context reject message.

The ESM cause may be information representing a reason why the Activate default EPS bearer context request is rejected. Here, the UE 10 may notify the UE 10 of the fourth identification information by including the information into the ESM cause.

The MME 40 may receive the Activate default EPS bearer context reject transmitted by the UE 10. Based on the reception of the Activate default EPS bearer context reject and/or the fourth identification information included in the Activate default EPS bearer context reject, the MME 40 may delete the EPS bearer context, held by the MME 40, relating to the established PDN connection. Furthermore, the MME 40 may transmit, to the SGW 35, the fourth identification information included in the Activate default EPS bearer context reject.

The SGW 35 may receive the fourth identification information transmitted by the MME 40. Based on the reception of the fourth identification information and/or the operator policy, the SGW 35 may delete the EPS bearer context, held by the SGW 35, relating to the established PDN connection.

Furthermore, the SGW 35 may transmit, to the PGW 30, the fourth identification information received from the MME 40.

The PGW 30 may receive the fourth identification information transmitted by the SGW 35. Based on the reception of the fourth identification information and/or the operator policy, the PGW 30 may delete the EPS bearer context, held by the PGW 30, relating to the established PDN connection.

Furthermore, the PGW 30 may perform the IP-CAN session update procedure with the PCRF 60, on the basis of the reception of the fourth identification information. The PGW 30 may include the fourth identification information into the IP-CAN session update procedure.

The PCRF 60 may change the operator policy, on the basis of the IP-CAN session update procedure. Note that based on the change of the operator policy, the PGW 30 may delete the EPS bearer context, held by the PGW 30, relating to the established PDN connection.

Note that if the multi PDN connection is established, it is possible to perform a procedure for adding a new transfer path. Meanwhile, if the single-access PDN connection is established, it is possible to change the transfer path, but not possible to perform a procedure for adding a transfer path.

2.4.2. Description of State After PDN Connection Establishment Procedure

Performing the above-described first to first PDN connectivity procedure leads to a first state and a second state described later.

Note that an initial state in the additional attach procedure may be the second state. The initial state in the additional attach procedure may not be limited to the second state.

2.4.3. Description of First State

The first state will be described by using FIG. 13. In the first state, the UE 10 has established the first PDN connection with the core network 90. However, the UE 10 has not yet established the second PDN connection. In greater detail, the UE 10 has established the first PDN connection with the PGW_A 1310. However, the UE 10 has not established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network A. Thus, the first PDN connection may be constituted of a transfer path obtained by combining a transfer path between the UE 10 and the eNB 45, a transfer path between the eNB 45 and the SGW 35, and a transfer path between the SGW 35 and the PGW_A 1310. Here, the transfer path may be a bearer.

As described above, in the first state, the UE 10 may be in a state in which the multi-access PDN connection based on the NBIFOM is established via the access network A. In addition, in the first state, the UE 10 may be in a state not connected to the core network 90 via the access network B.

Note that the UE 10 may not need to establish the single-access PDN connection via the access network A.

Alternatively, the UE 10 may be in a state in which the single-access PDN connection is established via the access network A. In this case, the UE 10 may perform, in the LTE access network, the attach procedure in the single-access PDN connection started with an initiative of the UE 10 or the PDN connectivity procedure, to establish the third PDN connection.

Note that the third PDN connection may be established with the gateway selected by using the APN 2. Alternatively, the third PDN connection may be established with a gateway selected by using another APN different from the APN 1 and the APN 2.

The first state has been described above; however the first state is not limited thereto, and may be, for example, a state in which the multi-access PDN connection based on the NBIFOM is established through the access network A and the PDN connection is not established through the access network B.

2.4.4. Description of Second State

The second state will be described by using FIG. 14. In the second state, the UE 10 has established the first PDN connection with the core network 90. Furthermore, the UE 10 has established the second PDN connection with the core network 90. In greater detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network A. Thus, the first PDN connection may be constituted of a transfer path obtained by combining a transfer path between the UE 10 and the eNB 45, a transfer path between the eNB 45 and the SGW 35, and a transfer path between the SGW 35 and the PGW_A 1310. Here, the transfer path may be a bearer.

In addition, the second PDN connection may be constituted of a transfer path between the UE 10 and the PGW 30 through the access network B. Thus, the second PDN connection may be constituted of a transfer path between the UE 10 and the TWAG 74 and a transfer path between the TWAG 74 and the PGW_B 1320. Here, the transfer path may be a bearer.

As described above, in the first state, the UE 10 may be in a state in which the multi-access PDN connection based on the NBIFOM is established via the access network A. Furthermore, the UE 10 may be in a state in which the single-access PDN connection is established via the access network B.

Note that the UE 10 may not need to establish the single-access PDN connection via the access network A.

Alternatively, the UE 10 may be in a state in which the single-access PDN connection is established via the access network A. In this case, the UE 10 may perform, in the LTE access network, the attach procedure in the single-access PDN connection started with an initiative of the UE 10 or the PDN connectivity procedure, to establish the third PDN connection.

Note that the third PDN connection may be established with the gateway selected by using the APN 2. Alternatively, the third PDN connection may be established with a gateway selected by using another APN different from the APN 1 and the APN 2.

The second state has been described above; however the second state is not limited thereto, and may be, for example, a state in which the multi-access PDN connection based on the NBIFOM is established through the access network B and the single-access PDN connection is established through the access network A.

2.5. Additional Attach Procedure

Hereinafter, the additional attach procedure will be described.

The additional attach procedure is a procedure for adding, on the basis of a function of the multi PDN connection capable of constituting multiple transfer paths, a transfer path constituted in the multi PDN connection.

Specifically, the purpose of the procedure is to add a transfer path through the access network B to the multi-access PDN connection including only a transfer path through the access network A.

For example, if describing the operation mode of the first PDN connection being the Network-initiated mode, in another way, it means that flow switching and/or update of the routing rule for the PDN connection, which are initiated by the UE 10, are not possible. On the other hand, the PDN connectivity procedure and/or the attach procedure are initiated by the UE 10.

As described above, the second state is a state in which the UE 10 has established the first PDN connection only through the access network A. In other words, the transfer path through the access network B is not included in the first PDN connection. Note that the transfer path may be a bearer and/or a communication path.

Therefore, if the first PDN connection in the second state is in the Network-initiated mode, the network and/or the PCRF 60 are not possible to include the transfer path through the access network B to the first PDN connection.

Therefore, the UE 10 may perform a procedure to establish the transfer path though the access network B on the basis of state transition to the second state and the operation mode being the Network-initiated mode.

In addition, if the operation mode of the first PDN connection in the second state is the UE-initiated mode, the UE 10 may perform the establishment procedure to establish the transfer path though the access network B on the basis of the routing rule stored in the UE 10.

Specifically, if the routing rule of the first PDN connection indicates a priority for a WLAN access, the UE 10 may perform a procedure for adding the transfer path through the access network B to the first PDN connection.

More specifically, if the UE 10 stores the routing rule in which a specific flow and a WLAN access are associated with each other with respect to the first PDN connection, the UE 10 may perform the procedure for adding the transfer path through the access network B.

In other words, if the routing rule of the first PDN connection does not indicate a priority for a WLAN access, the UE 10 does not perform the procedure for adding the transfer path through the access network B to the first PDN connection.

More specifically, if the UE 10 does not store the routing rule in which a specific flow and a WLAN access are associated with each other with respect to the first PDN connection, the UE 10 does not perform the procedure for adding the transfer path through the access network B.

Hereinafter, details of the procedure will be described.

2.5.1 Example of Second Additional Attach Procedure

Next, an example of the second additional attach procedure will be described by using FIG. 17. As illustrated in the figure, an initial state of the example of the present procedure is a first state (S2302). Note that the procedure for changing a state into the first state may be the same as the procedure described above, and thus detailed descriptions will be omitted.

The first state may be a state in which the UE 10 has established the first PDN connection with the PGW 30 and/or the network through the access network A. Specifically, the first initial state is a state in which the UE 10 has established the first PDN connection with the PGW_A selected by using the APN 1 through the eNB 45 and the SGW 35. Note that the first PDN connection may be the multi-access PDN connection.

The UE 10 performs the attach procedure through the access network B, on the basis of the transition to the first state and establishment of the first PDN connection in the Network-initiated mode (S2304).

Alternatively, the UE 10 may perform the attach procedure through the access network B on the basis of the transition to the first initial state in which the first PDN connection in the UE-initiated mode has been established and the routing rule.

Specifically, on the basis of the routing rule indicating a priority for a WLAN access, the UE 10 may perform the attach procedure through the access network B.

Specifically, if the state is changed to the first initial state in which the first PDN connection in the UE-initiated mode has been established and the routing rule of the first PDN connection indicates a priority for a WLAN access, the UE 10 may perform the attach procedure through the access network B.

More specifically, if the state is changed to the first initial state in which the first PDN connection in the UE-initiated mode has been established and the UE 10 stores the routing rule in which a specific flow and a WLAN access are associated with each other with respect to the first PDN connection, the UE 10 may perform the attach procedure through the access network B.

In other words, if the routing rule of the first PDN connection does not indicate a priority for a WLAN access even when the state is changed to the first initial state in which the first PDN connection in the UE-initiated mode has been established, the UE 10 does not perform the attach procedure through the access network B.

More specifically, if the UE 10 does not store the routing rule in which a specific flow and a WLAN access are associated with each other with respect to the first PDN connection even when the state is changed to the first initial state in which the first PDN connection in the UE-initiated mode has been established, the UE 10 does not perform the attach procedure through the access network B.

The UE 10 may transmit the Attach request including at least the APN and/or the PDN connection ID.

The APN may be an APN to which the UE 10 requests connection. More specifically, the APN may be the APN 2. The UE 10 may include the APN 2 to establish the single-access PDN connection. Here, the APN 2 may be an APN that is not allowed to establish the multi-access PDN connection based on the NBIFOM and/or an APN that is not allowed to perform communication based on the NBIFOM.

In other words, the UE 10 may request the establishment of the single access PDN connection using the APN 2 different from the APN 1 acquired from the network when establishing the first PDN connection.

The PDN connection ID may be an ID assigned when the PGW 30 establishes the PDN connection in the PDN connectivity procedure, or may be information uniquely identifying the PDN connection that the UE 10 establishes with the PGW 30.

Note that the UE 10 performs authentication and a security association procedure with the MME 40, the PGW_A and the PGW_B during the attach procedure.

The UE 10 may acquire the APN from the network upon completion of the attach procedure.

The APN may be an APN to which the UE 10 requests connection. More specifically, the APN may be the APN 2. The UE 10 may include the APN 2 to establish the single-access PDN connection. Here, the APN 2 may be an APN that is not allowed to establish the multi-access PDN connection based on the NBIFOM and/or an APN that is not allowed to perform communication based on the NBIFOM.

In other words, the UE 10 may establish the single access PDN connection using the APN 2 different from the APN 1 acquired from the network when establishing the first PDN connection.

Through the above-described processes, the UE 10 and the core network 90 change their states from the first state to the second state (S2306).

Next, the UE 10 performs the PDN connectivity procedure through the access network B on the basis of the transition to the second state and establishment of the first PDN connection in the Network-initiated mode (S2308).

Alternatively, the UE 10 may perform the PDN connectivity procedure through the access network B on the basis of the transition to the second state and the routing rule of the first PDN connection established in the UE-initiated mode.

Specifically, on the basis of the routing rule indicating a priority for a WLAN access, the UE 10 may perform the attach procedure through the access network B.

Specifically, if the state is changed to the second state in which the first PDN connection in the UE-initiated mode has been established and the routing rule of the first PDN connection indicates a priority for a WLAN access, the UE 10 may perform a procedure for adding a transfer path through the access network B to the first PDN connection.

More specifically, if the state is changed to the second state in which the first PDN connection in the UE-initiated mode has been established and the UE 10 stores the routing rule in which a specific flow and a WLAN access are associated with each other with respect to the first PDN connection, the UE 10 may perform the procedure for adding the transfer path through the access network B.

In other words, if the routing rule of the first PDN connection does not indicate a priority for a WLAN access even when the state is changed to the second state in which the first PDN connection in the UE-initiated mode has been established, the UE 10 does not perform the procedure for adding the transfer path through the access network B to the first PDN connection.

More specifically, if the UE 10 does not store the routing rule in which a specific flow and a WLAN access are associated with each other with respect to the first PDN connection even when the state is changed to the second state in which the first PDN connection in the UE-initiated mode has been established, the UE 10 does not perform the procedure for adding the transfer path through the access network B. The PDN connectivity procedure through the access network B will be described by using FIG. 18.

First, the UE 10 transmits a PDN connectivity request to the TWAG 74 (S2402). The UE 10 may transmit the PDN connectivity request including at least the PDN connectivity request message identity (PDN connectivity request message ID), the Procedure transaction identity (Procedure transaction ID), the Request type, and the PDN type. Furthermore, the UE 10 may include at least the first identification information and/or the sixth identification information and/or the PDN connection ID into the PDN connectivity request. Moreover, the UE 10 may include the Access Point Name (APN) and/or the Protocol Configuration Options (PCOs) and/or the Traffic Flow Templates (TFTs) into the PDN connectivity request. Note that the UE 10 may transmit the PCO including the first identification information and/or the sixth identification information and/or the PDN connection ID and/or the TFT.

Here, the first identification information may be the UE NBIFOM capability representing that the UE 10 supports the NBIFOM. Note that the NBIFOM capability may be information indicating having a function of establishing the multi-access PDN connection based on the NBIFOM.

In addition, the sixth identification information may be a request NBIFOM representing that the NBIFOM operation mode for the multi-access PDN connection based on the NBIFOM is requested to be determined.

Additionally/alternatively, the sixth identification information may be information representing that an NBIFOM operation mode allowed for the multi-access PDN connection based on the NBIFOM to be established is requested.

As described above, the UE 10 may transmit the PDN connectivity request including the first identification information and/or sixth identification information to request the establishment of the multi-access PDN connection based on the NBIFOM, without requesting a certain NBIFOM operation mode.

The PDN connectivity request message ID may be the message type representing the PDN connectivity request message.

The Procedure transaction ID may be information identifying the PDN connectivity procedure.

The APN may be an APN to which the UE 10 requests connection. More specifically, the APN may be the APN 1. The UE 10 may include the APN 1 to establish the multi-access PDN connection based on the NBIFOM. Here, the APN 1 may be an APN that is allowed to establish the multi-access PDN connection based on the NBIFOM and/or an APN that is allowed to perform communication based on the NBIFOM. The APN may be identification information identifying the first PDN connection.

The PDN connection ID may be an ID assigned when the PGW 30 establishes the PDN connection in the PDN connectivity procedure, or may be information uniquely identifying the PDN connection that the UE 10 establishes with the PGW 30. The PDN connection ID may be identification information identifying the first PDN connection. The PDN connection ID may be associated with the APN.

Note that the UE 10 may identify the first PDN connection by using the APN and/or the PDN connection ID.

The Request type may be information identifying the type of the PDN connectivity procedure to be requested. For example, since the UE 10 performs an initial connection by using the APN 1, the Request type may be the type indicating an attach, not the type indicating a handover.

The PDN type may indicate an available IP version. For example, the PDN type may be the IPv4, may be the IPv6, or may be the IPv4v6. The PCO may be protocol information associated with the PDN connection. Furthermore, the PCO may include identification information to be requested. Note that the UE 10 may transmit the PCO including the first identification information.

The TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that in the present example, in accordance with the transmission of the PDN connectivity request, the UE 10 does not request a certain NBIFOM operation mode, and thus, the UE 10 may transmit the PDN connectivity request without including the TFT. In other words, if the UE 10 requests the establishment of the multi-access PDN connection based on the NBIFOM without requesting the certain NBIFOM operation mode, the UE 10 may transmit the PDN connectivity request without including the TFT. More specifically, if the UE 10 includes the first identification information and/or the sixth identification information, the UE 10 may transmit the PDN connectivity request without including the TFT. Note that conventionally, the UE 10 can perform transmission by including information indicating the IFOM support in the PCO. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, by including the information indicating the IFOM support in the PCO, the UE 10 can switch the access network through which the communication of a certain IP flow is performed.

In the present embodiment, if the UE 10 includes the first identification information and the sixth identification information in the PCO, the UE 10 does not include the IFOM support. In contrast, if the UE 10 includes the IFOM support into the PCO, the UE 10 does not include the first identification information and/or the sixth information. As described above, it may be possible to not configure both of the first identification information and the IFOM support to be effective to ensure a clear distinction between use of the switching of the communication path on the basis of the NBIFOM and that of the switching of the communication path on the basis of the IFOM.

Thus, the UE 10 can establish either one of the PDN connection supporting the IFOM or the PDN connection supporting the NBIFOM, through the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. Based on the reception of the PDN connectivity request and/or and/or the first identification information and/or sixth identification information included in the PDN connectivity request, the TWAG 74 transmits a session generation request to the PGW 30 (S2404).

Based on the reception of the PDN connectivity request and/or the first identification information and/or sixth identification information included in the PDN connectivity request, the TWAG 74 may transmit the session generation request including at least the first identification information and/or sixth identification information. Furthermore, the TWAG 74 may include the TFT into the session generation request, on the basis of the reception of the TFT transmitted from the UE 10.

Furthermore, the TWAG 74 may include the APN and/or the PDN connection ID into the session generation request, on the basis of the reception of the APN and/or the PDN connection ID transmitted from the UE 10. Note that the TWAG 74 may identify the first PDN connection by using the received APN and/or PDN connection ID.

Furthermore, the TFT may be information for identifying an IP flow that performs communication by using the PDN connection established through the present PDN connectivity procedure. Note that the IP flow to be identified may vary for each application. Thus, based on the TFT, user data of a certain application can be identified.

More specifically, the TFT may be constituted of five-tuple, or may be constituted of identification information such as the application ID. Note that the five-tuple may be constituted by combining one or more information elements of a transmission-source IP address, a transmission-destination IP address, a transmission-source port number, a transmission-destination port number, and a protocol number.

Note that if both of the first identification information and the sixth identification information are not included in the PDN connectivity request, the TWAG 74 may transmit the session generation request without including the first identification information and/or the sixth identification information. Moreover, if the first identification information and/or the sixth identification information is not included in the PDN connectivity request, the TWAG 74 may perform a procedure for establishing the single-access PDN connection.

The PGW 30 receives the session generation request transmitted from the TWAG 74. Based on the reception of the session generation request, and/or the first identification information and/or sixth identification information included in the session generation request, the PGW 30 may perform the IP-CAN session update procedure with the PCRF 60.

Based on the reception of the session generation request and/or the first identification information and/or sixth identification information included in the session generation request, the PGW 30 may perform the IP-CAN session update procedure including at least the first identification information and/or the sixth identification information.

Furthermore, on the basis of the reception of APN and/or PDN connection ID transmitted by the TWAG 74, the PGW 30 may identify the first PDN connection by using the received APN and/or PDN connection ID.

Note that the PGW 30 may perform the IP-CAN session update procedure to notify the PCRF 60 of information of the UE 10 and/or TWAG 74.

The PGW 30 may transmit, to the PCRF 60, a control message in the IP-CAN session procedure, including information indicating whether the PDN connection to be established is the multi-access PDN connection based on the NBIFOM or the single-access PDN connection, and/or the first identification information, and/or the sixth identification information.

More specifically, if the multi-access PDN connection based on the NBIFOM is to be established, the PGW 30 transmits, to the PCRF 60, the information indicating the access network B, the PDN connection ID, the information indicating that the PDN connection is the multi-access PDN connection based on the NBIFOM, and the fifth identification information. Alternatively, if the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information uniquely identifying the PDN connection that the UE 10 establishes with the PGW 30.

Furthermore, based on the reception of the first identification information and/or sixth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Based on the reception of the session generation request or the completion of the IP-CAN session update procedure, and/or the first identification information and/or sixth identification information included in the session generation request, and/or the seventh identification information included in the IP-CAN session update procedure, the PGW 30 transmits a session generation response to the TWAG 74 (S2406).

Based on the reception of the session generation request or the completion of the IP-CAN session update procedure, and/or the first identification information and/or sixth identification information included in the session generation request, and/or the seventh identification information included in the IP-CAN session update procedure, the PGW 30 may transmit the session generation response including at least the seventh identification information.

Furthermore, the PGW 30 may include the PDN Address and/or the PDN connection ID and/or the TFT into the session generation response.

Note that a method by which the PGW 30 acquires the seventh identification information is not limited to the above-described method for acquiring the seventh identification information from the PCRF 60 through the IP-CAN session update procedure, and another example may be employed. For example, the PGW 30 may generate the seventh identification information and transmit the session generation response including the seventh identification information, without acquiring the seventh identification information from the PCRF 60 through the IP-CAN session update procedure.

Here, the seventh identification information may be the allowed mode representing the NBIFOM operation mode that is allowed for the multi-access PDN connection based on the NBIFOM to be established. In other words, the seventh identification information may be the operation mode allowed by the operator.

Note that the PCRF 60 or the PGW 30 may determine the allowed mode and the seventh identification information, on the basis of the operator policy. For example, a policy that allows the establishment of only the PDN connection of the UE-initiated mode, a policy that allows the establishment of only the PDN connection of the newtork-initiated mode, a policy that allows the establishment of both modes, a policy that prohibits the establishment of both modes, and the like may be managed.

Note that the PCRF 60 or the PGW 30 may acquire the operator policy from the HSS 55 and the like. Alternatively, an operator policy generated by an administrator may be stored.

In addition, for the operator policy, a policy different for each subscriber may be managed. Alternatively, a policy different for each APN may be managed. For example, for each APN, a different allowed mode for the PDN connection to be established may be managed.

Based on the allowed mode, the PCRF 60 or the PGW 30 may include the allowed operation mode into the seventh identification information.

In other words, if only the Network-initiated mode is allowed, the PCRF 60 or the PGW 30 may include the Network-initiated mode into the seventh identification information. Alternatively, if only the UE-initiated mode is allowed, the PCRF 60 or the PGW 30 may include the UE-initiated mode into the seventh identification information.

Note that if both of the UE-initiated mode and the Network-initiated mode are allowed, the seventh identification information may include both operation modes. Alternatively, if both of the UE-initiated mode and the Network-initiated mode are allowed and a default operation mode is configured, the seventh identification information may include only the default operation mode. Note that which of the UE-initiated mode and the Network-initiated mode is defined as the default operation mode may be configured based on the operator policy.

Note that, if the establishment of the PDN connection of all operation modes is not allowed, the PCRF 60 may transmit, to the PGW 30, the cause information indicating that the Requested Operation Mode is not allowed.

If the establishment of the PDN connection of all operation modes is not allowed, the PGW 30 may not need to notify the TWAG 74 of the seventh identification information.

If the establishment of the PDN connection of all operation modes is not allowed, the PGW 30 may transmit, to the TWAG 74, the session generation response including the cause information indicating that the Requested Operation Mode is not allowed.

If the establishment of the PDN connection of all operation modes is not allowed, the PGW 30 may notify the TWAG 74 that there is no allowed operation.

As described above, on the basis of the allowed mode, the PCRF 60 or the PGW 30 may regard an operation mode that is allowed to establish the PDN connection as the seventh identification information.

Note that if the Network-initiated mode is not included in the seventh identification information, the PCRF 60 may not need to transmit the TFT to the PGW 30.

In other words, only if the Network-initiated mode is included in the seventh identification information, the PCRF 60 may transmit the TFT to the PGW 30.

Note that if the Network-initiated mode is not included in the seventh identification information, the PGW 30 may not need to transmit the TFT to the TWAG 74. Thus, in this case, the PGW 30 may not need to include the TFT into the session generation response.

In other words, only if the Network-initiated mode is included in the seventh identification information, the PGW 30 may transmit the TFT to the TWAG 74. Thus, in this case, the PGW 30 may include the TFT into the session generation response.

The PDN Address may be an IP address assigned to the UE 10. For example, the PDN Address may be the IPv4 address, or may be the IPv6 prefix and an interface ID for constituting an IPv6 address. Here, the PGW 30 may assign the IP address of the UE 10. Moreover, the PGW 30 may include the IP address already assigned to the UE 10 into the PDN Address. Specifically, the PDN Address may be the same as the PDN Address acquired at the time of establishment of the multi-access PDN connection, the connection being established in the initial state.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The TWAG 74 receives the session generation response transmitted from the PGW 30. Based on the reception of the session generation response and/or the seventh identification information included in the session generation response, the TWAG 74 transmits a PDN connectivity accept to the UE 10 (S2408).

Based on the reception of the session generation response and/or the seventh identification information included in the session generation response, the TWAG 74 may transmit the PDN connectivity accept including at least a PDN connectivity accept message identity (PDN connectivity accept message ID), the Procedure transaction ID, the APN, the PDN Address, the PDN connection ID, and the User Plane Connection ID. Furthermore, the TWAG 74 may include at least the seventh identification information into the PDN connectivity accept. Moreover, the TWAG 74 may include the PCO and/or a cause and/or the TFT and/or PDN connection attribute information, into the PDN connectivity accept. Note that the TWAG 74 may transmit the PCO including the seventh identification information and/or the TFT.

Here, the PDN connectivity accept message ID may be a message type representing the PDN connectivity accept message.

The APN may be an APN to which the UE 10 is allowed to be connected. More specifically, the APN may be the APN 1. The APN 1 may be an APN that is allowed to establish the multi-access PDN connection based on the NBIFOM. The TWAG 74 may include the APN 1 in the PDN connectivity accept.

The PDN Address may be an IP address assigned to the UE 10. For example, the PDN Address may be the IPv4 address, or may be the interface ID for constituting the IPv6 address.

The PDN connection ID may be information for uniquely identifying the PDN connection established between the UE 10 and the PGW 30. The PDN connection ID may be an ID assigned by the PGW 30, or may be an ID assigned by the TWAG 74. In other words, the TWAG 74 may assign the PDN connection ID.

The User Plane Connection ID is information identifying a user plane. The user plain is a transfer path or transfer paths to be used for transfer of user data through the PDN connection. The TWAG 74 may assign the user plain connection ID.

The cause may be information representing that the PDN type of the PDN Address assigned to the UE 10 is different from the PDN type requested by the UE 10 in the PDN connectivity request.

Note that the TWAG 74 and/or the PGW 30 may include the seventh identification information into the PCO. However, if the TWAG 74 and/or the PGW 30 includes the seventh identification information into the PCO, the TWAG 74 and/or the PGW 30 does not include the IFOM support. In contrast, if the TWAG 74 and/or the PGW 30 includes the IFOM support into the PCO, the TWAG 74 and/or the PGW 30 does not include the seventh identification information. As described above, it may be possible to not configure both of the seventh identification information and the IFOM support to be effective to ensure a clear distinction between use of the switching of the communication path on the basis of the NBIFOM and that of the switching of the communication path on the basis of the IFOM.

The PDN connection attribute information may be information indicating that the PDN connection established through the present PDN connectivity procedure is the multi-access PDN connection, and/or information indicating that user data transmitted/received by using the PDN connection established through the present PDN connectivity procedure is allowed to be transmitted/received through the access network A and the access network B, and/or if there is only one operation mode indicated by the seventh identification information, information indicating that the PDN connection established through the present PDN connectivity procedure is the multi-access PDN connection of the operation mode indicated by the seventh identification information.

Note that the UE 10 may transmit the PDN connectivity accept message, further including the connectivity type indicating the type of the PDN connection and/or the WLAN offload permission information (WLAN offload acceptability) indicating whether or not the WLAN offload can be performed.

Furthermore, the TWAG 74 may transmit the connectivity type or the WLAN offload permission information including the PDN connection attribute information.

The UE 10 receives the PDN connectivity accept transmitted from the TWAG 74. The UE 10 transmits PDN connectivity complete to the TWAG 74 on the basis of the reception of PDN connectivity accept and/or the seventh identification information included in the PDN connectivity accept (S2410). The UE 10 may transmit the PDN connectivity complete including at least a PDN connectivity complete message ID (PDN connectivity complete), the Procedure transaction ID, and the PDN connection ID.

Furthermore, if a plurality of INFOM operation modes are included in the seventh identification information, the UE 10 may include at least the fifth identification information into the PDN connectivity complete. In other words, if the plurality of INFOM operation modes are allowed, the UE 10 may select one mode of the allowed modes and transmit the fifth identification information including the one mode.

Specifically, if the UE-initiated mode and the Network-initiated mode are included in the seventh identification information included in the PDN connectivity accept, the UE 10 may include the UE-initiated mode or the Network-initiated mode in the fifth identification information.

Which of the UE-initiated mode and the Network-initiated mode is to be included into the fifth identification information may be determined on the basis of the UE policy. Note that the UE policy may be any information configured to the UE 10. For example, the UE policy may be information configured by a user.

The PDN connectivity complete message ID may be the message type representing the PDN connectivity complete message.

Through these processes, the UE 10 completes the additional attach procedure.

The UE 10 can acquire the same PDN Address as the PDN Address assigned for the multi-access PDN connection, the connection being established in the initial state.

The UE 10 can establish the additional transfer path through the access network B on the basis of the transition to the first initial state and the operation mode of the first PDN connection.

Specifically, the UE 10 can perform the attach procedure and the PDN connectivity procedure to the access network B and establish the additional transfer path through the TWAG 74, on the basis of the transition to the first initial state and the first PDN connection being in the Network-initiated mode. Note that the transfer path may be a bearer and/or a communication path.

More specifically, the UE 10 can add the transfer path through the access network B to the first PDN connectivity between the PGW_A selected using the APN 1 and the UE 10, by performing the attach procedure and performing the PDN connectivity procedure after establishing the second PDN connection between the PGW_B selected using the APN 2 and the UE 10. Note that the transfer path may be a bearer and/or a communication path.

Alternatively, the UE 10 can perform the attach procedure and the PDN connectivity procedure through the access network B on the basis of the transition to the first initial state and the routing rule of the first PDN connection in the UE-initiated mode, to establish the additional transfer path through the TWAG 74. Note that the transfer path may be a bearer and/or a communication path.

Specifically, the UE 10 can add the transfer path through the access network B to the first PDN connectivity between the PGW_A selected using the APN 1 and the UE 10, by performing the attach procedure and performing the PDN connectivity procedure after establishing the second PDN connection between the PGW_B selected using the APN 2 and the UE 10. Note that the transfer path may be a bearer and/or a communication path.

Furthermore, the UE 10 can establish the additional transfer path through the access network B on the basis of the transition to the second initial state and the operation mode of the first PDN connection.

Specifically, the UE 10 can perform the PDN connectivity procedure to the access network B and establish the additional transfer path through the TWAG 74, on the basis of the transition to the second initial state and the first PDN connection being in the Network-initiated mode. Note that the transfer path may be a bearer and/or a communication path.

More specifically, the UE 10 can add the transfer path through the access network B to the first PDN connectivity between the PGW_A selected using the APN 1 and the UE 10, by performing the PDN connectivity procedure. Note that the transfer path may be a bearer and/or a communication path.

Alternatively, the UE 10 can perform the PDN connectivity procedure through the access network B, on the basis of the transition to the second initial state and the routing rule of the first PDN connection in the UE-initiated mode, to establish the additional transfer path through the eNB 45. Note that the transfer path may be a bearer and/or a communication path.

Specifically, the UE 10 can add the transfer path through the access network B to the first PDN connectivity between the PGW_A selected using the APN 1 and the UE 10, by performing the PDN connectivity procedure. Note that the transfer path may be a bearer and/or a communication path.

3. Modification

Additionally, the program run on the devices in the embodiments are programs that control a CPU (programs that cause a computer to function) so as to realize the functions of the above-described embodiment. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a Digital Versatile Disc (DVD), a Magneto Optical Disc (MO), a Mini Disc (MD), a Compact Disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing programs that have been loaded, there are also cases where the functions of the present invention are realized by the programs running cooperatively with an operating system, other application programs, or the like on the basis of instructions included in those programs.

When delivering these programs to the market, the programs can be stored in a portable recording medium, or transferred to a server computer connected via a network such as the Internet. In this case, the storage device serving as the server computer is of course also included in the present invention.

Additionally, each device in the above-described embodiment may be partially or completely realized as Large Scale Integration (LSI) circuit, which is a typical integrated circuit. The functional blocks of each device may be individually realized as chips, or may be partially or completely integrated into a chip. Furthermore, a circuit integration technique is not limited to the LSI, and the integrated circuit may be realized with a dedicated circuit or a general-purpose processor. Furthermore, if advances in semiconductor technology produce circuit integration technology capable of replacing LSI, it is of course possible to use integrated circuits based on the technology.

Additionally, although the above-described embodiments have described the LTE and the WLAN (IEEE 802.11a/b/n, for example) as examples of the radio access network, the connections may be made with WiMAX instead of the WLAN.

REFERENCE SIGNS LIST

7 Core network
9 Communication system
10 UE
30 PGW
35 SGW
40 MME
45 eNB
50 HSS
55 AAA
60 PCRF
65 ePDG
70 WLAN ANa
74 TWAG
75 WLAN ANb
80 LTE AN
100 PDN

The invention claimed is:

1. A User Equipment (UE) comprising:
   LTE interface circuitry configured to receive an Activate default EPS bearer context request message from a Mobility Management Entity (MME) in order to establish a Packet Data Network (PDN) connection, wherein
      the Activate default EPS bearer context request message includes first information indicating a Network-based IP Flow Mobility (NBIFOM) mode,
      the Activate default EPS bearer context request message further includes second information indicating that a request for a use of NBIFOM is accepted, and
      the NBIFOM mode is selected by a PDN Gateway (PGW) or a Policy and Charging Rules Function (PCRF).

2. The UE according to claim 1, wherein the first information indicates a UE-initiated NBIFOM mode or a Network-initiated NBIFOM mode.

3. The UE according to claim 1, wherein on the basis of a reception of the Activate default EPS bearer context request message, the UE recognizes the first information as an NBIFOM mode for the PDN connection.

4. A Mobility Management Entity (MME) comprising:
   IP mobile communication network interface circuitry configured to transmit an Activate default EPS bearer context request message to a User Equipment (UE), wherein
      the Activate default EPS bearer context request message includes first information indicating a Network-based IP Flow Mobility (NBIFOM) mode,
      the Activate default EPS bearer context request message further includes second information indicating that a request for a use of NBIFOM is accepted, and
      the NBIFOM mode is selected by a PDN Gateway (PGW) or a Policy and Charging Rules Function (PCRF).

5. The MME according to claim 4, wherein the first information indicates a UE-initiated NBIFOM mode or a Network-initiated NBIFOM mode.

6. A PDN Gateway (PGW) comprising:
   IP mobile communication network interface circuitry configured to transmit a create session response message to a Serving Gateway (SGW), wherein
      the create session response message includes first information indicating a Network-based IP Flow Mobility (NBIFOM) mode, and
      the NBIFOM mode is selected by the PGW or a Policy and Charging Rules Function (PCRF).

7. The PGW according to claim 6, wherein the first information indicates a UE-initiated NBIFOM mode or a Network-initiated NBIFOM mode.

* * * * *